(12) United States Patent
Chen et al.

(10) Patent No.: US 10,488,628 B2
(45) Date of Patent: Nov. 26, 2019

(54) OPTICAL IMAGING LENS

(71) Applicant: GENIUS ELECTRONIC OPTICAL CO., LTD., Taichung (TW)

(72) Inventors: Yu-Ming Chen, Taichung (TW); Pei-Chi Wang, Taichung (TW)

(73) Assignee: GENIUS ELECTRONIC OPTICAL CO., LTD., Taichung (TW)

( * ) Notice: Subject to any disclaimer, the term of this patent is extended or adjusted under 35 U.S.C. 154(b) by 0 days.

(21) Appl. No.: 16/205,235

(22) Filed: Nov. 30, 2018

(65) Prior Publication Data

US 2019/0137737 A1 May 9, 2019

Related U.S. Application Data

(63) Continuation-in-part of application No. 15/830,009, filed on Dec. 4, 2017, now abandoned.

(30) Foreign Application Priority Data

Nov. 7, 2017 (CN) .......................... 2017 1 1082176
Oct. 25, 2018 (CN) .......................... 2018 1 1250271

(51) Int. Cl.
  *G02B 9/62* (2006.01)
  *G02B 13/00* (2006.01)
(52) U.S. Cl.
  CPC .......... *G02B 13/0045* (2013.01); *G02B 9/62* (2013.01)
(58) Field of Classification Search
  CPC ....... G02B 13/0045; G02B 9/62; G02B 7/028
  See application file for complete search history.

(56) References Cited

U.S. PATENT DOCUMENTS 9,366,846 B2 * 6/2016 Chen .................. G02B 13/0045

* cited by examiner

*Primary Examiner* — Joseph P Martinez
(74) *Attorney, Agent, or Firm* — JCIPRNET

(57) ABSTRACT

An optical imaging lens including a first lens element to a sixth lens element arranged in sequence from an object side to an image side along an optical axis is provided. The first lens element to the third lens elements are respectively arranged to be lens elements in a first, a second and a third order from the object side to the image side. The fourth lens element to the sixth lens element are respectively arranged to be lens elements in a first, a second and a third order from an aperture to the image side.

20 Claims, 78 Drawing Sheets

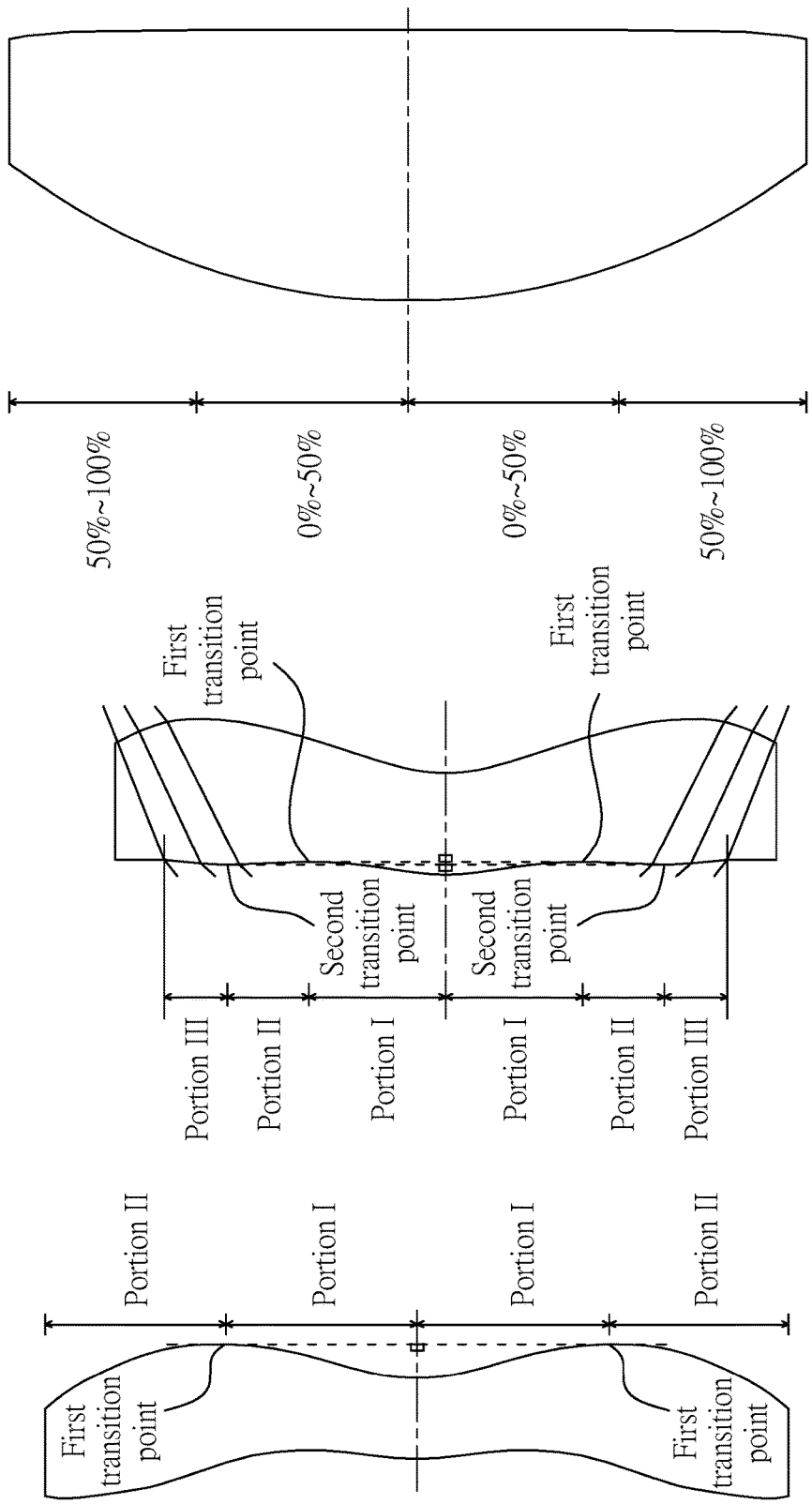

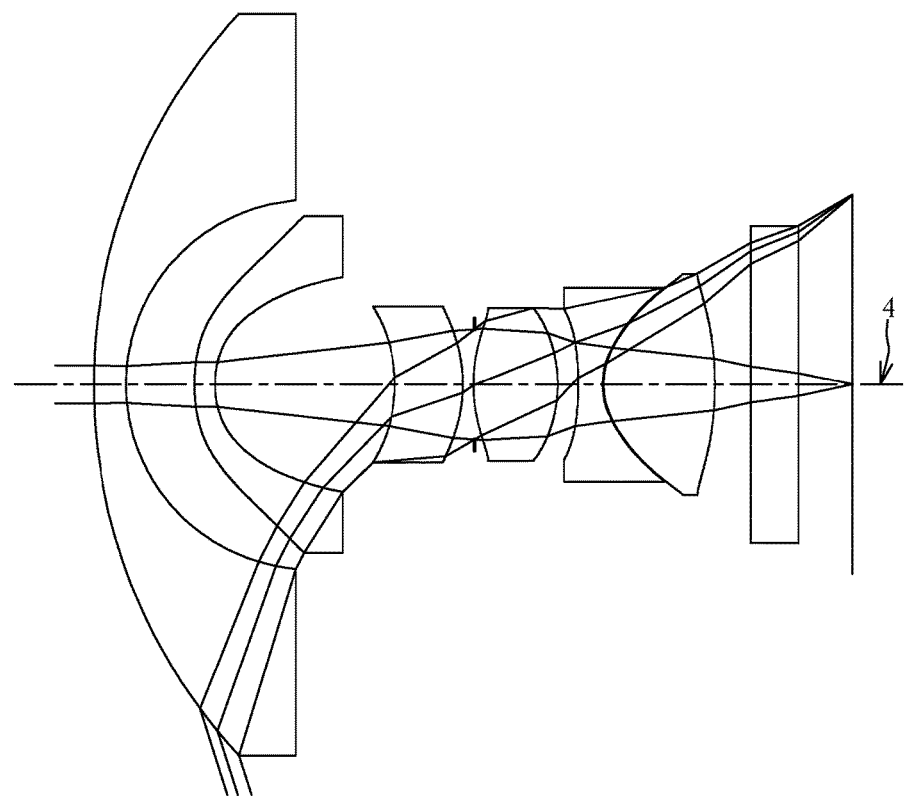
FIG.8
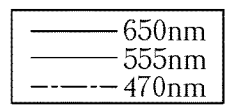
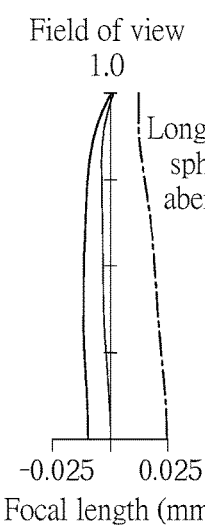
FIG.9A
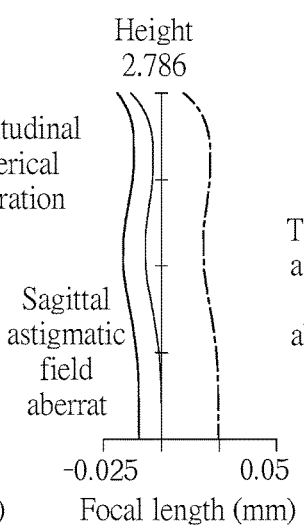
FIG.9B
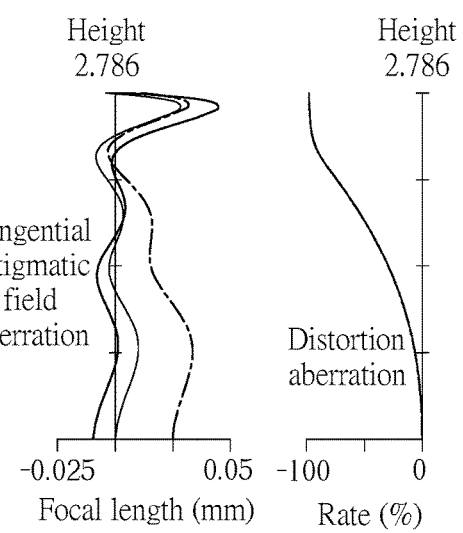
FIG.9C
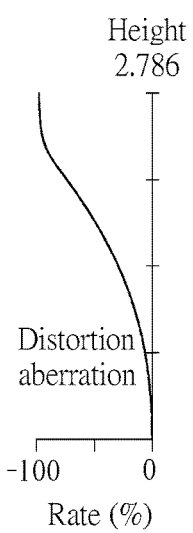
FIG.9D

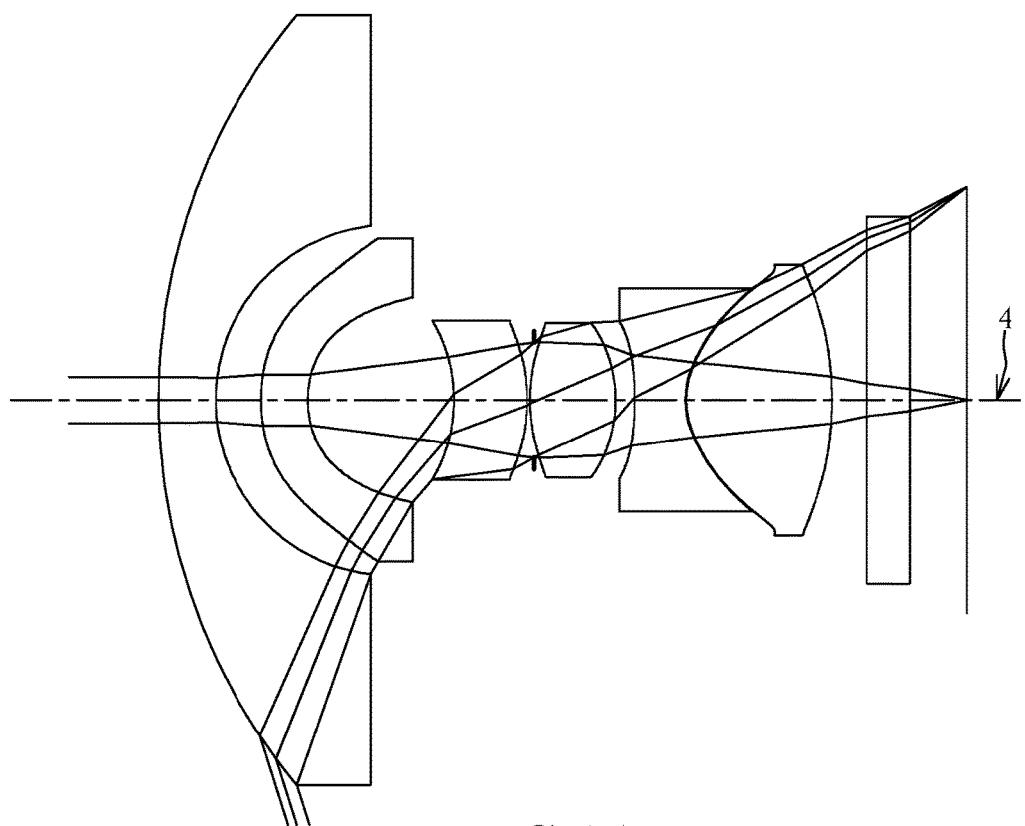
FIG.14
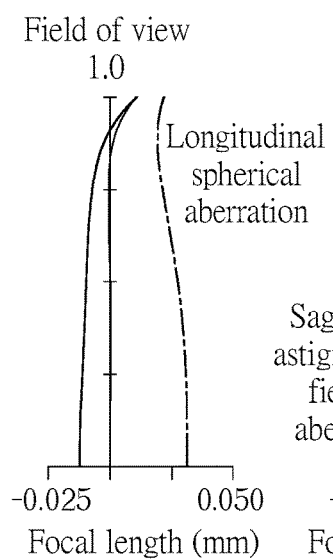
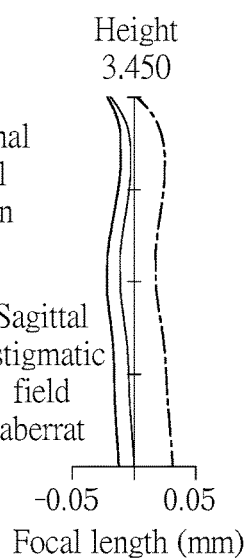
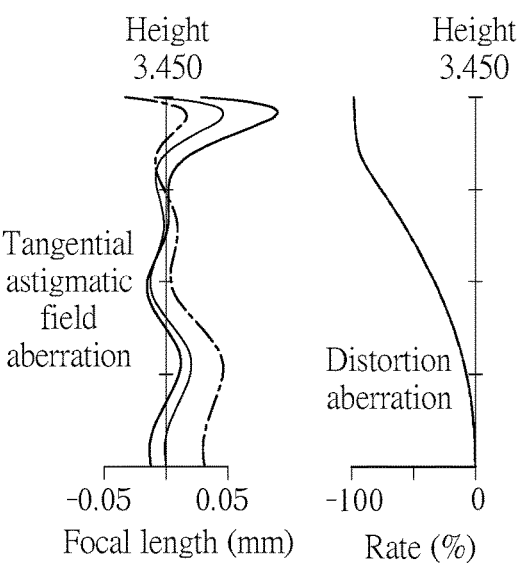
FIG.15A  FIG.15B  FIG.15C  FIG.15D

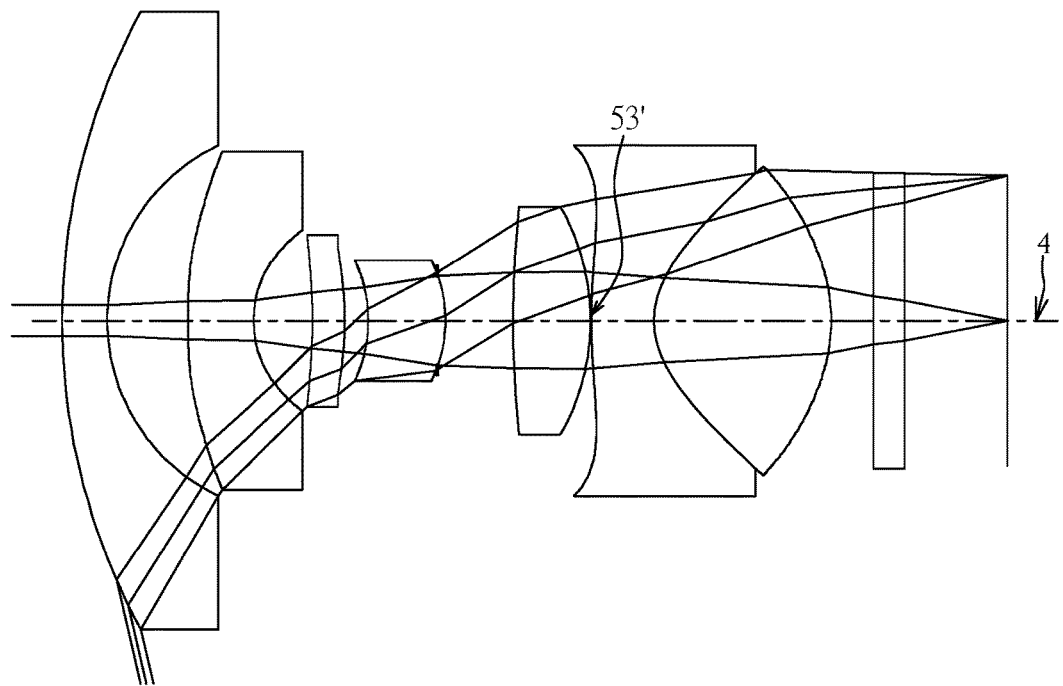
FIG.18
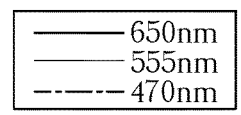
Field of view
1.0
Longitudinal spherical aberration
Sagittal astigmatic field aberrat
-0.025   0.050
Focal length (mm)
FIG.19A
Height
3.264
-0.025   0.050
Focal length (mm)
FIG.19B
Height
3.264
Tangential astigmatic field aberration
-0.025   0.050
Focal length (mm)
FIG.19C
Height
3.264
Distortion aberration
-100   0
Rate (%)
FIG.19D

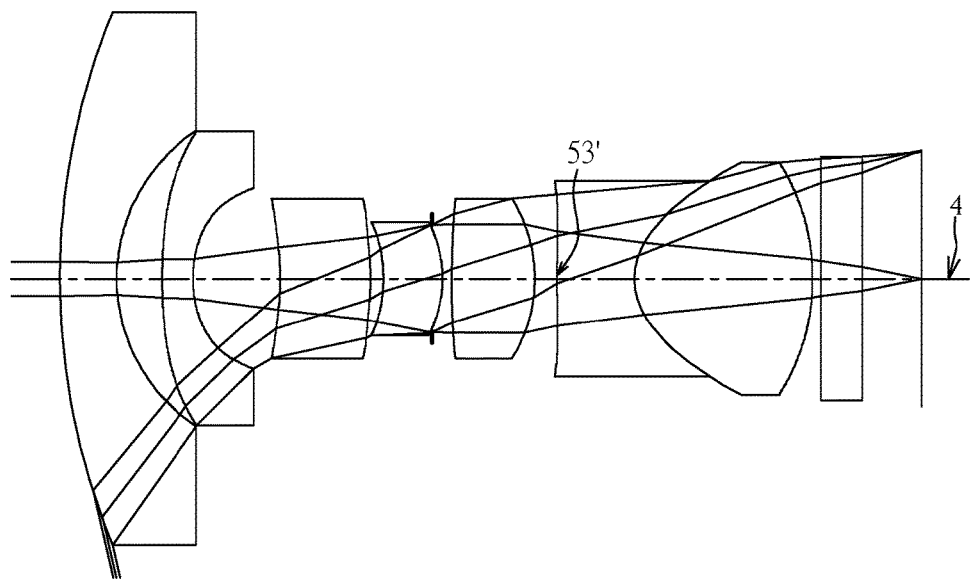
FIG.26
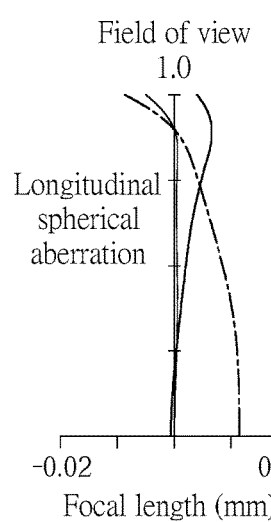
FIG.27A
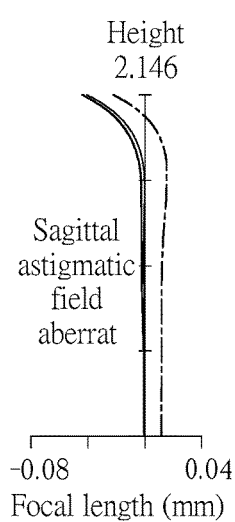
FIG.27B
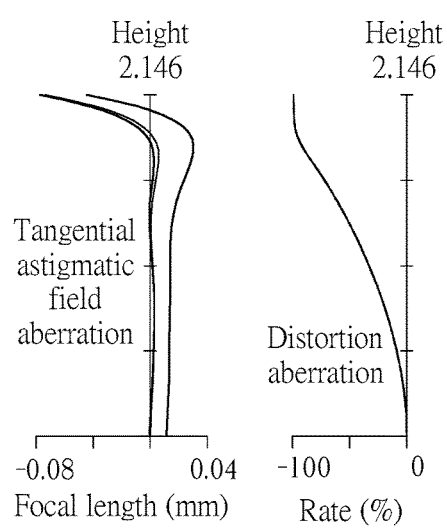
FIG.27C
FIG.27D

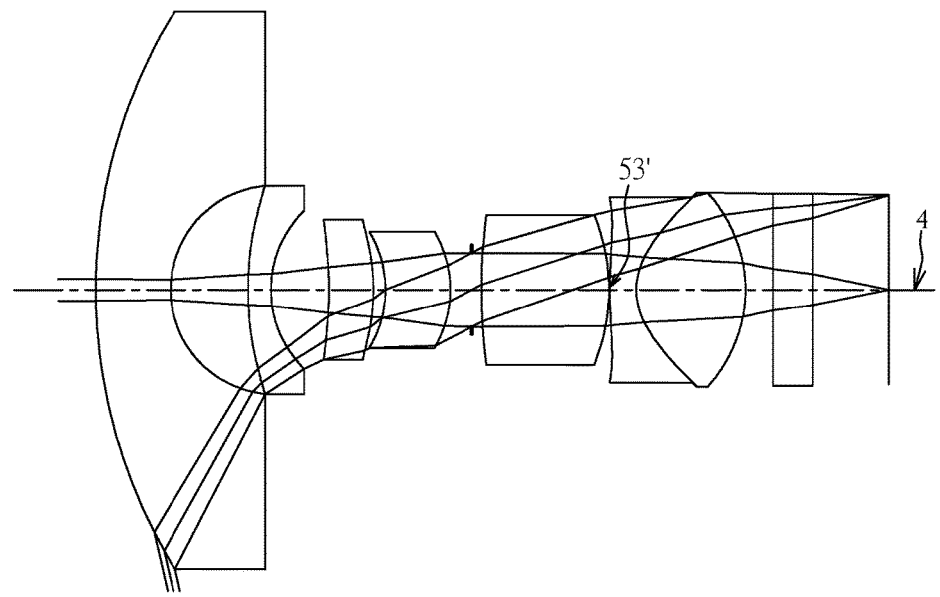
FIG.28
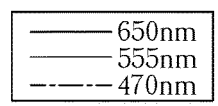
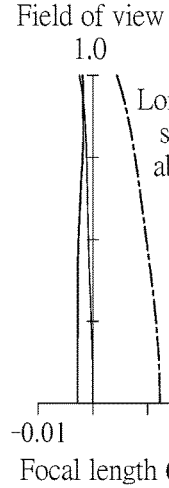 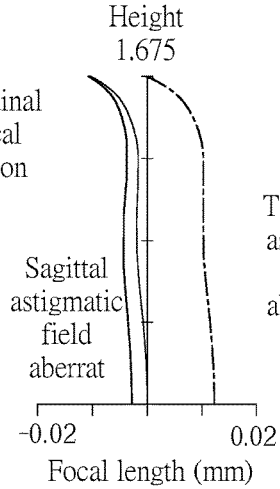 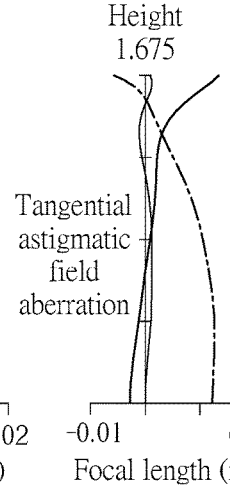 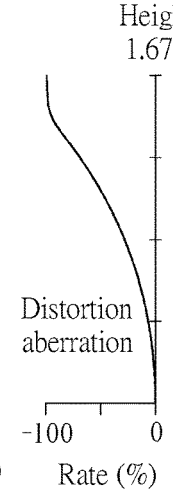
FIG.29A   FIG.29B   FIG.29C   FIG.29D

| First Example | | | | | | | |
|---|---|---|---|---|---|---|---|
| Image height=2.084mm; EFL=1.131mm; HFOV= 107.500deg.; TTL =11.265mm; Fno=2.400 | | | | | | | |
| No. | | Curvature Radius | Ape. Stop Lens Thickness Air Gap | | Refractive Index | Abbe No. | Focal Length | Material |
| | Object | | Infinity | | | | | |
| 11 | First Lens | 8.662 | 0.611 | T1 | 1.791 | 47.516 | -4.071 | Glass |
| 12 | | 2.274 | 1.282 | G12 | | | | |
| 21 | Second Lens | 3.360 | 0.887 | T2 | 1.533 | 55.811 | -5.227 | Plastic |
| 22 | | 1.384 | 1.385 | G23 | | | | |
| 31 | Third Lens | -1.970 | 1.099 | T3 | 1.645 | 23.539 | 14.713 | Plastic |
| 32 | | -1.988 | 0.377 | G34 | | | | |
| 80 | Ape. Stop | | -0.074 | | | | | |
| 41 | Fourth Lens | 2.610 | 1.554 | T4 | 1.533 | 55.811 | 2.217 | Plastic |
| 42 | | -1.715 | 0.205 | G45 | | | | |
| 51 | Fifth Lens | -4.326 | 0.327 | T5 | 1.645 | 23.539 | -5.325 | Plastic |
| 52 | | 1.108 | 0.010 | G56 | 1.502 | 59.999 | | Film |
| 61 | Sixth Lens | 1.013 | 1.385 | T6 | 1.533 | 55.811 | 4.751 | Plastic |
| 62 | | -2.894 | 0.632 | G6F | | | | |
| 92 | Filter | Infinity | 0.700 | | 1.518 | 64.166 | | |
| 93 | | Infinity | 0.884 | | | | | |
| 91 | Image Plane | Infinity | 0.000 | | | | | |

FIG.30

| No. | K | a4 | a6 | a8 |
|---|---|---|---|---|
| 11 | 0.000000E+00 | 0.000000E+00 | 0.000000E+00 | 0.000000E+00 |
| 12 | 0.000000E+00 | 0.000000E+00 | 0.000000E+00 | 0.000000E+00 |
| 21 | 0.000000E+00 | 4.046920E-02 | -7.623975E-03 | 1.448806E-05 |
| 22 | -7.535721E-01 | 1.102813E-01 | 4.156669E-03 | -2.474263E-02 |
| 31 | 0.000000E+00 | -7.017580E-03 | -8.569574E-03 | 1.203705E-02 |
| 32 | -1.839527E+00 | -1.768173E-02 | 2.132505E-03 | 3.210603E-03 |
| 41 | 0.000000E+00 | -9.964505E-03 | -1.464685E-02 | 4.661638E-02 |
| 42 | 0.000000E+00 | -1.343003E-02 | 7.180895E-02 | -1.726670E-01 |
| 51 | 0.000000E+00 | -8.722095E-02 | 1.323206E-01 | -3.279728E-01 |
| 52 | -1.038726E+00 | -5.138522E-02 | -8.698880E-02 | 2.384156E-01 |
| 61 | -1.086467E+00 | 1.776282E-01 | -1.675066E+00 | 3.433636E+00 |
| 62 | 0.000000E+00 | 6.223045E-03 | -1.610733E-02 | 7.016474E-03 |
| No. | a10 | a12 | a14 | a16 |
| 11 | 0.000000E+00 | 0.000000E+00 | 0.000000E+00 | 0.000000E+00 |
| 12 | 0.000000E+00 | 0.000000E+00 | 0.000000E+00 | 0.000000E+00 |
| 21 | 1.071197E-04 | -2.352984E-05 | 3.046776E-06 | 0.000000E+00 |
| 22 | 8.966394E-03 | 0.000000E+00 | 0.000000E+00 | 0.000000E+00 |
| 31 | -1.946040E-03 | 0.000000E+00 | 0.000000E+00 | 0.000000E+00 |
| 32 | -7.317456E-04 | 0.000000E+00 | 0.000000E+00 | 0.000000E+00 |
| 41 | -1.740736E-01 | 2.428261E-01 | -1.331185E-01 | 0.000000E+00 |
| 42 | 1.864306E-01 | -9.698813E-02 | 1.815572E-02 | 0.000000E+00 |
| 51 | 3.433255E-01 | -1.711413E-01 | 3.235248E-02 | 0.000000E+00 |
| 52 | -2.611521E-01 | 1.482902E-01 | -4.228282E-02 | 4.788841E-03 |
| 61 | -3.423988E+00 | 1.847525E+00 | -5.175249E-01 | 5.907030E-02 |
| 62 | -5.404751E-04 | -1.620796E-04 | 2.332328E-05 | 0.000000E+00 |

FIG.31

| Second Example |||||||
| --- | --- | --- | --- | --- | --- | --- |
| Image height=2.786mm; EFL=1.370mm; HFOV= 107.500deg.; TTL =11.136mm; Fno=2.400 |||||||
| No. | | Curvature Radius | Ape. Stop Lens Thickness Air Gap || Refractive Index | Abbe No. | Focal Length | Material |
| | Object | | Infinity | | | | | |
| 11 | First Lens | 8.041 | 0.478 | T1 | 1.791 | 47.516 | -5.403 | Glass |
| 12 | | 2.717 | 1.004 | G12 | | | | |
| 21 | Second Lens | 2.859 | 0.300 | T2 | 1.533 | 55.811 | -6.504 | Plastic |
| 22 | | 1.510 | 2.639 | G23 | | | | |
| 31 | Third Lens | -2.225 | 1.001 | T3 | 1.645 | 23.539 | 17.777 | Plastic |
| 32 | | -2.192 | 0.171 | G34 | | | | |
| 80 | Ape. Stop | | -0.017 | | | | | |
| 41 | Fourth Lens | 2.366 | 1.235 | T4 | 1.533 | 55.811 | 2.284 | Plastic |
| 42 | | -2.054 | 0.299 | G45 | | | | |
| 51 | Fifth Lens | -5.300 | 0.358 | T5 | 1.645 | 23.539 | -5.573 | Plastic |
| 52 | | 0.994 | 0.011 | G56 | 1.502 | 59.999 | | Film |
| 61 | Sixth Lens | 1.084 | 1.643 | T6 | 1.533 | 55.811 | 7.549 | Plastic |
| 62 | | -5.010 | 0.525 | G6F | | | | |
| 92 | Filter | Infinity | 0.700 | | 1.516 | 64.166 | | |
| 93 | | Infinity | 0.789 | | | | | |
| 91 | Image Plane | Infinity | 0.000 | | | | | |

FIG.32

| No. | K | a4 | a6 | a8 |
|---|---|---|---|---|
| 11 | 0.000000E+00 | 0.000000E+00 | 0.000000E+00 | 0.000000E+00 |
| 12 | 0.000000E+00 | 0.000000E+00 | 0.000000E+00 | 0.000000E+00 |
| 21 | 0.000000E+00 | 8.719708E-02 | -2.790609E-02 | 3.737241E-03 |
| 22 | -1.413937E-01 | 1.197508E-01 | -1.024870E-02 | -1.049543E-02 |
| 31 | 0.000000E+00 | 8.511145E-04 | -7.810331E-03 | 1.750704E-03 |
| 32 | -2.071494E+00 | -1.323941E-02 | -1.825846E-03 | 3.497706E-03 |
| 41 | 0.000000E+00 | -9.706165E-03 | -2.481624E-02 | 4.528206E-02 |
| 42 | 0.000000E+00 | 1.926452E-05 | -1.441850E-02 | 1.885584E-02 |
| 51 | 0.000000E+00 | -5.494073E-02 | -7.273380E-03 | 1.190958E-02 |
| 52 | -9.978328E-01 | -1.681714E-02 | -1.658570E-01 | 2.732240E-01 |
| 61 | -9.305298E-01 | 2.273557E-01 | -9.159872E-01 | 1.361347E+00 |
| 62 | 0.000000E+00 | -5.525915E-03 | -8.509836E-03 | 1.139469E-02 |
| No. | a10 | a12 | a14 | a16 |
| 11 | 0.000000E+00 | 0.000000E+00 | 0.000000E+00 | 0.000000E+00 |
| 12 | 0.000000E+00 | 0.000000E+00 | 0.000000E+00 | 0.000000E+00 |
| 21 | -2.724730E-04 | 4.884790E-06 | 4.752482E-07 | 0.000000E+00 |
| 22 | 3.836433E-03 | 0.000000E+00 | 0.000000E+00 | 0.000000E+00 |
| 31 | 1.672980E-03 | 0.000000E+00 | 0.000000E+00 | 0.000000E+00 |
| 32 | 7.163533E-04 | 0.000000E+00 | 0.000000E+00 | 0.000000E+00 |
| 41 | -8.120507E-02 | 6.895401E-02 | -2.713795E-02 | 0.000000E+00 |
| 42 | -2.269557E-02 | 1.251119E-02 | -4.404865E-03 | 0.000000E+00 |
| 51 | -9.570191E-03 | 4.096490E-03 | -1.445354E-03 | 0.000000E+00 |
| 52 | -1.985595E-01 | 7.481112E-02 | -1.373719E-02 | 9.149155E-04 |
| 61 | -1.033922E+00 | 4.263755E-01 | -9.093449E-02 | 7.864794E-03 |
| 62 | -5.582590E-03 | 1.516168E-03 | -1.638562E-04 | 0.000000E+00 |

FIG.33

| Third Example |||||||||
|---|---|---|---|---|---|---|---|---|
| Image height=1.772mm; EFL=1.105mm; HFOV= 96.750deg.; TTL =12.911mm; Fno=2.600 |||||||||
| No. | | Curvature Radius | Ape. Stop Lens Thickness Air Gap | | Refractive Index | Abbe No. | Focal Length | Material |
| | Object | | Infinity | | | | | |
| 11 | First Lens | 7.895 | 0.591 | T1 | 1.791 | 47.516 | -3.495 | Glass |
| 12 | | 1.980 | 0.978 | G12 | | | | |
| 21 | Second Lens | 2.261 | 0.300 | T2 | 1.533 | 55.811 | -6.499 | Plastic |
| 22 | | 1.305 | 1.923 | G23 | | | | |
| 31 | Third Lens | -2.310 | 1.469 | T3 | 1.645 | 23.539 | 12.102 | Plastic |
| 32 | | -2.226 | 1.080 | G34 | | | | |
| 80 | Ape. Stop | | 0.073 | | | | | |
| 41 | Fourth Lens | 3.308 | 1.309 | T4 | 1.533 | 55.811 | 2.591 | Plastic |
| 42 | | -2.046 | 0.354 | G45 | | | | |
| 51 | Fifth Lens | -7.537 | 0.691 | T5 | 1.645 | 23.539 | -6.580 | Plastic |
| 52 | | 1.039 | 0.012 | G56 | 1.502 | 59.999 | | Film |
| 61 | Sixth Lens | 1.029 | 2.723 | T6 | 1.533 | 55.811 | 4.631 | Plastic |
| 62 | | -2.725 | 0.200 | G6F | | | | |
| 92 | Filter | Infinity | 0.700 | | 1.518 | 64.166 | | |
| 93 | | Infinity | 0.508 | | | | | |
| 91 | Image Plane | Infinity | 0.000 | | | | | |

FIG.34

| No. | K | a4 | a6 | a8 |
|---|---|---|---|---|
| 11 | 0.000000E+00 | 0.000000E+00 | 0.000000E+00 | 0.000000E+00 |
| 12 | 0.000000E+00 | 0.000000E+00 | 0.000000E+00 | 0.000000E+00 |
| 21 | 0.000000E+00 | 6.799535E-02 | -2.595959E-02 | -5.439021E-03 |
| 22 | -6.967539E-01 | 1.216052E-01 | -1.681611E-02 | -2.374637E-02 |
| 31 | 0.000000E+00 | 6.302924E-03 | -3.382568E-03 | 1.050069E-03 |
| 32 | -1.831802E+00 | -5.628689E-03 | -2.010180E-03 | 6.899316E-04 |
| 41 | 0.000000E+00 | 8.098951E-04 | -2.303660E-02 | 4.204894E-02 |
| 42 | 0.000000E+00 | 8.536748E-03 | -3.898009E-03 | -7.378236E-03 |
| 51 | 0.000000E+00 | -4.850448E-02 | 1.684858E-02 | -2.688532E-02 |
| 52 | -9.377743E-01 | -1.010900E-01 | 1.465749E-01 | -1.202833E-01 |
| 61 | -9.377743E-01 | -1.014255E-01 | 1.471286E-01 | -1.201932E-01 |
| 62 | 0.000000E+00 | -5.014808E-03 | -3.172115E-03 | 2.088430E-03 |
| No. | a10 | a12 | a14 | a16 |
| 11 | 0.000000E+00 | 0.000000E+00 | 0.000000E+00 | 0.000000E+00 |
| 12 | 0.000000E+00 | 0.000000E+00 | 0.000000E+00 | 0.000000E+00 |
| 21 | 4.136711E-03 | -7.594591E-04 | 4.436298E-05 | 0.000000E+00 |
| 22 | 1.018824E-02 | 0.000000E+00 | 0.000000E+00 | 0.000000E+00 |
| 31 | -1.085418E-04 | 0.000000E+00 | 0.000000E+00 | 0.000000E+00 |
| 32 | -8.235219E-05 | 0.000000E+00 | 0.000000E+00 | 0.000000E+00 |
| 41 | -8.274360E-02 | 6.495852E-02 | -2.021925E-02 | 0.000000E+00 |
| 42 | 1.210043E-04 | -8.006154E-04 | 4.778361E-04 | 0.000000E+00 |
| 51 | 9.767972E-03 | -1.457666E-03 | 4.716080E-04 | 0.000000E+00 |
| 52 | 5.782335E-02 | -1.557154E-02 | 2.106234E-03 | -1.060904E-04 |
| 61 | 5.767399E-02 | -1.557154E-02 | 2.106234E-03 | -1.060904E-04 |
| 62 | -4.394577E-04 | 4.439978E-05 | -1.484596E-06 | 0.000000E+00 |

FIG.35

| Fourth Example |||||||
|---|---|---|---|---|---|---|
| Image height=1.636mm; EFL=0.962mm; HFOV= 96.750deg.; TTL =11.925mm; Fno=2.400 |||||||
| No. | | Curvature Radius | Ape. Stop Lens Thickness Air Gap | Refractive Index | Abbe No. | Focal Length | Material |
| | Object | | Infinity | | | | |
| 11 | First Lens | 10.107 | 1.026 | T1 | 1.791 | 47.516 | -3.687 | Glass |
| 12 | | 2.162 | 0.821 | G12 | | | |
| 21 | Second Lens | 2.250 | 0.593 | T2 | 1.533 | 55.811 | -6.084 | Plastic |
| 22 | | 1.207 | 2.275 | G23 | | | |
| 31 | Third Lens | -2.446 | 1.348 | T3 | 1.645 | 23.539 | 7.662 | Plastic |
| 32 | | -1.989 | 0.606 | G34 | | | |
| 80 | Ape. Stop | | 0.105 | | | | |
| 41 | Fourth Lens | 3.436 | 0.879 | T4 | 1.533 | 55.811 | 2.698 | Plastic |
| 42 | | -2.255 | 0.332 | G45 | | | |
| 51 | Fifth Lens | -12.338 | 0.489 | T5 | 1.645 | 23.539 | -6.904 | Plastic |
| 52 | | 0.879 | 0.011 | G56 | 1.502 | 59.999 | | Film |
| 61 | Sixth Lens | 0.879 | 1.710 | T6 | 1.533 | 55.811 | 4.365 | Plastic |
| 62 | | -2.653 | 0.406 | G6F | | | |
| 92 | Filter | Infinity | 0.700 | | 1.518 | 64.166 | |
| 93 | | Infinity | 0.625 | | | | |
| 91 | Image Plane | Infinity | 0.000 | | | | |

FIG.36

| No. | K | a4 | a6 | a8 |
|---|---|---|---|---|
| 11 | 0.000000E+00 | 0.000000E+00 | 0.000000E+00 | 0.000000E+00 |
| 12 | 0.000000E+00 | 0.000000E+00 | 0.000000E+00 | 0.000000E+00 |
| 21 | 0.000000E+00 | 6.695956E-02 | -1.057589E-02 | 3.801332E-04 |
| 22 | -5.511385E-01 | 1.244479E-01 | 3.500647E-02 | -5.597723E-02 |
| 31 | 0.000000E+00 | -7.021988E-03 | -4.163351E-03 | 2.779869E-03 |
| 32 | -2.038563E+00 | -4.185857E-03 | -5.776208E-03 | 4.316531E-03 |
| 41 | 0.000000E+00 | 1.435091E-02 | -3.223627E-02 | 6.586372E-02 |
| 42 | 0.000000E+00 | 5.107962E-04 | 7.140947E-03 | -3.662416E-02 |
| 51 | 0.000000E+00 | -5.514286E-02 | 4.346622E-02 | -1.028413E-01 |
| 52 | -9.185581E-01 | -1.101483E-01 | 2.238551E-01 | -3.556028E-01 |
| 61 | -9.185581E-01 | -1.101483E-01 | 2.238551E-01 | -3.556028E-01 |
| 62 | 0.000000E+00 | 1.103708E-02 | -2.665898E-02 | 2.586870E-02 |
| No. | a10 | a12 | a14 | a16 |
| 11 | 0.000000E+00 | 0.000000E+00 | 0.000000E+00 | 0.000000E+00 |
| 12 | 0.000000E+00 | 0.000000E+00 | 0.000000E+00 | 0.000000E+00 |
| 21 | -1.761135E-03 | 6.222234E-04 | -6.250170E-05 | 0.000000E+00 |
| 22 | 1.584189E-02 | 0.000000E+00 | 0.000000E+00 | 0.000000E+00 |
| 31 | -2.100137E-04 | 0.000000E+00 | 0.000000E+00 | 0.000000E+00 |
| 32 | -9.118064E-04 | 0.000000E+00 | 0.000000E+00 | 0.000000E+00 |
| 41 | -1.545041E-01 | 1.667145E-01 | -7.376391E-02 | 0.000000E+00 |
| 42 | 3.394120E-02 | -1.649600E-02 | 1.907232E-04 | 0.000000E+00 |
| 51 | 1.202126E-01 | -6.887507E-02 | 1.513735E-02 | 0.000000E+00 |
| 52 | 3.407586E-01 | -1.880567E-01 | 5.584868E-02 | -6.948142E-03 |
| 61 | 3.407586E-01 | -1.880567E-01 | 5.584868E-02 | -6.948142E-03 |
| 62 | -1.428690E-02 | 4.662735E-03 | -6.804188E-04 | 0.000000E+00 |

FIG.37

| | | Fifth Example | | | | | |
|---|---|---|---|---|---|---|---|
| Image height=3.450mm; EFL=1.973mm; HFOV= 107.500deg.; TTL =13.074mm; Fno=2.600 ||||||||
| No. | | Curvature Radius | Ape. Stop Lens Thickness Air Gap | | Refractive Index | Abbe No. | Focal Length | Material |
| | Object | | Infinity | | | | | |
| 11 | First Lens | 9.825 | 0.922 | T1 | 1.791 | 47.516 | -5.367 | Glass |
| 12 | | 2.841 | 0.738 | G12 | | | | |
| 21 | Second Lens | 2.839 | 0.756 | T2 | 1.533 | 55.811 | -11.475 | Plastic |
| 22 | | 1.759 | 2.360 | G23 | | | | |
| 31 | Third Lens | -2.618 | 1.186 | T3 | 1.645 | 23.539 | 32.689 | Plastic |
| 32 | | -2.742 | 0.121 | G34 | | | | |
| 80 | Ape. Stop | | -0.071 | | | | | |
| 41 | Fourth Lens | 2.754 | 1.384 | T4 | 1.533 | 55.811 | 2.578 | Plastic |
| 42 | | -2.265 | 0.308 | G45 | | | | |
| 51 | Fifth Lens | -6.046 | 0.819 | T5 | 1.645 | 23.539 | -6.762 | Plastic |
| 52 | | 1.305 | 0.012 | G56 | 1.502 | 59.999 | | Film |
| 61 | Sixth Lens | 1.305 | 2.361 | T6 | 1.533 | 55.811 | 9.099 | Plastic |
| 62 | | -6.003 | 0.565 | G6F | | | | |
| 92 | Filter | Infinity | 0.700 | | 1.518 | 64.166 | | |
| 93 | | Infinity | 0.914 | | | | | |
| 91 | Image Plane | Infinity | 0.000 | | | | | |

FIG.38

| No. | K | a4 | a6 | a8 |
|---|---|---|---|---|
| 11 | 0.000000E+00 | 0.000000E+00 | 0.000000E+00 | 0.000000E+00 |
| 12 | 0.000000E+00 | 0.000000E+00 | 0.000000E+00 | 0.000000E+00 |
| 21 | 0.000000E+00 | 2.319505E-02 | 2.829839E-03 | -2.751629E-03 |
| 22 | -2.354097E-01 | 4.939276E-02 | 2.627982E-02 | -1.817095E-02 |
| 31 | 0.000000E+00 | -9.168096E-06 | -6.229812E-03 | 3.544310E-04 |
| 32 | -2.438241E+00 | -1.811005E-02 | 1.159335E-02 | -7.096399E-03 |
| 41 | 0.000000E+00 | -1.846902E-02 | 1.510844E-02 | -2.024073E-02 |
| 42 | 0.000000E+00 | -6.949495E-03 | 9.097202E-04 | -2.211428E-03 |
| 51 | 0.000000E+00 | -3.984234E-02 | -7.660843E-03 | 1.390831E-02 |
| 52 | -1.015142E+00 | -3.941510E-02 | -1.624353E-03 | 1.127034E-02 |
| 61 | -1.015142E+00 | -3.941510E-02 | -1.624353E-03 | 1.127034E-02 |
| 62 | 0.000000E+00 | -4.840815E-03 | -3.054229E-03 | 1.572944E-03 |
| No. | a10 | a12 | a14 | a16 |
| 11 | 0.000000E+00 | 0.000000E+00 | 0.000000E+00 | 0.000000E+00 |
| 12 | 0.000000E+00 | 0.000000E+00 | 0.000000E+00 | 0.000000E+00 |
| 21 | 6.587345E-04 | -8.501591E-05 | 4.328489E-06 | 0.000000E+00 |
| 22 | 5.104048E-03 | 0.000000E+00 | 0.000000E+00 | 0.000000E+00 |
| 31 | 1.129335E-03 | 0.000000E+00 | 0.000000E+00 | 0.000000E+00 |
| 32 | 3.658479E-03 | 0.000000E+00 | 0.000000E+00 | 0.000000E+00 |
| 41 | 1.259881E-02 | -4.469512E-03 | 3.594843E-04 | 0.000000E+00 |
| 42 | 4.302667E-03 | -2.768788E-03 | 3.326088E-04 | 0.000000E+00 |
| 51 | -1.125608E-02 | 5.018273E-03 | -1.091293E-03 | 0.000000E+00 |
| 52 | -5.423798E-03 | 1.237354E-03 | -1.179922E-04 | 1.142591E-06 |
| 61 | -5.423798E-03 | 1.237354E-03 | -1.179922E-04 | 1.142591E-06 |
| 62 | -2.627562E-04 | 1.975002E-05 | -4.886459E-07 | 0.000000E+00 |

FIG.39

| Sixth Example ||||||||
|---|---|---|---|---|---|---|---|
| Image height=1.667mm; EFL=0.946mm; HFOV= 103.000deg.; TTL =19.418mm; Fno=2.400 ||||||||
| No. |  | Curvature Radius | Ape. Stop Lens Thickness Air Gap |  | Refractive Index | Abbe No. | Focal Length | Material |
|  | Object |  | Infinity |  |  |  |  |  |
| 11 | First Lens | 17.952 | 1.678 | T1 | 1.839 | 43.128 | -6.870 | Glass |
| 12 |  | 4.175 | 2.242 | G12 |  |  |  |  |
| 21 | Second Lens | 10.446 | 0.670 | T2 | 1.539 | 56.054 | -3.354 | Plastic |
| 22 |  | 1.506 | 2.068 | G27 |  |  |  |  |
| 71 | Seventh Lens | -5.867 | 1.707 | T7 | 1.645 | 23.539 | 18.552 | Plastic |
| 72 |  | -4.385 | 0.290 | G73 |  |  |  |  |
| 31 | Third Lens | -2.274 | 1.100 | T3 | 1.645 | 23.539 | 11.620 | Plastic |
| 32 |  | -2.075 | 0.095 | G34 |  |  |  |  |
| 80 | Ape. Stop |  | 0.824 |  |  |  |  |  |
| 41 | Fourth Lens | 8.712 | 2.453 | T4 | 1.518 | 64.166 | 5.212 | Glass |
| 42 |  | -3.538 | 0.020 | G45 |  |  |  |  |
| 51 | Fifth Lens | 12.159 | 0.953 | T5 | 1.647 | 22.418 | -33.112 | Plastic |
| 61 |  | 1.056 | 3.680 | T6 | 1.539 | 56.054 | 5.305 | Plastic |
| 62 | Sixth Lens | -2.304 | 0.043 | G6F |  |  |  |  |
| 92 | Filter | Infinity | 0.700 |  | 1.518 | 64.166 |  |  |
| 93 |  | Infinity | 0.896 |  |  |  |  |  |
| 91 | Image Plane | Infinity | 0.000 |  |  |  |  |  |

FIG.40

| No. | K | a4 | a6 | a8 |
|---|---|---|---|---|
| 11 | 0.000000E+00 | 0.000000E+00 | 0.000000E+00 | 0.000000E+00 |
| 12 | 0.000000E+00 | 0.000000E+00 | 0.000000E+00 | 0.000000E+00 |
| 21 | 0.000000E+00 | 2.500210E-02 | -7.047574E-03 | 9.020555E-04 |
| 22 | -1.005465E+00 | 5.893922E-02 | 5.353818E-03 | -7.238560E-03 |
| 71 | 0.000000E+00 | 7.314473E-03 | -5.837397E-04 | 7.960485E-05 |
| 72 | 0.000000E+00 | 1.900586E-02 | 5.706276E-03 | 1.341424E-03 |
| 31 | 0.000000E+00 | -2.942614E-03 | 5.026416E-03 | -2.076277E-03 |
| 32 | 0.000000E+00 | -9.135126E-04 | 1.693762E-03 | -1.552126E-03 |
| 41 | 0.000000E+00 | 0.000000E+00 | 0.000000E+00 | 0.000000E+00 |
| 42 | 0.000000E+00 | 0.000000E+00 | 0.000000E+00 | 0.000000E+00 |
| 51 | 0.000000E+00 | -1.287439E-02 | -1.215744E-04 | -9.805510E-05 |
| 61 | -1.139417E+00 | 8.868990E-03 | 9.589674E-05 | 9.082920E-06 |
| 62 | -7.141177E-01 | 1.518356E-02 | -3.808822E-03 | 6.034823E-04 |
| No. | a10 | a12 | a14 | a16 |
| 11 | 0.000000E+00 | 0.000000E+00 | 0.000000E+00 | 0.000000E+00 |
| 12 | 0.000000E+00 | 0.000000E+00 | 0.000000E+00 | 0.000000E+00 |
| 21 | -5.809678E-05 | 1.514066E-06 | 0.000000E+00 | 0.000000E+00 |
| 22 | 1.611882E-03 | -2.870152E-05 | 0.000000E+00 | 0.000000E+00 |
| 71 | 0.000000E+00 | 0.000000E+00 | 0.000000E+00 | 0.000000E+00 |
| 72 | 0.000000E+00 | 0.000000E+00 | 0.000000E+00 | 0.000000E+00 |
| 31 | -2.873297E-03 | 0.000000E+00 | 0.000000E+00 | 0.000000E+00 |
| 32 | 0.000000E+00 | 0.000000E+00 | 0.000000E+00 | 0.000000E+00 |
| 41 | 0.000000E+00 | 0.000000E+00 | 0.000000E+00 | 0.000000E+00 |
| 42 | 0.000000E+00 | 0.000000E+00 | 0.000000E+00 | 0.000000E+00 |
| 51 | 1.968338E-05 | 0.000000E+00 | 0.000000E+00 | 0.000000E+00 |
| 61 | -2.133595E-05 | 6.436385E-13 | -3.661986E-16 | 0.000000E+00 |
| 62 | -5.565684E-05 | 2.168123E-06 | -3.162025E-08 | 0.000000E+00 |

FIG.41

| Seventh Example ||||||||
| --- | --- | --- | --- | --- | --- | --- | --- |
| Image height=3.264mm; EFL=1.853mm; HFOV= 103.000deg.; TTL =21.235mm; Fno=2.600 ||||||||
| No. | | Curvature Radius | Ape. Stop Lens Thickness Air Gap | | Refractive Index | Abbe No. | Focal Length | Material |
| | Object | | Infinity | | | | | |
| 11 | First Lens | 14.579 | 1.010 | T1 | 1.839 | 43.128 | -7.780 | Glass |
| 12 | | 4.365 | 1.807 | G12 | | | | |
| 21 | Second Lens | 18.230 | 1.490 | T2 | 1.539 | 56.054 | -5.807 | Plastic |
| 22 | | 2.593 | 1.315 | G27 | | | | |
| 71 | Seventh Lens | -12.042 | 0.731 | T7 | 1.645 | 23.539 | 21.692 | Plastic |
| 72 | | -6.624 | 0.526 | G73 | | | | |
| 31 | Third Lens | -3.201 | 1.730 | T3 | 1.645 | 23.539 | 19.082 | Plastic |
| 32 | | -3.078 | -0.179 | G34 | | | | |
| 80 | Ape. Stop | | 1.696 | | | | | |
| 41 | Fourth Lens | 23.944 | 1.750 | T4 | 1.518 | 64.166 | 8.459 | Glass |
| 42 | | -5.233 | 0.020 | G45 | | | | |
| 51 | Fifth Lens | 13.464 | 1.401 | T5 | 1.647 | 22.418 | -168.493 | Plastic |
| 61 | | 1.821 | 3.978 | T6 | 1.539 | 56.054 | 9.487 | Plastic |
| 62 | Sixth Lens | -3.767 | 0.964 | G6F | | | | |
| 92 | Filter | Infinity | 0.700 | | 1.518 | 64.166 | | |
| 93 | | Infinity | 2.298 | | | | | |
| 91 | Image Plane | Infinity | 0.000 | | | | | |

FIG.42

| No. | K | a4 | a6 | a8 |
|---|---|---|---|---|
| 11 | 0.000000E+00 | 0.000000E+00 | 0.000000E+00 | 0.000000E+00 |
| 12 | 0.000000E+00 | 0.000000E+00 | 0.000000E+00 | 0.000000E+00 |
| 21 | 0.000000E+00 | 1.000418E-02 | -1.497925E-03 | 1.076620E-04 |
| 22 | -1.124265E+00 | 2.500356E-02 | 1.881138E-05 | -1.759862E-03 |
| 71 | 0.000000E+00 | 7.300576E-03 | -2.177572E-03 | 2.837607E-04 |
| 72 | -6.917686E-01 | 8.847267E-03 | -1.560075E-03 | 1.618457E-04 |
| 31 | 0.000000E+00 | 1.306384E-03 | -2.140887E-03 | 1.064581E-03 |
| 32 | 0.000000E+00 | 6.964515E-04 | 3.884225E-04 | -2.471664E-04 |
| 41 | 0.000000E+00 | 0.000000E+00 | 0.000000E+00 | 0.000000E+00 |
| 42 | 0.000000E+00 | 0.000000E+00 | 0.000000E+00 | 0.000000E+00 |
| 51 | 0.000000E+00 | -3.214981E-03 | 6.222625E-05 | -8.718553E-06 |
| 61 | -1.482855E+00 | -1.573840E-04 | -1.251557E-05 | -4.541103E-07 |
| 62 | -6.916027E-01 | 3.382806E-03 | -2.445582E-04 | 1.026973E-05 |
| No. | a10 | a12 | a14 | a16 |
| 11 | 0.000000E+00 | 0.000000E+00 | 0.000000E+00 | 0.000000E+00 |
| 12 | 0.000000E+00 | 0.000000E+00 | 0.000000E+00 | 0.000000E+00 |
| 21 | -3.778990E-06 | 5.420171E-08 | 0.000000E+00 | 0.000000E+00 |
| 22 | 4.706874E-04 | -3.476147E-05 | 0.000000E+00 | 0.000000E+00 |
| 71 | 0.000000E+00 | 0.000000E+00 | 0.000000E+00 | 0.000000E+00 |
| 72 | 8.091857E-05 | -1.334677E-06 | 0.000000E+00 | 0.000000E+00 |
| 31 | -2.950521E-04 | 0.000000E+00 | 0.000000E+00 | 0.000000E+00 |
| 32 | 0.000000E+00 | 0.000000E+00 | 0.000000E+00 | 0.000000E+00 |
| 41 | 0.000000E+00 | 0.000000E+00 | 0.000000E+00 | 0.000000E+00 |
| 42 | 0.000000E+00 | 0.000000E+00 | 0.000000E+00 | 0.000000E+00 |
| 51 | 8.678293E-08 | 0.000000E+00 | 0.000000E+00 | 0.000000E+00 |
| 61 | 2.992663E-08 | -1.200991E-19 | 5.342399E-21 | 0.000000E+00 |
| 62 | -3.924679E-07 | 5.667633E-09 | -3.381440E-11 | 0.000000E+00 |

FIG.43

| Eighth Example | | | | | | | |
|---|---|---|---|---|---|---|---|
| Image height=3.383mm; EFL=1.769mm; HFOV= 103.000deg.; TTL =22.634mm; Fno=2.600 | | | | | | | |
| No. | | Curvature Radius | Ape. Stop Lens Thickness Air Gap | | Refractive Index | Abbe No. | Focal Length | Material |
| | Object | | Infinity | | | | | |
| 11 | First Lens | 20.255 | 0.652 | T1 | 1.839 | 43.128 | -15.316 | Glass |
| 12 | | 7.744 | 1.370 | G12 | | | | |
| 21 | Second Lens | 12.591 | 1.397 | T2 | 1.539 | 56.054 | -4.837 | Plastic |
| 22 | | 2.075 | 2.750 | G27 | | | | |
| 71 | Seventh Lens | -8.289 | 2.563 | T7 | 1.645 | 23.539 | 30.465 | Plastic |
| 72 | | -6.535 | 0.324 | G73 | | | | |
| 31 | Third Lens | -3.392 | 1.746 | T3 | 1.645 | 23.539 | 14.536 | Plastic |
| 32 | | -2.993 | -0.174 | G34 | | | | |
| 80 | Ape. Stop | | 1.382 | | | | | |
| 41 | Fourth Lens | 20.317 | 0.963 | T4 | 1.518 | 64.166 | 6.812 | Glass |
| 42 | | -4.204 | 0.135 | G45 | | | | |
| 51 | Fifth Lens | 23.063 | 2.197 | T5 | 1.647 | 22.418 | -33.577 | Plastic |
| 61 | | 1.415 | 5.637 | T6 | 1.539 | 56.054 | 8.081 | Plastic |
| 62 | Sixth Lens | -3.442 | 0.188 | G6F | | | | |
| 92 | Filter | Infinity | 0.700 | | 1.518 | 64.166 | | |
| 93 | | Infinity | 0.803 | | | | | |
| 91 | Image Plane | Infinity | 0.000 | | | | | |

FIG.44

| No. | K | a4 | a6 | a8 |
|---|---|---|---|---|
| 11 | 0.000000E+00 | 0.000000E+00 | 0.000000E+00 | 0.000000E+00 |
| 12 | 0.000000E+00 | 0.000000E+00 | 0.000000E+00 | 0.000000E+00 |
| 21 | 0.000000E+00 | 5.568537E-03 | -5.299177E-04 | 2.544034E-05 |
| 22 | -1.040200E+00 | 1.912813E-02 | -7.502342E-05 | 2.416280E-04 |
| 71 | 0.000000E+00 | 8.927048E-04 | 6.422411E-05 | 9.984531E-07 |
| 72 | -6.535277E+00 | 0.000000E+00 | 1.150179E-02 | -8.795256E-04 |
| 31 | -3.392087E+00 | 0.000000E+00 | 1.380747E-03 | -3.333639E-03 |
| 32 | -3.392087E+00 | 0.000000E+00 | 1.380747E-03 | -3.333639E-03 |
| 41 | -2.992823E+00 | 0.000000E+00 | 1.143113E-04 | -1.792379E-04 |
| 42 | 0.000000E+00 | 0.000000E+00 | 0.000000E+00 | 0.000000E+00 |
| 51 | 2.306310E+01 | 0.000000E+00 | -4.036042E-03 | 7.212404E-05 |
| 61 | 1.415019E+00 | -1.153022E+00 | 2.723091E-03 | -1.187263E-05 |
| 62 | -3.442151E+00 | -8.205323E-01 | 1.038942E-02 | -1.482007E-03 |
| No. | a10 | a12 | a14 | a16 |
| 11 | 0.000000E+00 | 0.000000E+00 | 0.000000E+00 | 0.000000E+00 |
| 12 | 0.000000E+00 | 0.000000E+00 | 0.000000E+00 | 0.000000E+00 |
| 21 | -6.086978E-07 | 5.925938E-09 | 0.000000E+00 | 0.000000E+00 |
| 22 | -1.026111E-04 | 1.478030E-05 | 0.000000E+00 | 0.000000E+00 |
| 71 | 0.000000E+00 | 0.000000E+00 | 0.000000E+00 | 0.000000E+00 |
| 72 | 3.977029E-04 | 0.000000E+00 | 0.000000E+00 | 0.000000E+00 |
| 31 | 8.400945E-04 | -2.550785E-04 | 0.000000E+00 | 0.000000E+00 |
| 32 | 8.400945E-04 | -2.550785E-04 | 0.000000E+00 | 0.000000E+00 |
| 41 | -3.570572E-05 | 0.000000E+00 | 0.000000E+00 | 0.000000E+00 |
| 42 | 0.000000E+00 | 0.000000E+00 | 0.000000E+00 | 0.000000E+00 |
| 51 | -3.437599E-05 | 2.343535E-06 | 0.000000E+00 | 0.000000E+00 |
| 61 | 2.238270E-08 | -2.166241E-11 | 1.061470E-14 | -1.752125E-18 |
| 62 | 1.295752E-04 | -6.403099E-06 | 1.489570E-07 | -1.284745E-09 |

FIG.45

| Ninth Example |||||||
|---|---|---|---|---|---|---|
| Image height=2.820mm; EFL=1.129mm; HFOV= 103.000deg.; TTL =15.052mm; Fno=2.600 |||||||
| No. | Curvature Radius | Ape. Stop Lens Thickness Air Gap | | Refractive Index | Abbe No. | Focal Length | Material |
| Object | | Infinity | | | | | |
| 11 | First Lens | 11.849 | 0.393 | T1 | 1.839 | 43.128 | -8.556 | Glass |
| 12 | | 4.401 | 0.704 | G12 | | | |
| 21 | Second Lens | 6.241 | 0.220 | T2 | 1.539 | 56.054 | -4.014 | Plastic |
| 22 | | 1.586 | 2.530 | G27 | | | |
| 71 | Seventh Lens | -6.371 | 1.751 | T7 | 1.645 | 23.539 | 23.422 | Plastic |
| 72 | | -4.963 | 0.293 | G73 | | | |
| 31 | Third Lens | -2.387 | 0.938 | T3 | 1.645 | 23.539 | 13.005 | Plastic |
| 32 | | -2.144 | -0.116 | G34 | | | |
| 80 | Ape. Stop | | 1.154 | | | | |
| 41 | Fourth Lens | 14.931 | 0.914 | T4 | 1.518 | 64.166 | 5.035 | Glass |
| 42 | | -3.096 | 0.088 | G45 | | | |
| 51 | Fifth Lens | 10.134 | 1.133 | T5 | 1.647 | 22.418 | -40.171 | Plastic |
| 61 | | 1.016 | 3.343 | T6 | 1.539 | 56.054 | 5.864 | Plastic |
| 62 | Sixth Lens | -2.393 | 0.077 | G6F | | | |
| 92 | Filter | Infinity | 0.700 | | 1.518 | 64.166 | |
| 93 | | Infinity | 0.930 | | | | |
| 91 | Image Plane | Infinity | 0.000 | | | | |

FIG.46

| No. | K | a4 | a6 | a8 |
|---|---|---|---|---|
| 11 | 0.000000E+00 | 0.000000E+00 | 0.000000E+00 | 0.000000E+00 |
| 12 | 0.000000E+00 | 0.000000E+00 | 0.000000E+00 | 0.000000E+00 |
| 21 | 0.000000E+00 | 2.486843E-02 | -5.942747E-03 | 6.927258E-04 |
| 22 | 1.586211E+00 | -1.040200E+00 | 3.273323E-02 | 7.004527E-03 |
| 71 | -6.370565E+00 | 0.000000E+00 | 8.803089E-04 | 1.555118E-03 |
| 72 | -4.962727E+00 | 0.000000E+00 | 2.833488E-02 | -7.882280E-04 |
| 31 | -2.387328E+00 | 0.000000E+00 | 5.920219E-03 | -1.333351E-02 |
| 32 | -2.144333E+00 | 0.000000E+00 | -8.023955E-04 | 8.230725E-04 |
| 41 | 0.000000E+00 | 0.000000E+00 | 0.000000E+00 | 0.000000E+00 |
| 42 | 0.000000E+00 | 0.000000E+00 | 0.000000E+00 | 0.000000E+00 |
| 51 | 1.013396E+01 | 0.000000E+00 | -1.152839E-02 | 7.675331E-04 |
| 61 | 1.016393E+00 | -1.198161E+00 | 4.214831E-03 | -2.743500E-05 |
| 62 | -2.392875E+00 | -9.485534E-01 | 2.889541E-02 | -6.209194E-03 |
| No. | a10 | a12 | a14 | a16 |
| 11 | 0.000000E+00 | 0.000000E+00 | 0.000000E+00 | 0.000000E+00 |
| 12 | 0.000000E+00 | 0.000000E+00 | 0.000000E+00 | 0.000000E+00 |
| 21 | -3.997611E-05 | 9.303016E-07 | 0.000000E+00 | 0.000000E+00 |
| 22 | -6.050230E-03 | 1.316149E-03 | -8.941724E-05 | 0.000000E+00 |
| 71 | -1.305984E-04 | 0.000000E+00 | 0.000000E+00 | 0.000000E+00 |
| 72 | 2.148519E-03 | 0.000000E+00 | 0.000000E+00 | 0.000000E+00 |
| 31 | 6.571232E-03 | -4.264816E-03 | 0.000000E+00 | 0.000000E+00 |
| 32 | -2.456247E-03 | 0.000000E+00 | 0.000000E+00 | 0.000000E+00 |
| 41 | 0.000000E+00 | 0.000000E+00 | 0.000000E+00 | 0.000000E+00 |
| 42 | 0.000000E+00 | 0.000000E+00 | 0.000000E+00 | 0.000000E+00 |
| 51 | -3.212374E-04 | 3.007809E-05 | 0.000000E+00 | 0.000000E+00 |
| 61 | 7.721656E-08 | -1.115696E-10 | 8.166094E-14 | -2.271397E-17 |
| 62 | 9.370131E-04 | -8.744049E-05 | 3.882397E-06 | -6.360044E-08 |

FIG.47

| Tenth Example |||||||
|---|---|---|---|---|---|---|
| Image height=2.030mm; EFL=1.390mm; HFOV= 103.000deg.; TTL =18.076mm; Fno=2.400 |||||||
| No. | | Curvature Radius | Ape. Stop Lens Thickness Air Gap | Refractive Index | Abbe No. | Focal Length | Material |
| | Object | | Infinity | | | | |
| 11 | First Lens | 11.522 | 1.281 | T1 | 1.839 | 43.128 | -5.075 | Glass |
| 12 | | 2.950 | 1.958 | G12 | | | | |
| 21 | Second Lens | 3.364 | 1.553 | T2 | 1.539 | 56.054 | -9.826 | Plastic |
| 22 | | 1.725 | 1.153 | G27 | | | | |
| 71 | Seventh Lens | -3.778 | 1.407 | T7 | 1.645 | 23.539 | 15.818 | Plastic |
| 72 | | -3.159 | 0.149 | G73 | | | | |
| 31 | Third Lens | -2.758 | 1.947 | T3 | 1.645 | 23.539 | 12.137 | Plastic |
| 32 | | -2.603 | 0.037 | G34 | | | | |
| 80 | Ape. Stop | | 0.113 | | | | |
| 41 | Fourth Lens | 6.576 | 2.541 | T4 | 1.518 | 64.166 | 5.004 | Glass |
| 42 | | -3.718 | 0.020 | G45 | | | | |
| 51 | Fifth Lens | 16.460 | 0.664 | T5 | 1.647 | 22.418 | -29.908 | Plastic |
| 61 | | 1.178 | 3.337 | T6 | 1.539 | 56.054 | 21.571 | Plastic |
| 62 | Sixth Lens | -4.664 | 0.097 | G6F | | | | |
| 92 | Filter | Infinity | 0.700 | | 1.518 | 64.166 | | |
| 93 | | Infinity | 1.120 | | | | | |
| 91 | Image Plane | Infinity | 0.000 | | | | | |

FIG.48

| No. | K | a4 | a6 | a8 |
|---|---|---|---|---|
| 11 | 0.000000E+00 | 0.000000E+00 | 0.000000E+00 | 0.000000E+00 |
| 12 | 0.000000E+00 | 0.000000E+00 | 0.000000E+00 | 0.000000E+00 |
| 21 | 3.364322E+00 | 0.000000E+00 | -1.058605E-02 | -7.338831E-04 |
| 22 | 1.724550E+00 | -1.040200E+00 | -5.392505E-03 | 1.451919E-03 |
| 71 | -3.777887E+00 | 0.000000E+00 | -8.630621E-04 | 2.267460E-03 |
| 72 | -3.158865E+00 | 0.000000E+00 | 1.819576E-02 | -1.241930E-03 |
| 31 | -2.758012E+00 | 0.000000E+00 | 4.462944E-03 | -4.362304E-03 |
| 32 | -2.603316E+00 | 0.000000E+00 | 3.007735E-03 | -1.527866E-04 |
| 41 | 0.000000E+00 | 0.000000E+00 | 0.000000E+00 | 0.000000E+00 |
| 42 | 0.000000E+00 | 0.000000E+00 | 0.000000E+00 | 0.000000E+00 |
| 51 | 1.645998E+01 | 0.000000E+00 | -8.328125E-03 | -2.399601E-04 |
| 61 | 1.177675E+00 | -1.066678E+00 | 3.974080E-03 | -2.292974E-05 |
| 62 | -4.664292E+00 | 4.964797E-01 | -9.226015E-03 | 1.579309E-03 |
| No. | a10 | a12 | a14 | a16 |
| 11 | 0.000000E+00 | 0.000000E+00 | 0.000000E+00 | 0.000000E+00 |
| 12 | 0.000000E+00 | 0.000000E+00 | 0.000000E+00 | 0.000000E+00 |
| 21 | 2.103251E-04 | -1.722122E-05 | 3.139124E-07 | 0.000000E+00 |
| 22 | 9.965749E-04 | 2.500842E-04 | 3.761899E-07 | 0.000000E+00 |
| 71 | -3.425192E-04 | 0.000000E+00 | 0.000000E+00 | 0.000000E+00 |
| 72 | 5.804351E-04 | 0.000000E+00 | 0.000000E+00 | 0.000000E+00 |
| 31 | 9.667507E-04 | -3.333267E-04 | 0.000000E+00 | 0.000000E+00 |
| 32 | 8.047564E-05 | 0.000000E+00 | 0.000000E+00 | 0.000000E+00 |
| 41 | 0.000000E+00 | 0.000000E+00 | 0.000000E+00 | 0.000000E+00 |
| 42 | 0.000000E+00 | 0.000000E+00 | 0.000000E+00 | 0.000000E+00 |
| 51 | -8.126949E-05 | 8.807058E-06 | 0.000000E+00 | 0.000000E+00 |
| 61 | 5.720609E-08 | -7.326791E-11 | 4.747763E-14 | -6.300452E-18 |
| 62 | -1.288144E-04 | -8.704660E-06 | 1.081054E-06 | -2.602923E-08 |

FIG.49

| Eleventh Example ||||||||
|---|---|---|---|---|---|---|---|
| Image height=2.146mm; EFL=1.459mm; HFOV= 103.000deg.; TTL =14.434mm; Fno=2.500 ||||||||
| No. | | Curvature Radius | Ape. Stop Lens Thickness Air Gap | | Refractive Index | Abbe No. | Focal Length | Material |
| | Object | | Infinity | | | | | |
| 11 | First Lens | 11.731 | 0.949 | T1 | 1.839 | 43.128 | -4.990 | Glass |
| 12 | | 2.970 | 0.760 | G12 | | | | |
| 21 | Second Lens | 8.925 | 0.524 | T2 | 1.539 | 56.054 | -5.276 | Plastic |
| 22 | | 2.111 | 1.457 | G27 | | | | |
| 71 | Seventh Lens | -4.945 | 1.511 | T7 | 1.645 | 23.539 | 33.692 | Plastic |
| 72 | | -4.510 | 0.217 | G73 | | | | |
| 31 | Third Lens | -2.450 | 0.987 | T3 | 1.645 | 23.539 | 10.627 | Plastic |
| 32 | | -2.090 | -0.178 | G34 | | | | |
| 80 | Ape. Stop | | 0.328 | | | | | |
| 41 | Fourth Lens | 14.393 | 1.404 | T4 | 1.518 | 64.166 | 4.301 | Glass |
| 42 | | -2.550 | 0.372 | G45 | | | | |
| 51 | Fifth Lens | 24.631 | 1.289 | T5 | 1.647 | 22.418 | -20.914 | Plastic |
| 61 | | 1.065 | 2.995 | T6 | 1.539 | 56.054 | 16.706 | Plastic |
| 62 | Sixth Lens | -3.990 | 0.134 | G6F | | | | |
| 92 | Filter | Infinity | 0.700 | | 1.518 | 64.166 | | |
| 93 | | Infinity | 0.987 | | | | | |
| 91 | Image Plane | Infinity | 0.000 | | | | | |

FIG.50

| No. | K | a4 | a6 | a8 |
|---|---|---|---|---|
| 11 | 0.000000E+00 | 0.000000E+00 | 0.000000E+00 | 0.000000E+00 |
| 12 | 0.000000E+00 | 0.000000E+00 | 0.000000E+00 | 0.000000E+00 |
| 21 | 8.924742E+00 | 0.000000E+00 | 2.862953E-03 | 1.549168E-03 |
| 22 | 2.111252E+00 | -1.040200E+00 | 3.487281E-02 | 6.126671E-03 |
| 71 | -4.944748E+00 | 0.000000E+00 | 1.441374E-02 | 4.017973E-03 |
| 72 | -4.510164E+00 | 0.000000E+00 | 4.723711E-02 | 1.896577E-03 |
| 31 | -2.450450E+00 | 0.000000E+00 | 4.997324E-03 | -6.129361E-03 |
| 32 | -2.089791E+00 | 0.000000E+00 | -3.139482E-04 | -1.144029E-03 |
| 41 | 0.000000E+00 | 0.000000E+00 | 0.000000E+00 | 0.000000E+00 |
| 42 | 0.000000E+00 | 0.000000E+00 | 0.000000E+00 | 0.000000E+00 |
| 51 | 2.463121E+01 | 0.000000E+00 | -1.144794E-02 | -4.652353E-04 |
| 61 | 1.065471E+00 | -1.157772E+00 | 1.403976E-02 | -1.667922E-04 |
| 62 | -3.989845E+00 | -1.834865E-01 | -7.774794E-03 | 1.479507E-03 |
| No. | a10 | a12 | a14 | a16 |
| 11 | 0.000000E+00 | 0.000000E+00 | 0.000000E+00 | 0.000000E+00 |
| 12 | 0.000000E+00 | 0.000000E+00 | 0.000000E+00 | 0.000000E+00 |
| 21 | -5.473366E-05 | -3.541374E-05 | 2.931128E-06 | 0.000000E+00 |
| 22 | 6.493085E-03 | -2.005923E-03 | 1.180489E-03 | 0.000000E+00 |
| 71 | -2.125360E-03 | 0.000000E+00 | 0.000000E+00 | 0.000000E+00 |
| 72 | -8.209286E-03 | 0.000000E+00 | 0.000000E+00 | 0.000000E+00 |
| 31 | -2.016109E-02 | 7.439061E-03 | 0.000000E+00 | 0.000000E+00 |
| 32 | -4.704897E-04 | 0.000000E+00 | 0.000000E+00 | 0.000000E+00 |
| 41 | 0.000000E+00 | 0.000000E+00 | 0.000000E+00 | 0.000000E+00 |
| 42 | 0.000000E+00 | 0.000000E+00 | 0.000000E+00 | 0.000000E+00 |
| 51 | 2.427653E-05 | 9.076759E-06 | 0.000000E+00 | 0.000000E+00 |
| 61 | 8.567870E-07 | -2.259440E-09 | 3.019418E-12 | -1.721314E-15 |
| 62 | -1.160512E-04 | 2.405712E-06 | 3.684069E-08 | -1.272453E-09 |

FIG.51

| Twelfth Example |||||||
|---|---|---|---|---|---|---|
| Image height=1.675mm; EFL=0.975mm; HFOV= 103.000deg.; TTL =14.015mm; Fno=2.500 |||||||
| No. | | Curvature Radius | Ape. Stop Lens Thickness Air Gap | Refractive Index | Abbe No. | Focal Length | Material |
| | Object | | Infinity | | | | |
| 11 | First Lens | 9.395 | 1.325 | T1 | 1.839 | 43.128 | -2.992 | Glass |
| 12 | | 1.853 | 1.372 | G12 | | | |
| 21 | Second Lens | 7.201 | 0.404 | T2 | 1.539 | 56.054 | -5.749 | Plastic |
| 22 | | 2.123 | 1.020 | G27 | | | |
| 71 | Seventh Lens | -6.800 | 0.787 | T7 | 1.645 | 23.539 | 9.912 | Plastic |
| 72 | | -3.444 | 0.212 | G73 | | | |
| 31 | Third Lens | -2.001 | 1.147 | T3 | 1.645 | 23.539 | 13.070 | Plastic |
| 32 | | -1.980 | 0.380 | G34 | | | |
| 80 | Ape. Stop | | 0.177 | | | | |
| 41 | Fourth Lens | 10.525 | 2.247 | T4 | 1.518 | 64.166 | 5.388 | Glass |
| 42 | | -3.524 | 0.020 | G45 | | | |
| 51 | Fifth Lens | 9.475 | 0.461 | T5 | 1.647 | 22.418 | -58.637 | Plastic |
| 61 | | 1.127 | 1.930 | T6 | 1.539 | 56.054 | 6.504 | Plastic |
| 62 | Sixth Lens | -2.414 | 0.492 | G6F | | | |
| 92 | Filter | Infinity | 0.700 | | 1.518 | 64.166 | |
| 93 | | Infinity | 1.344 | | | | |
| 91 | Image Plane | Infinity | 0.000 | | | | |

FIG.52

| No. | K | a4 | a6 | a8 |
|---|---|---|---|---|
| 11 | 0.000000E+00 | 0.000000E+00 | 0.000000E+00 | 0.000000E+00 |
| 12 | 0.000000E+00 | 0.000000E+00 | 0.000000E+00 | 0.000000E+00 |
| 21 | 7.201047E+00 | 0.000000E+00 | 2.903523E-02 | -1.605048E-02 |
| 22 | 2.123059E+00 | -1.056978E+00 | 5.348657E-02 | -1.692251E-02 |
| 71 | -6.799973E+00 | 0.000000E+00 | 1.493151E-02 | -4.391944E-03 |
| 72 | -3.443530E+00 | 0.000000E+00 | 1.747219E-02 | -5.561730E-03 |
| 31 | -2.000755E+00 | 0.000000E+00 | -1.043164E-04 | -3.228967E-03 |
| 32 | -1.980022E+00 | 0.000000E+00 | 7.072766E-03 | 2.046167E-03 |
| 41 | 0.000000E+00 | 0.000000E+00 | 0.000000E+00 | 0.000000E+00 |
| 42 | 0.000000E+00 | 0.000000E+00 | 0.000000E+00 | 0.000000E+00 |
| 51 | 9.474989E+00 | 0.000000E+00 | -1.905843E-02 | 2.786261E-04 |
| 61 | 1.126801E+00 | -1.414179E+00 | -5.462766E-04 | -2.175006E-04 |
| 62 | -2.413910E+00 | -3.442147E-01 | 4.301040E-03 | -1.476973E-03 |
| No. | a10 | a12 | a14 | a16 |
| 11 | 0.000000E+00 | 0.000000E+00 | 0.000000E+00 | 0.000000E+00 |
| 12 | 0.000000E+00 | 0.000000E+00 | 0.000000E+00 | 0.000000E+00 |
| 21 | 4.118285E-03 | -5.198454E-04 | 2.467634E-05 | 0.000000E+00 |
| 22 | 1.614545E-04 | 2.275765E-03 | -3.974245E-04 | 0.000000E+00 |
| 71 | 9.712493E-04 | 0.000000E+00 | 0.000000E+00 | 0.000000E+00 |
| 72 | 3.708157E-03 | 0.000000E+00 | 0.000000E+00 | 0.000000E+00 |
| 31 | 7.493865E-03 | -4.285084E-03 | 0.000000E+00 | 0.000000E+00 |
| 32 | -6.941058E-04 | 0.000000E+00 | 0.000000E+00 | 0.000000E+00 |
| 41 | 0.000000E+00 | 0.000000E+00 | 0.000000E+00 | 0.000000E+00 |
| 42 | 0.000000E+00 | 0.000000E+00 | 0.000000E+00 | 0.000000E+00 |
| 51 | -4.257899E-04 | 2.750221E-05 | 0.000000E+00 | 0.000000E+00 |
| 61 | -5.742853E-05 | 4.979961E-08 | -3.582710E-16 | 3.525507E-17 |
| 62 | 2.068801E-04 | -6.671929E-05 | 3.730182E-06 | -8.923281E-08 |

FIG.53

| Example | Example 1 | Example 2 | Example 3 | Example 4 | Example 5 |
|---|---|---|---|---|---|
| T1 | 0.611 | 0.478 | 0.591 | 1.026 | 0.922 |
| G12 | 1.282 | 1.004 | 0.978 | 0.821 | 0.738 |
| T2 | 0.887 | 0.300 | 0.300 | 0.593 | 0.756 |
| G23 | 1.385 | 2.639 | 1.923 | 2.275 | 2.360 |
| T3 | 1.099 | 1.001 | 1.469 | 1.348 | 1.186 |
| G34 | 0.303 | 0.155 | 1.154 | 0.711 | 0.050 |
| T4 | 1.554 | 1.235 | 1.309 | 0.879 | 1.384 |
| G45 | 0.205 | 0.299 | 0.354 | 0.332 | 0.308 |
| T5 | 0.327 | 0.358 | 0.691 | 0.489 | 0.819 |
| G56 | 0.010 | 0.011 | 0.012 | 0.011 | 0.012 |
| T6 | 1.385 | 1.643 | 2.723 | 1.710 | 2.361 |
| G6F | 0.632 | 0.525 | 0.200 | 0.406 | 0.565 |
| TF | 0.700 | 0.700 | 0.700 | 0.700 | 0.700 |
| GFP | 0.884 | 0.789 | 0.508 | 0.625 | 0.914 |
| AAG | 3.186 | 4.108 | 4.420 | 4.151 | 3.468 |
| ALT | 5.863 | 5.015 | 7.083 | 6.044 | 7.427 |
| BFL | 2.216 | 2.014 | 1.408 | 1.731 | 2.179 |
| TTL | 11.266 | 11.137 | 12.912 | 11.926 | 13.074 |
| TL | 9.049 | 9.122 | 11.504 | 10.195 | 10.895 |
| EFL | 1.132 | 1.371 | 1.105 | 0.963 | 1.973 |

FIG.54

| Example | Example 1 | Example 2 | Example 3 | Example 4 | Example 5 |
|---|---|---|---|---|---|
| (G12+T3+G34)/EFL | 2.371 | 1.575 | 3.258 | 2.992 | 1.000 |
| AAG/G23 | 2.300 | 1.556 | 2.299 | 1.824 | 1.470 |
| AAG/T6 | 2.300 | 2.500 | 1.623 | 2.427 | 1.469 |
| ALT/G23 | 4.233 | 1.900 | 3.683 | 2.657 | 3.148 |
| ALT/T6 | 4.233 | 3.052 | 2.601 | 3.534 | 3.146 |
| G12/T1 | 2.100 | 2.100 | 1.653 | 0.800 | 0.800 |
| G12/(T2+G34+G45) | 0.919 | 1.331 | 0.541 | 0.502 | 0.662 |
| (G34+G45+T5+G56)/EFL | 0.747 | 0.600 | 2.000 | 1.603 | 0.603 |
| BFL/G23 | 1.600 | 0.763 | 0.732 | 0.761 | 0.923 |
| BFL/T6 | 1.600 | 1.226 | 0.517 | 1.012 | 0.923 |
| T3/EFL | 0.971 | 0.730 | 1.329 | 1.400 | 0.601 |
| (T2+G34+G45)/EFL | 1.233 | 0.550 | 1.636 | 1.700 | 0.565 |
| TTL/(T3+G34+G45+T5+G56) | 5.794 | 6.108 | 3.510 | 4.125 | 5.506 |
| TL/(T2+G34+G45) | 6.483 | 12.100 | 6.363 | 6.230 | 9.775 |
| (T1+T3)/T4 | 1.100 | 1.198 | 1.574 | 2.700 | 1.524 |
| AAG/(G34+G45+T5+G56) | 3.769 | 4.994 | 2.000 | 2.690 | 2.916 |
| (T1+G12)/T4 | 1.218 | 1.200 | 1.199 | 2.101 | 1.200 |
| TL/(T4+BFL) | 2.400 | 2.808 | 4.234 | 3.906 | 3.058 |

FIG.55

| Example | Example 6 | Example 7 | Example 8 | Example 9 | Example 10 | Example 11 | Example 12 |
|---|---|---|---|---|---|---|---|
| T1 | 1.678 | 1.010 | 0.652 | 0.393 | 1.281 | 0.949 | 1.325 |
| G12 | 2.242 | 1.807 | 1.370 | 0.704 | 1.958 | 0.760 | 1.372 |
| T2 | 0.670 | 1.490 | 1.397 | 0.220 | 1.553 | 0.524 | 0.404 |
| G23 | 4.065 | 2.572 | 5.637 | 4.574 | 2.708 | 3.185 | 2.018 |
| G27 | 2.068 | 1.315 | 2.750 | 2.530 | 1.153 | 1.457 | 1.020 |
| T7 | 1.707 | 0.731 | 2.563 | 1.751 | 1.407 | 1.511 | 0.787 |
| G73 | 0.290 | 0.526 | 0.324 | 0.293 | 0.149 | 0.217 | 0.212 |
| T3 | 1.100 | 1.730 | 1.746 | 0.938 | 1.947 | 0.987 | 1.147 |
| G34 | 0.919 | 1.517 | 1.208 | 1.038 | 0.150 | 0.150 | 0.556 |
| T4 | 2.453 | 1.750 | 0.963 | 0.914 | 2.541 | 1.404 | 2.247 |
| G45 | 0.020 | 0.020 | 0.135 | 0.088 | 0.020 | 0.372 | 0.020 |
| T5 | 0.953 | 1.401 | 2.197 | 1.133 | 0.664 | 1.289 | 0.461 |
| G56 | 0.000 | 0.000 | 0.000 | 0.000 | 0.000 | 0.000 | 0.000 |
| T6 | 3.680 | 3.978 | 5.637 | 3.343 | 3.337 | 2.995 | 1.930 |
| G6F | 0.043 | 0.964 | 0.188 | 0.077 | 0.097 | 0.134 | 0.492 |
| TF | 0.700 | 0.700 | 0.700 | 0.700 | 0.700 | 0.700 | 0.700 |
| GFP | 0.896 | 2.298 | 0.803 | 0.930 | 1.120 | 0.987 | 1.344 |
| AAG | 7.246 | 5.916 | 8.351 | 6.404 | 4.837 | 4.466 | 3.966 |
| ALT | 12.241 | 12.089 | 15.156 | 8.692 | 12.729 | 9.659 | 8.300 |
| BFL | 1.639 | 3.961 | 1.691 | 1.707 | 1.918 | 1.820 | 2.536 |
| TTL | 19.418 | 21.235 | 22.635 | 15.052 | 18.076 | 14.435 | 14.016 |
| TL | 17.779 | 17.274 | 20.943 | 13.345 | 16.159 | 12.614 | 11.480 |
| EFL | 0.946 | 1.853 | 1.770 | 1.129 | 1.391 | 1.459 | 0.975 |

FIG.56

| Example | Example 6 | Example 7 | Example 8 | Example 9 | Example 10 | Example 11 | Example 12 |
|---|---|---|---|---|---|---|---|
| (G12+T3+G34)/EFL | 4.502 | 2.727 | 2.443 | 2.374 | 2.916 | 1.300 | 3.153 |
| AAG/G23 | 1.782 | 2.300 | 1.481 | 1.400 | 1.786 | 1.402 | 1.965 |
| AAG/T6 | 1.969 | 1.487 | 1.481 | 1.916 | 1.449 | 1.491 | 2.055 |
| ALT/G23 | 3.011 | 4.700 | 2.688 | 1.900 | 4.700 | 3.033 | 4.112 |
| ALT/T6 | 3.327 | 3.039 | 2.688 | 2.600 | 3.815 | 3.225 | 4.300 |
| G12/T1 | 1.336 | 1.789 | 2.100 | 1.791 | 1.529 | 0.800 | 1.035 |
| G12/(T2+G34+G45) | 1.393 | 0.597 | 0.500 | 0.523 | 1.137 | 0.726 | 1.400 |
| (G34+G45+T5+G56)/EFL | 2.000 | 1.585 | 2.000 | 2.000 | 0.600 | 1.241 | 1.064 |
| BFL/G23 | 0.403 | 1.540 | 0.300 | 0.373 | 0.708 | 0.572 | 1.256 |
| BFL/T6 | 0.445 | 0.996 | 0.300 | 0.511 | 0.575 | 0.608 | 1.314 |
| T3/EFL | 1.162 | 0.933 | 0.986 | 0.831 | 1.400 | 0.677 | 1.176 |
| (T2+G34+G45)/EFL | 1.700 | 1.633 | 1.548 | 1.192 | 1.239 | 0.717 | 1.005 |
| TTL/(T3+G34+G45+T5+G56) | 6.490 | 4.550 | 4.282 | 4.709 | 6.500 | 5.160 | 6.418 |
| TL/(T2+G34+G45) | 11.052 | 5.707 | 7.642 | 9.917 | 9.380 | 12.062 | 11.714 |
| (T1+T3)/T4 | 1.133 | 1.565 | 2.490 | 1.456 | 1.271 | 1.380 | 1.100 |
| AAG/(G34+G45+T5+G56) | 3.828 | 2.014 | 2.359 | 2.836 | 5.797 | 2.467 | 3.825 |
| (T1+G12)/T4 | 1.598 | 1.609 | 2.100 | 1.200 | 1.275 | 1.218 | 1.200 |
| TL/(T4+BFL) | 4.345 | 3.025 | 7.890 | 5.091 | 3.625 | 3.913 | 2.400 |

FIG.57

| Thirteenth example |||||||
| --- | --- | --- | --- | --- | --- | --- |
| Image height=2.240mm; EFL=1.000mm; HFOV= 104.500deg.; TTL =11.869mm; Fno=2.060 |||||||
| No. | | Curvature Radius | Ape. Stop Lens Element Thickness Air Gap | | Refractive Index | Abbe No. | Focal Length | Material |
| | Object | | Infinity | | | | | |
| 11 | First Lens Element | 11.430 | 0.850 | T1 | 1.552 | 54.617 | -6.269 | Glass |
| 12 | | 2.587 | 2.017 | G12 | | | | |
| 21 | Second Lens Element | 2.349 | 0.550 | T2 | 1.533 | 55.811 | -2.558 | Plastic |
| 22 | | 0.793 | 1.167 | G23 | | | | |
| 31 | Third Lens Element | -4.096 | 1.556 | T3 | 1.645 | 23.539 | 2.576 | Plastic |
| 32 | | -1.357 | -0.120 | G34 | | | | |
| 80 | Ape. Stop | Infinity | 0.327 | | | | | |
| 41 | Fourth Lens Element | 126.482 | 0.751 | T4 | 1.533 | 55.811 | 3.839 | Plastic |
| 42 | | -2.077 | 0.123 | G45 | | | | |
| 51 | Fifth Lens Element | -4.062 | 0.489 | T5 | 1.647 | 22.418 | -6.182 | Plastic |
| 52 | | 1.346 | 0.010 | G56 | 1.533 | 55.811 | | Bonding Material |
| 61 | Sixth Lens Element | 1.346 | 2.300 | T6 | 1.533 | 55.811 | 3.338 | Plastic |
| 62 | | -1.780 | 0.534 | G6F | | | | |
| 92 | Filter | Infinity | 0.700 | | 1.518 | 64.166 | | |
| 93 | | Infinity | 0.616 | | | | | |
| 91 | Image Plane | Infinity | 0.000 | | | | | |

FIG. 77

| No. | K | a4 | a6 | a8 |
|---|---|---|---|---|
| 21 | -4.740183E+00 | -6.149343E-02 | 3.268385E-02 | -9.402856E-03 |
| 22 | -1.162743E+00 | -1.845567E-01 | 6.107447E-01 | -1.515700E+00 |
| 31 | -9.074249E-01 | -9.204404E-02 | 1.476091E-03 | 2.046705E-02 |
| 32 | -2.007377E+00 | 9.092720E-02 | -1.300481E-01 | 1.237489E-01 |
| 41 | 0.000000E+00 | 2.034503E-01 | -1.335603E-01 | 1.046410E-01 |
| 42 | 0.000000E+00 | -2.568432E-02 | 1.506257E-01 | -2.961125E-01 |
| 51 | -3.419732E+00 | 2.880304E-02 | -8.159615E-02 | -5.448099E-02 |
| 52 | -2.186927E-01 | 4.857474E-01 | -7.911162E-01 | 5.860389E-01 |
| 61 | -2.186927E-01 | 4.857474E-01 | -7.911162E-01 | 5.860389E-01 |
| 62 | 0.000000E+00 | 4.842779E-02 | -1.314372E-02 | 1.154230E-02 |
| No. | a10 | a12 | a14 | a16 |
| 21 | 1.703675E-03 | -1.734278E-04 | 7.516475E-06 | 0.000000E+00 |
| 22 | 2.371862E+00 | -2.117205E+00 | 1.003954E+00 | -1.949453E-01 |
| 31 | -4.424554E-03 | 0.000000E+00 | 0.000000E+00 | 0.000000E+00 |
| 32 | -4.575358E-02 | 0.000000E+00 | 0.000000E+00 | 0.000000E+00 |
| 41 | -5.255471E-02 | 1.336203E-02 | 0.000000E+00 | 0.000000E+00 |
| 42 | 2.473881E-01 | -9.417795E-02 | 1.477021E-02 | 0.000000E+00 |
| 51 | 2.892835E-02 | 0.000000E+00 | 0.000000E+00 | 0.000000E+00 |
| 52 | -2.624396E-01 | 6.609396E-02 | -7.157970E-03 | 0.000000E+00 |
| 61 | -2.624396E-01 | 6.609396E-02 | -7.157970E-03 | 0.000000E+00 |
| 62 | -3.920243E-03 | 7.731257E-04 | 0.000000E+00 | 0.000000E+00 |

FIG. 78

| Fourteenth example ||||||||
|---|---|---|---|---|---|---|---|
| Image height=2.240mm; EFL=0.990mm; HFOV=117.000deg.; TTL =12.944mm; Fno=2.060 ||||||||
| No. | | Curvature Radius | Ape. Stop Lens Element Thickness Air Gap | | Refractive Index | Abbe No. | Focal Length | Material |
| | Object | Infinity | Infinity | | | | | |
| 11 | First Lens Element | 15.101 | 2.017 | T1 | 1.553 | 54.164 | -7.200 | Glass |
| 12 | | 3.000 | 2.188 | G12 | | | | |
| 21 | Second Lens Element | 2.361 | 0.550 | T2 | 1.533 | 55.811 | -2.622 | Plastic |
| 22 | | 0.807 | 1.239 | G23 | | | | |
| 31 | Third Lens Element | -3.264 | 1.415 | T3 | 1.645 | 23.539 | 2.644 | Plastic |
| 32 | | -1.310 | -0.099 | G34 | | | | |
| 80 | Ape. Stop | Infinity | 0.312 | | | | | |
| 41 | Fourth Lens Element | -13.990 | 0.717 | T4 | 1.533 | 55.811 | 3.877 | Plastic |
| 42 | | -1.834 | 0.120 | G45 | | | | |
| 51 | Fifth Lens Element | -4.938 | 0.400 | T5 | 1.647 | 22.418 | -6.963 | Plastic |
| 52 | | 1.319 | 0.010 | G56 | 1.533 | 55.811 | | Bonding Material |
| 61 | Sixth Lens Element | 1.319 | 2.224 | T6 | 1.533 | 55.811 | 3.342 | Plastic |
| 62 | | -1.783 | 0.542 | G6F | | | | |
| 92 | Filter | Infinity | 0.686 | | 1.518 | 64.166 | | |
| 93 | | Infinity | 0.622 | | | | | |
| 91 | Image Plane | Infinity | 0.000 | | | | | |

FIG. 79

| No. | K | a4 | a6 | a8 |
|---|---|---|---|---|
| 21 | -2.583391E+00 | -6.901389E-02 | 3.622506E-02 | -1.083983E-02 |
| 22 | -9.971546E-01 | -1.756539E-01 | 7.101137E-01 | -1.795573E+00 |
| 31 | -5.052862E+00 | -8.891960E-02 | -2.066153E-03 | 2.321170E-02 |
| 32 | -1.959693E+00 | 9.863803E-02 | -1.350420E-01 | 1.207858E-01 |
| 41 | 0.000000E+00 | 2.076968E-01 | -1.566578E-01 | 1.188542E-01 |
| 42 | 0.000000E+00 | -2.227660E-02 | 1.717520E-01 | -3.384339E-01 |
| 51 | -6.321584E+00 | 3.233662E-02 | -7.430604E-02 | -5.226996E-02 |
| 52 | -2.237580E-01 | 4.912713E-01 | -8.760870E-01 | 6.730424E-01 |
| 61 | -2.237580E-01 | 4.912713E-01 | -8.760870E-01 | 6.730424E-01 |
| 62 | 0.000000E+00 | 3.983070E-02 | -1.452785E-02 | 1.340634E-02 |
| No. | a10 | a12 | a14 | a16 |
| 21 | 2.035047E-03 | -2.158684E-04 | 9.735761E-06 | 0.000000E+00 |
| 22 | 2.877336E+00 | -2.635318E+00 | 1.300378E+00 | -2.627568E-01 |
| 31 | -4.620418E-03 | 0.000000E+00 | 0.000000E+00 | 0.000000E+00 |
| 32 | -3.758845E-02 | 0.000000E+00 | 0.000000E+00 | 0.000000E+00 |
| 41 | -6.164355E-02 | 1.663194E-02 | 0.000000E+00 | 0.000000E+00 |
| 42 | 2.956441E-01 | -1.172248E-01 | 1.913121E-02 | 0.000000E+00 |
| 51 | 3.846584E-02 | 0.000000E+00 | 0.000000E+00 | 0.000000E+00 |
| 52 | -3.172491E-01 | 8.226820E-02 | -9.271406E-03 | 0.000000E+00 |
| 61 | -3.172491E-01 | 8.226820E-02 | -9.271406E-03 | 0.000000E+00 |
| 62 | -4.639024E-03 | 9.623218E-04 | 0.000000E+00 | 0.000000E+00 |

FIG. 80

| No. | | Curvature Radius | Ape. Stop Lens Element Thickness Air Gap | | Refractive Index | Abbe No. | Focal Length | Material |
|---|---|---|---|---|---|---|---|---|
| | | | Fifteenth example | | | | | |
| | | Image height=2.058mm; EFL=0.973mm; HFOV=102.500deg.; TTL =12.485mm; Fno=2.060 | | | | | | |
| | Object | Infinity | Infinity | | | | | |
| 11 | First Lens Element | 15.961 | 1.248 | T1 | 1.532 | 51.885 | -7.182 | Glass |
| 12 | | 3.000 | 2.188 | G12 | | | | |
| 21 | Second Lens Element | 1.356 | 0.550 | T2 | 1.533 | 55.811 | -2.953 | Plastic |
| 22 | | 0.626 | 1.520 | G23 | | | | |
| 31 | Third Lens Element | -3.071 | 1.402 | T3 | 1.645 | 23.539 | 2.858 | Plastic |
| 32 | | -1.357 | -0.102 | G34 | | | | |
| 80 | Ape. Stop | Infinity | 0.277 | | | | | |
| 41 | Fourth Lens Element | -20.702 | 0.781 | T4 | 1.533 | 55.811 | 3.653 | Plastic |
| 42 | | -1.804 | 0.120 | G45 | | | | |
| 51 | Fifth Lens Element | -4.653 | 0.400 | T5 | 1.647 | 22.418 | -6.713 | Plastic |
| 52 | | 1.319 | 0.010 | G56 | 1.533 | 55.811 | | Bonding Material |
| 61 | Sixth Lens Element | 1.319 | 2.242 | T6 | 1.533 | 55.811 | 3.353 | Plastic |
| 62 | | -1.788 | 0.542 | G6F | | | | |
| 92 | Filter | Infinity | 0.686 | | 1.518 | 64.166 | | |
| 93 | | Infinity | 0.622 | | | | | |
| 91 | Image Plane | Infinity | 0.000 | | | | | |

FIG. 81

| No. | K | a4 | a6 | a8 |
|---|---|---|---|---|
| 21 | -1.114761E+00 | -7.186301E-02 | 3.572570E-02 | -1.080727E-02 |
| 22 | -1.022388E+00 | -1.748278E-01 | 7.447633E-01 | -1.773627E+00 |
| 31 | -6.352050E+00 | -8.474223E-02 | 5.123884E-04 | 2.233745E-02 |
| 32 | -2.061523E+00 | 1.018332E-01 | -1.335487E-01 | 1.149305E-01 |
| 41 | 0.000000E+00 | 1.943610E-01 | -1.677278E-01 | 1.179701E-01 |
| 42 | 0.000000E+00 | -2.911916E-02 | 1.684330E-01 | -3.426751E-01 |
| 51 | -1.138054E+01 | 3.355467E-02 | -7.409462E-02 | -5.118143E-02 |
| 52 | -2.304493E-01 | 4.823210E-01 | -8.661989E-01 | 6.740063E-01 |
| 61 | -2.304493E-01 | 4.823210E-01 | -8.661989E-01 | 6.740063E-01 |
| 62 | 0.000000E+00 | 4.989091E-02 | -1.459865E-02 | 1.274318E-02 |
| No. | a10 | a12 | a14 | a16 |
| 21 | 2.016465E-03 | -2.158684E-04 | 9.735761E-06 | 0.000000E+00 |
| 22 | 2.848000E+00 | -2.635318E+00 | 1.300378E+00 | -2.627568E-01 |
| 31 | -5.386015E-03 | 0.000000E+00 | 0.000000E+00 | 0.000000E+00 |
| 32 | -3.330965E-02 | 0.000000E+00 | 0.000000E+00 | 0.000000E+00 |
| 41 | -6.348770E-02 | 1.663194E-02 | 0.000000E+00 | 0.000000E+00 |
| 42 | 2.908694E-01 | -1.172248E-01 | 1.913121E-02 | 0.000000E+00 |
| 51 | 3.802247E-02 | 0.000000E+00 | 0.000000E+00 | 0.000000E+00 |
| 52 | -3.182101E-01 | 8.226820E-02 | -9.271406E-03 | 0.000000E+00 |
| 61 | -3.182101E-01 | 8.226820E-02 | -9.271406E-03 | 0.000000E+00 |
| 62 | -4.792891E-03 | 9.623218E-04 | 0.000000E+00 | 0.000000E+00 |

FIG. 82

| Sixteenth example |||||||
|---|---|---|---|---|---|---|
| Image height=2.056mm; EFL=0.953mm; HFOV=116.000 deg.; TTL =13.100mm; Fno=2.060 |||||||
| No. | | Curvature Radius | Ape. Stop Lens Element Thickness Air Gap | | Refractive Index | Abbe No. | Focal Length | Material |
| | Object | Infinity | Infinity | | | | | |
| 11 | First Lens Element | 15.372 | 1.992 | T1 | 1.552 | 54.999 | -7.165 | Glass |
| 12 | | 3.000 | 2.188 | G12 | | | | |
| 21 | Second Lens Element | 2.099 | 0.550 | T2 | 1.533 | 55.811 | -2.754 | Plastic |
| 22 | | 0.786 | 1.281 | G23 | | | | |
| 31 | Third Lens Element | -3.071 | 1.539 | T3 | 1.645 | 23.539 | 2.736 | Plastic |
| 32 | | -1.340 | -0.084 | G34 | | | | |
| 80 | Ape. Stop | Infinity | 0.316 | | | | | |
| 41 | Fourth Lens Element | -9.450 | 0.729 | T4 | 1.533 | 55.811 | 3.670 | Plastic |
| 42 | | -1.665 | 0.120 | G45 | | | | |
| 51 | Fifth Lens Element | -4.654 | 0.400 | T5 | 1.647 | 22.418 | -6.713 | Plastic |
| 52 | | 1.319 | 0.010 | G56 | 1.533 | 55.811 | | Bonding Material |
| 61 | Sixth Lens Element | 1.319 | 2.211 | T6 | 1.533 | 55.811 | 3.298 | Plastic |
| 62 | | -1.759 | 0.542 | G6F | | | | |
| 92 | Filter | Infinity | 0.686 | | 1.518 | 64.166 | | |
| 93 | | Infinity | 0.622 | | | | | |
| 91 | Image Plane | Infinity | 0.000 | | | | | |

FIG. 83

| No. | K | a4 | a6 | a8 |
|---|---|---|---|---|
| 21 | -3.195410E+00 | -6.929445E-02 | 3.660320E-02 | -1.082704E-02 |
| 22 | -1.057061E+00 | -1.895910E-01 | 7.315724E-01 | -1.814684E+00 |
| 31 | -6.352050E+00 | -8.474223E-02 | 5.123884E-04 | 2.233745E-02 |
| 32 | -1.983068E+00 | 1.017736E-01 | -1.249620E-01 | 1.147237E-01 |
| 41 | 0.000000E+00 | 1.990757E-01 | -1.658482E-01 | 1.182366E-01 |
| 42 | 0.000000E+00 | -1.878346E-02 | 1.720005E-01 | -3.398125E-01 |
| 51 | -3.589551E+00 | 3.061770E-02 | -6.881013E-02 | -4.929529E-02 |
| 52 | -2.123249E-01 | 4.854557E-01 | -8.766060E-01 | 6.736530E-01 |
| 61 | -2.123249E-01 | 4.854557E-01 | -8.766060E-01 | 6.736530E-01 |
| 62 | 0.000000E+00 | 3.572609E-02 | -1.428334E-02 | 1.356700E-02 |
| No. | a10 | a12 | a14 | a16 |
| 21 | 2.030442E-03 | -2.158684E-04 | 9.735761E-06 | 0.000000E+00 |
| 22 | 2.880227E+00 | -2.635318E+00 | 1.300378E+00 | -2.627568E-01 |
| 31 | -5.386015E-03 | 0.000000E+00 | 0.000000E+00 | 0.000000E+00 |
| 32 | -3.547084E-02 | 0.000000E+00 | 0.000000E+00 | 0.000000E+00 |
| 41 | -6.307978E-02 | 1.663194E-02 | 0.000000E+00 | 0.000000E+00 |
| 42 | 2.917282E-01 | -1.172248E-01 | 1.913121E-02 | 0.000000E+00 |
| 51 | 3.975441E-02 | 0.000000E+00 | 0.000000E+00 | 0.000000E+00 |
| 52 | -3.177267E-01 | 8.226820E-02 | -9.271406E-03 | 0.000000E+00 |
| 61 | -3.177267E-01 | 8.226820E-02 | -9.271406E-03 | 0.000000E+00 |
| 62 | -4.493632E-03 | 9.623218E-04 | 0.000000E+00 | 0.000000E+00 |

FIG. 84

| Seventeenth example | | | | | | | |
|---|---|---|---|---|---|---|---|
| Image height=2.240mm; EFL=1.191mm; HFOV=104.500 deg.; TTL =14.066mm; Fno=2.200 | | | | | | | |
| No. | | Curvature Radius | Ape. Stop Lens Element Thickness Air Gap | | Refractive Index | Abbe No. | Focal Length | Material |
| | Object | Infinity | Infinity | | | | | |
| 11 | First Lens Element | 15.809 | 2.525 | T1 | 1.622 | 60.367 | -8.072 | Glass |
| 12 | | 3.578 | 1.904 | G12 | | | | |
| 21 | Second Lens Element | 11.108 | 0.571 | T2 | 1.533 | 55.811 | -3.027 | Plastic |
| 22 | | 1.384 | 1.456 | G23 | | | | |
| 31 | Third Lens Element | -14.404 | 2.173 | T3 | 1.647 | 22.418 | 15.352 | Plastic |
| 32 | | -6.229 | 0.208 | G34 | | | | |
| 80 | Ape. Stop | Infinity | 0.081 | | | | | |
| 41 | Fourth Lens Element | 2.415 | 1.326 | T4 | 1.533 | 55.811 | 2.942 | Plastic |
| 42 | | -3.622 | 0.070 | G45 | | | | |
| 51 | Fifth Lens Element | 5.474 | 1.229 | T5 | 1.533 | 55.811 | 140.705 | Plastic |
| 61 | Sixth Lens Element | -1.226 | 0.500 | T6 | 1.647 | 22.418 | -19.896 | Plastic |
| 62 | | -15.581 | 1.037 | G6F | | | | |
| 92 | Filter | Infinity | 0.426 | | 1.518 | 64.166 | | |
| 93 | | Infinity | 0.560 | | | | | |
| 91 | Image Plane | Infinity | 0.000 | | | | | |

FIG. 85

| No. | K | a4 | a6 | a8 |
|---|---|---|---|---|
| 21 | 0.000000E+00 | -2.105364E-03 | 1.153282E-03 | -1.115461E-04 |
| 22 | 0.000000E+00 | -7.322581E-03 | -4.061768E-03 | 3.388640E-04 |
| 31 | 0.000000E+00 | -2.025206E-02 | -5.115384E-03 | 5.212673E-03 |
| 32 | 0.000000E+00 | 6.164628E-03 | -2.340542E-03 | -1.890069E-03 |
| 41 | 0.000000E+00 | 2.447016E-02 | 3.937462E-04 | 3.265622E-03 |
| 42 | -1.607056E+01 | -1.000150E-02 | 3.726675E-02 | -1.294445E-02 |
| No. | a10 | a12 | a14 | |
| 21 | 5.109185E-06 | 2.860719E-13 | -2.457440E-15 | |
| 22 | -7.642270E-04 | -9.608314E-17 | -1.072004E-19 | |
| 31 | -2.249193E-03 | 2.221354E-17 | 1.839731E-21 | |
| 32 | 2.161454E-03 | -1.927751E-19 | -1.626388E-24 | |
| 41 | 0.000000E+00 | 0.000000E+00 | 0.000000E+00 | |
| 42 | 4.487892E-03 | 0.000000E+00 | 0.000000E+00 | |

FIG. 86

| Eighteenth example ||||||||
|---|---|---|---|---|---|---|---|
| Image height=2.240mm; EFL=1.101mm; HFOV= 117.000deg.; TTL =21.301mm; Fno=2.400 ||||||||
| No. | | Curvature Radius | Ape. Stop Lens Element Thickness Air Gap | | Refractive Index | Abbe No. | Focal Length | Material |
| | Object | Infinity | Infinity | | | | | |
| 11 | First Lens Element | 21.500 | 2.600 | T1 | 1.615 | 60.613 | -16.415 | Glass |
| 12 | | 6.553 | 3.941 | G12 | | | | |
| 21 | Second Lens Element | 14.546 | 2.226 | T2 | 1.838 | 42.727 | -3.286 | Glass |
| 22 | | 2.155 | 2.120 | G23 | | | | |
| 31 | Third Lens Element | -10.531 | 3.250 | T3 | 1.647 | 22.418 | 12.498 | Plastic |
| 32 | | -5.130 | 2.141 | G34 | | | | |
| 80 | Ape. Stop | Infinity | 0.082 | | | | | |
| 41 | Fourth Lens Element | 3.185 | 0.862 | T4 | 1.533 | 55.811 | 4.637 | Plastic |
| 42 | | -10.025 | 0.070 | G45 | | | | |
| 51 | Fifth Lens Element | 2.551 | 1.088 | T5 | 1.533 | 55.811 | 10.953 | Plastic |
| 61 | Sixth Lens Element | -1.654 | 0.539 | T6 | 1.647 | 22.418 | -5.043 | Plastic |
| 62 | | 5.115 | 1.508 | G6F | | | | |
| 92 | Filter | Infinity | 0.377 | | 1.518 | 64.166 | | |
| 93 | | Infinity | 0.495 | | | | | |
| 91 | Image Plane | Infinity | 0.000 | | | | | |

FIG. 87

| No. | K | a4 | a6 | a8 |
|---|---|---|---|---|
| 31 | 0.000000E+00 | -4.620764E-03 | -4.458609E-04 | 1.596679E-04 |
| 32 | 0.000000E+00 | 8.022188E-04 | 4.092767E-04 | -9.061841E-05 |
| 41 | 0.000000E+00 | -2.232224E-03 | 8.747183E-04 | -3.757790E-03 |
| 42 | -2.471327E+02 | -4.691218E-02 | 2.474780E-02 | -1.435517E-02 |
| 51 | -1.032499E+00 | 9.147655E-05 | 2.132880E-03 | 7.594196E-04 |
| 61 | -6.847541E-01 | 3.540173E-02 | -1.457895E-02 | -4.634828E-03 |
| 62 | 0.000000E+00 | 5.080853E-02 | 3.471573E-03 | -2.589096E-04 |
| No. | a10 | a12 | a14 | |
| 31 | -1.321542E-05 | -4.354195E-21 | -1.606818E-24 | |
| 32 | 7.014026E-06 | 2.849237E-22 | 1.130203E-25 | |
| 41 | 0.000000E+00 | 0.000000E+00 | 0.000000E+00 | |
| 42 | 1.693141E-03 | 4.170305E-25 | 0.000000E+00 | |
| 51 | -1.141253E-03 | -7.023827E-22 | -6.540909E-25 | |
| 61 | 4.289692E-03 | -1.053108E-22 | -2.272613E-26 | |
| 62 | 1.068300E-04 | 5.846901E-22 | 7.922149E-25 | |

FIG. 88

| Nineteenth example ||||||||
|---|---|---|---|---|---|---|---|
| Image height=2.057mm; EFL=1.189mm; HFOV= 102.500deg.; TTL =11.689mm; Fno=2.200 ||||||||
| No. | | Curvature Radius | Ape. Stop Lens Element Thickness Air Gap | | Refractive Index | Abbe No. | Focal Length | Material |
| | Object | Infinity | Infinity | | | | | |
| 11 | First Lens Element | 10.088 | 1.550 | T1 | 1.747 | 44.903 | -5.071 | Glass |
| 12 | | 2.573 | 1.498 | G12 | | | | |
| 21 | Second Lens Element | 7.334 | 0.459 | T2 | 1.533 | 55.811 | -2.814 | Plastic |
| 22 | | 1.219 | 1.233 | G23 | | | | |
| 31 | Third Lens Element | -20.000 | 1.590 | T3 | 1.647 | 22.418 | 12.596 | Plastic |
| 32 | | -5.973 | 0.092 | G34 | | | | |
| 80 | Ape. Stop | Infinity | 0.008 | | | | | |
| 41 | Fourth Lens Element | 2.301 | 1.353 | T4 | 1.533 | 55.811 | 2.747 | Plastic |
| 42 | | -3.209 | 0.070 | G45 | | | | |
| 51 | Fifth Lens Element | 5.866 | 1.336 | T5 | 1.533 | 55.811 | 261.452 | Plastic |
| 61 | Sixth Lens Element | -1.240 | 0.500 | T6 | 1.647 | 22.418 | -49.257 | Plastic |
| 62 | | -9.292 | 1.079 | G6F | | | | |
| 92 | Filter | Infinity | 0.398 | | 1.518 | 64.166 | | |
| 93 | | Infinity | 0.522 | | | | | |
| 91 | Image Plane | Infinity | 0.000 | | | | | |

FIG. 89

| No. | K | a4 | a6 | a8 |
|---|---|---|---|---|
| 21 | 0.000000E+00 | -3.339490E-03 | 1.445998E-03 | -1.972446E-04 |
| 22 | 0.000000E+00 | -1.040462E-02 | 3.799629E-04 | 4.958050E-05 |
| 31 | 0.000000E+00 | -2.582135E-02 | -5.841341E-03 | 9.030526E-03 |
| 32 | 0.000000E+00 | 1.628723E-03 | -6.212258E-03 | -3.566521E-03 |
| 41 | 0.000000E+00 | 3.179158E-02 | -2.823072E-03 | 3.255814E-03 |
| 42 | -1.607056E+01 | -1.277851E-02 | 5.378003E-02 | -2.158951E-02 |
| No. | a10 | a12 | a14 | |
| 21 | 1.017842E-05 | 3.096611E-18 | 2.060462E-21 | |
| 22 | -1.175166E-03 | 2.758892E-22 | 0.000000E+00 | |
| 31 | -5.595764E-03 | -7.855813E-22 | -3.986481E-25 | |
| 32 | 1.741216E-03 | 3.282710E-22 | -3.297598E-26 | |
| 41 | 0.000000E+00 | 0.000000E+00 | 0.000000E+00 | |
| 42 | 1.031097E-02 | 0.000000E+00 | 0.000000E+00 | |

FIG. 90

| Twentieth example |||||||| 
|---|---|---|---|---|---|---|---|
| Image height=2.240mm; EFL=0.966mm; HFOV= 104.500deg.; TTL =12.470mm; Fno=2.100 ||||||||
| No. | | Curvature Radius | Ape. Stop Lens Element Thickness Air Gap || Refractive Index | Abbe No. | Focal Length | Material |
| | Object | Infinity | Infinity | | | | | |
| 11 | First Lens Element | 16.105 | 1.127 | T1 | 1.538 | 56.557 | -7.361 | Glass |
| 12 | | 3.100 | 2.200 | G12 | | | | |
| 21 | Second Lens Element | 1.404 | 0.550 | T2 | 1.533 | 55.811 | -2.828 | Plastic |
| 22 | | 0.628 | 1.875 | G23 | | | | |
| 31 | Third Lens Element | -7.174 | 0.800 | T3 | 1.645 | 23.539 | 10.832 | Plastic |
| 32 | | -3.693 | 0.150 | G37 | | | | |
| 71 | Seventh Lens Element | -5.131 | 0.587 | T7 | 1.645 | 23.539 | 4.515 | Plastic |
| 72 | | -1.940 | 0.100 | G74 | | | | |
| 80 | Ape. Stop | Infinity | 0.123 | | | | | |
| 41 | Fourth Lens Element | 4.203 | 0.700 | T4 | 1.533 | 55.811 | 3.091 | Plastic |
| 42 | | -2.555 | 0.130 | G45 | | | | |
| 51 | Fifth Lens Element | -3.215 | 0.400 | T5 | 1.647 | 22.418 | -5.285 | Plastic |
| 52 | | 1.346 | 0.010 | G56 | 1.533 | 55.811 | | Bonding Material |
| 61 | Sixth Lens Element | 1.346 | 1.868 | T6 | 1.533 | 55.811 | 3.336 | Plastic |
| 62 | | -1.779 | 0.970 | G6F | | | | |
| 92 | Filter | Infinity | 0.700 | | 1.518 | 64.166 | | |
| 93 | | Infinity | 0.180 | | | | | |
| 91 | Image Plane | Infinity | 0.000 | | | | | |

FIG. 91

| No. | K | a4 | a6 | a8 |
|---|---|---|---|---|
| 21 | -7.781190E-01 | -9.994465E-02 | 3.335783E-02 | -9.078712E-03 |
| 22 | -7.487400E-01 | -2.798230E-01 | 5.783703E-01 | -1.500986E+00 |
| 31 | -3.440156E+01 | -4.882888E-02 | 9.131156E-03 | -9.784990E-03 |
| 32 | 0.000000E+00 | 5.713826E-03 | 5.276148E-03 | -8.995208E-04 |
| 71 | 0.000000E+00 | 3.325403E-02 | 2.355557E-02 | 3.978595E-03 |
| 72 | -2.399766E+00 | 6.523420E-02 | -5.121755E-02 | 5.942520E-02 |
| 41 | 0.000000E+00 | 1.138731E-01 | -6.524912E-02 | 7.477832E-02 |
| 42 | 0.000000E+00 | -9.968401E-02 | 1.557028E-01 | -2.204825E-01 |
| 51 | 7.556243E+00 | -5.981447E-02 | -1.868918E-02 | 1.973187E-03 |
| 52 | -2.985940E-01 | 2.781718E-01 | -5.885795E-01 | 4.965249E-01 |
| 61 | -2.985940E-01 | 2.781718E-01 | -5.885795E-01 | 4.965249E-01 |
| 62 | 0.000000E+00 | 2.803878E-02 | -3.996167E-03 | 8.814581E-03 |
| No. | a10 | a12 | a14 | a16 |
| 21 | 1.632090E-03 | -1.734278E-04 | 7.516475E-06 | 0.000000E+00 |
| 22 | 2.352083E+00 | -2.117205E+00 | 1.003954E+00 | -1.949453E-01 |
| 31 | 4.558124E-03 | 0.000000E+00 | 0.000000E+00 | 0.000000E+00 |
| 32 | 0.000000E+00 | 0.000000E+00 | 0.000000E+00 | 0.000000E+00 |
| 71 | 0.000000E+00 | 0.000000E+00 | 0.000000E+00 | 0.000000E+00 |
| 72 | -1.483574E-02 | 0.000000E+00 | 0.000000E+00 | 0.000000E+00 |
| 41 | -4.678904E-02 | 1.336203E-02 | 0.000000E+00 | 0.000000E+00 |
| 42 | 1.835209E-01 | -9.417795E-02 | 1.477021E-02 | 0.000000E+00 |
| 51 | -1.564172E-02 | -4.356650E-24 | 0.000000E+00 | 0.000000E+00 |
| 52 | -2.485652E-01 | 6.609396E-02 | -7.157970E-03 | 0.000000E+00 |
| 61 | -2.485652E-01 | 6.609396E-02 | -7.157970E-03 | 0.000000E+00 |
| 62 | -2.622576E-03 | 7.731257E-04 | 0.000000E+00 | 0.000000E+00 |

FIG. 92

| Twenty-first example |||||||
|---|---|---|---|---|---|---|
| Image height=2.240mm; EFL=0.969mm; HFOV= 104.500deg.; TTL =14.055mm; Fno=2.100 |||||||
| No. | | Curvature Radius | Ape. Stop Lens Element Thickness Air Gap | | Refractive Index | Abbe No. | Focal Length | Material |
| | Object | | Infinity | | | | | |
| 11 | First Lens Element | 16.330 | 1.379 | T1 | 1.552 | 54.999 | -7.057 | Glass |
| 12 | | 3.050 | 2.450 | G12 | | | | |
| 21 | Second Lens Element | 1.730 | 0.631 | T2 | 1.533 | 55.811 | -2.517 | Plastic |
| 22 | | 0.660 | 1.694 | G23 | | | | |
| 31 | Third Lens Element | 50.000 | 1.099 | T3 | 1.645 | 23.539 | 4.908 | Plastic |
| 32 | | -3.349 | 0.148 | G37 | | | | |
| 71 | Seventh Lens Element | -4.376 | 0.900 | T7 | 1.645 | 23.539 | 11.572 | Plastic |
| 72 | | -2.980 | 0.105 | G74 | | | | |
| 80 | Ape. Stop | Infinity | 0.129 | | | | | |
| 41 | Fourth Lens Element | 3.765 | 0.746 | T4 | 1.533 | 55.811 | 3.137 | Plastic |
| 42 | | -2.804 | 0.152 | G45 | | | | |
| 51 | Fifth Lens Element | -4.222 | 0.400 | T5 | 1.647 | 22.418 | -6.470 | Plastic |
| 52 | | 1.413 | 0.010 | G56 | 1.533 | 55.811 | | Bonding Material |
| 61 | Sixth Lens Element | 1.413 | 1.300 | T6 | 1.533 | 55.811 | 628.493 | Plastic |
| 62 | | -335.207 | 0.250 | G68 | | | | |
| 81 | Eighth Lens Element | 72.223 | 0.811 | T8 | 1.533 | 55.811 | 3.286 | Plastic |
| 82 | | -1.789 | 0.990 | G8F | | | | |
| 92 | Filter | Infinity | 0.700 | | 1.518 | 64.166 | | |
| 93 | | Infinity | 0.160 | | | | | |
| 91 | Image Plane | Infinity | 0.000 | | | | | |

FIG. 93

| No. | K | a4 | a6 | a8 |
|---|---|---|---|---|
| 21 | -6.959736E-01 | -8.930102E-02 | 2.579917E-02 | -6.480439E-03 |
| 22 | -7.827457E-01 | -2.534168E-01 | 4.663117E-01 | -1.076591E+00 |
| 31 | 1.176889E+03 | -3.132239E-02 | -3.559720E-03 | -5.270700E-03 |
| 32 | 0.000000E+00 | -1.979400E-03 | 8.975240E-03 | 1.432831E-04 |
| 71 | 0.000000E+00 | 7.514140E-02 | 2.310709E-02 | 7.968127E-03 |
| 72 | -6.669063E+00 | 8.039591E-02 | -1.374037E-02 | 2.747448E-02 |
| 41 | 0.000000E+00 | 6.704237E-02 | -5.432872E-02 | 4.541655E-02 |
| 42 | 0.000000E+00 | -1.049499E-01 | 1.019172E-01 | -1.564852E-01 |
| 51 | 6.170174E+00 | -6.086687E-02 | -1.350840E-02 | -6.773662E-03 |
| 52 | -1.501775E-01 | 1.682034E-01 | -4.293405E-01 | 3.503852E-01 |
| 61 | -1.501775E-01 | 1.682034E-01 | -4.293405E-01 | 3.503852E-01 |
| 62 | 0.000000E+00 | -4.268641E-03 | 5.460870E-04 | 5.232067E-04 |
| 81 | 0.000000E+00 | 7.890797E-03 | -1.065935E-02 | -1.912668E-03 |
| 82 | 0.000000E+00 | 5.563848E-02 | -1.279291E-02 | 5.135197E-03 |
| No. | a10 | a12 | a14 | a16 |
| 21 | 1.066981E-03 | -1.013997E-04 | 3.986147E-06 | 0.000000E+00 |
| 22 | 1.521173E+00 | -1.237886E+00 | 5.324183E-01 | -9.377203E-02 |
| 31 | 2.179569E-03 | 0.000000E+00 | 0.000000E+00 | 0.000000E+00 |
| 32 | 6.118006E-04 | 0.000000E+00 | 0.000000E+00 | 0.000000E+00 |
| 71 | -2.062714E-03 | 0.000000E+00 | 0.000000E+00 | 0.000000E+00 |
| 72 | 1.115705E-02 | 0.000000E+00 | 0.000000E+00 | 0.000000E+00 |
| 41 | -3.423968E-02 | 7.812505E-03 | 0.000000E+00 | 0.000000E+00 |
| 42 | 1.262521E-01 | -5.506390E-02 | 7.832959E-03 | 0.000000E+00 |
| 51 | 7.328270E-03 | -2.547243E-24 | 0.000000E+00 | 0.000000E+00 |
| 52 | -1.624624E-01 | 3.864377E-02 | -3.796024E-03 | 0.000000E+00 |
| 61 | -1.624624E-01 | 3.864377E-02 | -3.796024E-03 | 0.000000E+00 |
| 62 | 3.222080E-04 | 0.000000E+00 | 0.000000E+00 | 0.000000E+00 |
| 81 | 2.169326E-04 | 0.000000E+00 | 0.000000E+00 | 0.000000E+00 |
| 82 | -2.327298E-03 | 4.520306E-04 | 0.000000E+00 | 0.000000E+00 |

FIG. 94

| Condition Expression | Example 13 | Example 14 | Example 15 | Example 16 | Example 17 |
|---|---|---|---|---|---|
| EFL | 1.000 | 0.990 | 0.973 | 0.953 | 1.191 |
| Fno | 2.060 | 2.060 | 2.060 | 2.060 | 2.200 |
| HFOV | 104.500 | 117.000 | 102.500 | 116.000 | 104.500 |
| ImgH | 2.240 | 2.240 | 2.058 | 2.056 | 2.240 |
| T1 | 0.850 | 2.017 | 1.248 | 1.992 | 2.525 |
| G12 | 2.017 | 2.188 | 2.188 | 2.188 | 1.904 |
| T2 | 0.550 | 0.550 | 0.550 | 0.550 | 0.571 |
| G23 | 1.167 | 1.239 | 1.520 | 1.281 | 1.456 |
| T3 | 1.556 | 1.415 | 1.402 | 1.539 | 2.173 |
| G34 | 0.207 | 0.213 | 0.175 | 0.231 | 0.289 |
| G37 | | | | | |
| T7 | | | | | |
| G74 | | | | | |
| T4 | 0.751 | 0.717 | 0.781 | 0.729 | 1.326 |
| G45 | 0.123 | 0.120 | 0.120 | 0.120 | 0.070 |
| T5 | 0.489 | 0.400 | 0.400 | 0.400 | 1.229 |
| G56 | 0.010 | 0.010 | 0.010 | 0.010 | 0.000 |
| T6 | 2.300 | 2.224 | 2.242 | 2.211 | 0.500 |
| G6F | 0.534 | 0.542 | 0.542 | 0.542 | 1.037 |
| G68 | | | | | |
| T8 | | | | | |
| G8F | | | | | |
| TF | 0.700 | 0.686 | 0.686 | 0.686 | 0.426 |
| GFP | 0.616 | 0.622 | 0.622 | 0.622 | 0.560 |
| V1 | 54.617 | 54.164 | 51.885 | 54.999 | 60.367 |
| V2 | 55.811 | 55.811 | 55.811 | 55.811 | 55.811 |
| V3 | 23.539 | 23.539 | 23.539 | 23.539 | 22.418 |
| V7 | | | | | |
| V4 | 55.811 | 55.811 | 55.811 | 55.811 | 55.811 |
| V5 | 22.418 | 22.418 | 22.418 | 22.418 | 55.811 |
| V6 | 55.811 | 55.811 | 55.811 | 55.811 | 22.418 |
| V8 | | | | | |

FIG. 95

| Condition Expression | Example 18 | Example 19 | Example 20 | Example 21 |
|---|---|---|---|---|
| EFL | 1.101 | 1.189 | 0.966 | 0.969 |
| Fno | 2.400 | 2.200 | 2.100 | 2.100 |
| HFOV | 117.000 | 102.500 | 104.500 | 104.500 |
| ImgH | 2.240 | 2.057 | 2.240 | 2.240 |
| T1 | 2.600 | 1.550 | 1.127 | 1.379 |
| G12 | 3.941 | 1.498 | 2.200 | 2.450 |
| T2 | 2.226 | 0.459 | 0.550 | 0.631 |
| G23 | 2.120 | 1.233 | 1.875 | 1.694 |
| T3 | 3.250 | 1.590 | 0.800 | 1.099 |
| G34 | 2.223 | 0.100 | 0.960 | 1.282 |
| G37 | | | 0.150 | 0.148 |
| T7 | | | 0.587 | 0.900 |
| G74 | | | 0.223 | 0.234 |
| T4 | 0.862 | 1.353 | 0.700 | 0.746 |
| G45 | 0.070 | 0.070 | 0.130 | 0.152 |
| T5 | 1.088 | 1.336 | 0.400 | 0.400 |
| G56 | 0.000 | 0.000 | 0.010 | 0.010 |
| T6 | 0.539 | 0.500 | 1.868 | 1.300 |
| G6F | 1.508 | 1.079 | 0.970 | 2.051 |
| G68 | | | | 0.250 |
| T8 | | | | 0.811 |
| G8F | | | | 0.990 |
| TF | 0.377 | 0.398 | 0.700 | 0.700 |
| GFP | 0.495 | 0.522 | 0.180 | 0.160 |
| V1 | 60.613 | 44.903 | 56.557 | 54.999 |
| V2 | 42.727 | 55.811 | 55.811 | 55.811 |
| V3 | 22.418 | 22.418 | 23.539 | 23.539 |
| V7 | | | 23.539 | 23.539 |
| V4 | 55.811 | 55.811 | 55.811 | 55.811 |
| V5 | 55.811 | 55.811 | 22.418 | 22.418 |
| V6 | 22.418 | 22.418 | 55.811 | 55.811 |
| V8 | | | | 55.811 |

FIG. 96

| Condition Expression | Example 13 | Example 14 | Example 15 | Example 16 | Example 17 |
|---|---|---|---|---|---|
| ω captured corresponding to 0.8 field | 87.500 | 93.962 | 81.197 | 92.780 | 87.500 |
| y in 0.8 field | 1.792 | 1.792 | 1.646 | 1.645 | 1.792 |
| ω captured corresponding to 0.8716 field | 93.716 | 101.608 | 88.050 | 100.404 | 94.452 |
| y in 0.8716 field | 1.952 | 1.952 | 1.794 | 1.792 | 1.952 |
| BFL | 1.850 | 1.850 | 1.850 | 1.850 | 2.023 |
| ALT | 6.495 | 7.324 | 6.623 | 7.421 | 8.323 |
| AAG | 3.524 | 3.770 | 4.012 | 3.829 | 3.719 |
| TL | 10.019 | 11.094 | 10.635 | 11.250 | 12.042 |
| TTL | 11.869 | 12.944 | 12.485 | 13.100 | 14.065 |
| (V1+V2)/V3 | 4.691 | 4.672 | 4.575 | 4.708 | 5.182 |
| TTL/TL | 1.542 | 1.515 | 1.606 | 1.516 | 1.447 |
| (EFL+AAG+BFL)/ALT | 0.981 | 0.902 | 1.032 | 0.894 | 0.833 |
| (G12+G45+T5+G56)/T1 | 3.105 | 1.347 | 2.178 | 1.364 | 1.269 |
| (G45+G56+T5+T6)/G23 | 2.504 | 2.223 | 1.824 | 2.140 | 1.236 |
| (G34+G45+T4+T5)/T1 | 1.846 | 0.719 | 1.183 | 0.743 | 1.154 |
| (G34+G45+T3+T6)/T2 | 7.610 | 7.224 | 7.162 | 7.456 | 5.309 |
| (G23+G34+G45+T5)/T1 | 2.336 | 0.978 | 1.775 | 1.020 | 1.206 |
| (V1+V4)/V3 | 4.691 | 4.672 | 4.575 | 4.708 | 5.182 |
| TTL/ALT | 1.827 | 1.767 | 1.885 | 1.765 | 1.690 |
| (EFL*Fno+T4)/ImgH | 1.254 | 1.231 | 1.353 | 1.310 | 1.762 |
| (G12+G45+T5+G56)/T4 | 3.516 | 3.789 | 3.479 | 3.726 | 2.415 |
| (G45+G56+T4+T6)/G23 | 2.728 | 2.479 | 2.075 | 2.397 | 1.302 |
| (G34+G45+T3+T6)/T1 | 4.924 | 1.970 | 3.157 | 2.059 | 1.201 |
| (G34+G45+T4+T5)/T2 | 2.853 | 2.637 | 2.684 | 2.692 | 5.104 |
| (G23+G34+G45+T6)/T1 | 4.466 | 1.882 | 3.252 | 1.930 | 0.917 |

FIG. 97

| Condition Expression | Example 18 | Example 19 | Example 20 | Example 21 |
|---|---|---|---|---|
| ω captured corresponding to 0.8 field | 93.961 | 80.455 | 87.500 | 87.500 |
| y in 0.8 field | 1.792 | 1.646 | 1.792 | 1.792 |
| ω captured corresponding to 0.8716 field | 102.163 | 88.047 | 93.358 | 93.513 |
| y in 0.8716 field | 1.952 | 1.793 | 1.952 | 1.952 |
| BFL | 2.380 | 1.999 | 1.850 | 2.911 |
| ALT | 10.566 | 6.788 | 6.031 | 7.266 |
| AAG | 8.354 | 2.901 | 5.176 | 5.589 |
| TL | 18.920 | 9.689 | 10.620 | 11.144 |
| TTL | 21.300 | 11.688 | 12.470 | 14.055 |
| (V1+V2)/V3 | 4.610 | 4.493 | 4.774 | 4.708 |
| TTL/TL | 1.791 | 1.427 | 1.761 | 1.534 |
| (EFL+AAG+BFL)/ALT | 1.120 | 0.897 | 1.325 | 1.303 |
| (G12+G45+T5+G56)/T1 | 1.961 | 1.874 | 2.432 | 2.185 |
| (G45+G56+T5+T6)/G23 | 0.800 | 1.546 | 1.284 | 1.099 |
| (G34+G45+T4+T5)/T1 | 1.632 | 1.845 | 1.944 | 1.872 |
| (G34+G45+T3+T6)/T2 | 2.732 | 4.921 | 6.833 | 6.078 |
| (G23+G34+G45+T5)/T1 | 2.116 | 1.767 | 2.987 | 2.559 |
| (V1+V4)/V3 | 5.193 | 4.493 | 4.774 | 4.708 |
| TTL/ALT | 2.016 | 1.722 | 2.067 | 1.934 |
| (EFL*Fno+T4)/ImgH | 1.565 | 1.929 | 1.218 | 1.242 |
| (G12+G45+T5+G56)/T4 | 5.915 | 2.146 | 3.916 | 4.036 |
| (G45+G56+T4+T6)/G23 | 0.694 | 1.560 | 1.444 | 1.304 |
| (G34+G45+T3+T6)/T1 | 2.339 | 1.458 | 3.336 | 2.780 |
| (G34+G45+T4+T5)/T2 | 1.906 | 6.226 | 3.982 | 4.092 |
| (G23+G34+G45+T6)/T1 | 1.905 | 1.227 | 4.290 | 3.212 |

FIG. 98

| Thirteenth Example EFL=1.000 mm | | | | Fourteenth Example EFL=0.990mm | | | |
|---|---|---|---|---|---|---|---|
| Image Height y (mm) | Half Field of View ω (Deg.) | Half Field of View ω (Radian) | y/(EFL*ω) | Image Height y (mm) | Half Field of View ω (Deg.) | Half Field of View ω (Radian) | y/(EFL*ω) |
| 0.183 | 10.450 | 0.182 | 1.006 | 0.198 | 11.375 | 0.199 | 1.006 |
| 0.372 | 20.900 | 0.365 | 1.021 | 0.399 | 22.750 | 0.397 | 1.016 |
| 0.567 | 31.350 | 0.547 | 1.037 | 0.603 | 34.125 | 0.596 | 1.023 |
| 0.770 | 41.800 | 0.730 | 1.056 | 0.812 | 45.500 | 0.794 | 1.033 |
| 0.983 | 52.250 | 0.912 | 1.078 | 1.028 | 56.875 | 0.993 | 1.046 |
| 1.207 | 62.700 | 1.094 | 1.104 | 1.253 | 68.250 | 1.191 | 1.062 |
| 1.444 | 73.150 | 1.277 | 1.131 | 1.486 | 79.625 | 1.390 | 1.080 |
| 1.792 | 87.500 | 1.527 | 1.174 | 1.792 | 94.000 | 1.641 | 1.103 |
| 1.961 | 94.050 | 1.641 | 1.195 | 1.899 | 99.000 | 1.728 | 1.110 |
| 2.240 | 104.500 | 1.824 | 1.229 | 2.240 | 117.000 | 2.042 | 1.108 |
| Fifteenth Example EFL=0.973mm | | | | Sixteenth Example EFL=0.953mm | | | |
| Image Height y (mm) | Half Field of View ω (Deg.) | Half Field of View ω (Radian) | y/(EFL*ω) | Image Height y (mm) | Half Field of View ω (Deg.) | Half Field of View ω (Radian) | y/(EFL*ω) |
| 0.188 | 11.000 | 0.192 | 1.008 | 0.194 | 11.600 | 0.202 | 1.005 |
| 0.384 | 22.000 | 0.384 | 1.027 | 0.390 | 23.200 | 0.405 | 1.011 |
| 0.589 | 33.000 | 0.576 | 1.052 | 0.587 | 34.800 | 0.607 | 1.014 |
| 0.811 | 44.000 | 0.768 | 1.086 | 0.786 | 46.400 | 0.810 | 1.018 |
| 1.049 | 55.000 | 0.960 | 1.124 | 0.990 | 58.000 | 1.012 | 1.026 |
| 1.299 | 66.000 | 1.152 | 1.160 | 1.200 | 69.600 | 1.215 | 1.037 |
| 1.552 | 77.000 | 1.344 | 1.187 | 1.418 | 81.200 | 1.417 | 1.050 |
| 1.792 | 88.000 | 1.536 | 1.200 | 1.793 | 100.500 | 1.754 | 1.073 |
| 2.001 | 99.000 | 1.728 | 1.191 | 1.867 | 104.400 | 1.822 | 1.075 |
| 2.058 | 102.500 | 1.789 | 1.183 | 2.056 | 116.000 | 2.025 | 1.066 |

FIG. 99

| Seventeenth example EFL=1.191 mm | | | | Eighteenth example EFL=1.101mm | | | |
|---|---|---|---|---|---|---|---|
| Image Height y (mm) | Half Field of View ω (Deg.) | Half Field of View ω (Radian) | y/(EFL*ω) | Image Height y (mm) | Half Field of View ω (Deg.) | Half Field of View ω (Radian) | y/(EFL*ω) |
| 0.213 | 10.250 | 0.179 | 0.999 | 0.211 | 11.000 | 0.192 | 0.999 |
| 0.425 | 20.500 | 0.358 | 0.997 | 0.422 | 22.000 | 0.384 | 0.998 |
| 0.635 | 30.750 | 0.537 | 0.994 | 0.632 | 33.000 | 0.576 | 0.997 |
| 0.843 | 41.000 | 0.716 | 0.990 | 0.841 | 44.000 | 0.768 | 0.995 |
| 1.050 | 51.250 | 0.894 | 0.985 | 1.049 | 55.000 | 0.960 | 0.993 |
| 1.255 | 61.500 | 1.073 | 0.982 | 1.257 | 66.000 | 1.152 | 0.991 |
| 1.462 | 71.750 | 1.252 | 0.980 | 1.466 | 77.000 | 1.344 | 0.991 |
| 1.792 | 87.500 | 1.527 | 0.985 | 1.793 | 94.000 | 1.641 | 0.992 |
| 1.900 | 92.250 | 1.610 | 0.991 | 1.890 | 99.000 | 1.728 | 0.994 |
| 2.240 | 104.500 | 1.824 | 1.031 | 2.240 | 117.000 | 2.042 | 0.996 |
| Nineteenth example EFL=1.189 mm | | | | Twentieth example EFL=0.966mm | | | |
| Image Height y (mm) | Half Field of View ω (Deg.) | Half Field of View ω (Radian) | y/(EFL*ω) | Image Height y (mm) | Half Field of View ω (Deg.) | Half Field of View ω (Radian) | y/(EFL*ω) |
| 0.213 | 10.250 | 0.179 | 0.999 | 0.177 | 10.450 | 0.182 | 1.005 |
| 0.425 | 20.500 | 0.358 | 0.999 | 0.357 | 20.900 | 0.365 | 1.013 |
| 0.637 | 30.750 | 0.537 | 0.999 | 0.542 | 31.350 | 0.547 | 1.025 |
| 0.848 | 41.000 | 0.716 | 0.997 | 0.737 | 41.800 | 0.730 | 1.046 |
| 1.058 | 51.250 | 0.894 | 0.995 | 0.946 | 52.250 | 0.912 | 1.074 |
| 1.267 | 61.500 | 1.073 | 0.993 | 1.172 | 62.700 | 1.094 | 1.108 |
| 1.473 | 71.750 | 1.252 | 0.989 | 1.419 | 73.150 | 1.277 | 1.150 |
| 1.792 | 88.000 | 1.536 | 0.981 | 1.793 | 87.500 | 1.527 | 1.215 |
| 1.873 | 92.250 | 1.610 | 0.978 | 1.971 | 94.050 | 1.641 | 1.243 |
| 2.057 | 102.500 | 1.789 | 0.967 | 2.240 | 104.500 | 1.824 | 1.271 |

FIG. 100

| Twenty-first example EFL=0.969mm ||||
|---|---|---|---|
| Image Height y (mm) | Half Field of View ω (Deg.) | Half Field of View ω (Radian) | y/(EFL*ω) |
| 0.178 | 10.450 | 0.182 | 1.007 |
| 0.362 | 20.900 | 0.365 | 1.023 |
| 0.553 | 31.350 | 0.547 | 1.043 |
| 0.756 | 41.800 | 0.730 | 1.069 |
| 0.971 | 52.250 | 0.912 | 1.099 |
| 1.197 | 62.700 | 1.094 | 1.129 |
| 1.437 | 73.150 | 1.277 | 1.161 |
| 1.793 | 87.500 | 1.527 | 1.211 |
| 1.967 | 94.050 | 1.641 | 1.237 |
| 2.240 | 104.500 | 1.824 | 1.267 |

FIG. 101

OPTICAL IMAGING LENS

CROSS-REFERENCE TO RELATED APPLICATION

This application is a continuation-in-part application of and claims the priority benefit of U.S. application Ser. No. 15/830,009, filed on Dec. 4, 2017, now pending, which claims the priority benefit of China application serial no. 201711082176.6, filed on Nov. 7, 2017. This application also claims the priority benefit of China application serial no. 201811250271.7, filed on Oct. 25, 2018. The entirety of each of the above-mentioned patent applications is hereby incorporated by reference herein and made a part of this specification.

BACKGROUND OF THE INVENTION

Technical Field

The present invention generally relates to an optical imaging lens. Specifically speaking, the present invention is directed to an optical imaging lens for use in portable electronic devices such as mobile phones, cameras, tablet personal computers, personal digital assistants (PDA), vehicle imaging apparatus, or virtual reality (VR) tracker and other devices.

Description of Related Art

The specification of consumer electronic products is ever changing and the demand for lighter, thinner, and smaller products never stops growing, which is why the specification of key components (optical lenses and etc.) of the electronic products must also continue to be enhanced, so as to satisfy consumers' demands. The most important feature of optical lenses is not only the imaging quality and the size, the demand for enhancing the field of view (FOV) is also important. With the improvement of image sensing technology, the application of optical lenses is not limited to photography and video recording. Other demands such as environmental monitoring and driving record photography are also needed. Therefore, in view of the environment of driving or lack of light and the consumers' requirements, in the field of optical lens design, in addition to the pursuit of thin lenses, the lens imaging quality and performance are needed to be taken into account as well.

Besides, under different environments, different environment temperatures may cause the changing of the back focal length of an optical lens system, thereby affecting imaging quality of the electronic apparatus. Therefore, it is expected that the back focal length of the lens group is not easily affected by temperature changes.

In view of the above problems, in addition to good imaging quality, low back focal length variation at different environment temperatures and larger viewing angles are important objects in the field of lens design. However, it is not possible to accomplish the design of an optical lens with good imaging quality and micro-sized optical lens by simply scaling down a lens having good imaging quality. The design not only involves the material properties, the production, the assembly yield and other actual problems should also be considered.

Meanwhile, the applications of vehicle lenses continue to broaden. For instance, vehicle lenses are applicable in car-backing systems, 360 degree panoramic systems, lane departure warning systems, advanced driver assistance systems (ADAS), etc. One vehicle may include 6 to 20 lenses, and lens specifications are constantly refined. For instance, VGA (300,000) is upgraded to mega pixels. However, compared with the imaging quality of lenses providing tens of millions of pixels for mobile phones, the imaging quality of vehicle lenses still requires refinement.

For instance, in order to avoid blind spots in the field of view in the car-backing function and 360-degree panoramic function, an optical imaging lens is required to capture an imaging ray with a horizontal field of view at 180±5 degrees.

Further, two aspect ratios of 4:3 and 16:9 are adopted by conventional image sensors. First, as regards an image sensor with the aspect ratio of 4:3, the ratio of the diagonal field to the horizontal field is 1:0.8. From another perspective, as regards an image sensor with the aspect ratio of 16:9, the ratio of the diagonal field to the horizontal field is 1:0.8716.

In an ideal image height formula: $y=f*\tan(\omega)$, y is the image height, f is the focal length, and $\omega$ is the half field of view $\omega$. A tangent function may be applied to the relationship between the image height y and the half field of view $\omega$. The distortion formula is $(y1-y0)/y0$, while y1 is the image height after the distortion, and y0 is the initial image height. In order to reduce the distortion aberration, the image height is not proportional to the half field of view. As such, if an optical imaging lens with the diagonal FOV of 200 to 220 degrees is adopted, only the imaging ray of 140 to 160 degrees can be captured in the 0.8 field and only the imaging ray of 150 to 170 degrees can be captured in the 0.8716 field, as such, the following problem may occur.

In order to reduce distortion aberration, the image sensor with the aspect ratio of 4:3 is taking for example, when the diagonal field of the image sensor with the aspect ratio of 4:3 captures imaging rays of 200 to 220 degrees, since the horizontal field of the image sensor with the aspect ratio of 4:3 can capture only the imaging rays of 140 to 160 degrees, some of the imaging rays are not captured. As such, blind spots in the field of view in the horizontal field are present.

In order to solve the foregoing blind spot problem, one possible solution is to scale down the optical imaging lens or scale up the image sensor with the aspect ratio of 4:3. In this way, the horizontal field of the image sensor with the aspect ratio of 4:3 may capture the imaging rays at 180±5 degrees. Nevertheless, the four corners of the image sensor with the aspect ratio of 4:3 may not receive the imaging rays, and the problem of dark corners may thus occur.

SUMMARY

In the light of the above, the present invention accordingly proposes an optical imaging lens which has increased half field of view and low back focal length variation at different environment temperatures, and maintains appropriate lens set length. The optical imaging lens of the present invention has an object side, an image side and an optical axis, the first lens with refractive power from said object side to said image side is defined as a first lens element, the second lens with refractive power from said object side to said image side is defined as a second lens element, the fourth lens with refractive power from said image side to said object side is defined as a third lens element, the third lens with refractive power from said image side to said object side is defined as a fourth lens element, the second lens with refractive power from said image side to said object side is defined as a fifth lens element, the first lens with refractive power from said image side to said object side is defined as a sixth lens element.

Each lens element respectively has an object side surface which faces toward said object side to allow an imaging ray to pass through as well as an image side surface which faces toward said image side to allow the imaging ray to pass through.

In this example of the present invention, said second lens element has negative refractive power, said object side surface of said second lens element has a convex portion in a vicinity of said optical axis and has a convex portion in a vicinity of its periphery; the material of said third lens element is plastic, said object side surface of the third lens element has a concave portion in a vicinity of said optical axis; said object side surface of the fourth lens element has a convex portion in a vicinity of said optical axis; said object side surface of said fifth lens element has a concave portion in a vicinity of its periphery, said image side surface of said fifth lens element has a concave portion in a vicinity of said optical axis, and has a concave portion in a vicinity of its periphery; said image side surface of the sixth lens has a convex portion in a vicinity of said optical axis, and has a convex portion in a vicinity of its periphery; and G12 is the distance between said image side surface of said first lens element and said object side surface of said second lens element along said optical axis, G34 is the distance between said image side surface of said third lens element and said object side surface of said fourth lens element along said optical axis, T3 is the thickness of said third lens element along said optical axis, EFL is the effective focal length of said optical imaging lens, and the optical imaging lens satisfies the following condition: (G12+T3+G34)/EFL≤4.800.

In one aspect of the present invention, the present invention provides an optical imaging lens which has increased half field of view and low back focal length variation at different environment temperatures, and maintains appropriate lens set length. The optical imaging lens of the present invention has an object side, an image side and an optical axis, the first lens with refractive power from said object side to said image side is defined as a first lens element, the second lens with refractive power from said object side to said image side is defined as a second lens element, the fourth lens with refractive power from said image side to said object side is defined as a third lens element, the third lens with refractive power from said image side to said object side is defined as a fourth lens element, the second lens with refractive power from said image side to said object side is defined as a fifth lens element, the first lens with refractive power from said image side to said object side is defined as a sixth lens element. Each lens element respectively has an object side surface which faces toward said object side to allow an imaging ray to pass through as well as an image side surface which faces toward said image side to allow the imaging ray to pass through.

In this example of the present invention, said second lens element has negative refractive power, said object side surface of said second lens element has a convex portion in a vicinity of said optical axis, and has a convex portion in a vicinity of its periphery; the material of said third lens element is plastic, said object side surface of the third lens element has a concave portion in a vicinity of said optical axis, said image side surface of the third lens element has a convex portion in a vicinity of said optical axis; said object side surface of the fourth lens element has a convex portion in a vicinity of said optical axis; said image side surface of said fifth lens element has a concave portion in a vicinity of said optical axis, and has a concave portion in a vicinity of its periphery; said image side surface of the sixth lens has a convex portion in a vicinity of said optical axis, and has a convex portion in a vicinity of its periphery; and G12 is the distance between said image side surface of said first lens element and said object side surface of said second lens element along said optical axis, G34 is the distance between said image side surface of said third lens element and said object side surface of said fourth lens element along said optical axis, T3 is the thickness of said third lens element along said optical axis, EFL is the effective focal length of said optical imaging lens, and the optical imaging lens satisfies the following condition: (G12+T3+G34)/EFL≤4.800.

In another aspect of the present invention, the present invention provides an optical imaging lens which has increased half field of view and low back focal length variation at different environment temperatures, and maintains appropriate lens set length. The optical imaging lens of the present invention has an object side, an image side and an optical axis, the first lens with refractive power from said object side to said image side is defined as a first lens element, the second lens with refractive power from said object side to said image side is defined as a second lens element, the fourth lens with refractive power from said image side to said object side is defined as a third lens element, the third lens with refractive power from said image side to said object side is defined as a fourth lens element, the second lens with refractive power from said image side to said object side is defined as a fifth lens element, the first lens with refractive power from said image side to said object side is defined as a sixth lens element. Each lens element respectively has an object side surface which faces toward said object side to allow an imaging ray to pass through as well as an image side surface which faces toward said image side to allow the imaging ray to pass through.

In this example of the present invention, said object side surface of said second lens element has a convex portion in a vicinity of said optical axis, and has a convex portion in a vicinity of its periphery; the material of said third lens element is plastic, said third lens element has positive refractive power, said object side surface of the third lens element has a concave portion in a vicinity of said optical axis; said object side surface of the fourth lens element has a convex portion in a vicinity of said optical axis; said image side surface of said fifth lens element has a concave portion in a vicinity of said optical axis, and has a concave portion in a vicinity of its periphery; said image side surface of the sixth lens has a convex portion in a vicinity of said optical axis, and has a convex portion in a vicinity of its periphery; and G12 is the distance between said image side surface of said first lens element and said object side surface of said second lens element along said optical axis, G34 is the distance between said image side surface of said third lens element and said object side surface of said fourth lens element along said optical axis, T3 is the thickness of said third lens element along said optical axis, EFL is the effective focal length of said optical imaging lens, and the optical imaging lens satisfies the following condition: (G12+T3+G34)/EFL≤4.800.

In the optical imaging lens of the present invention, G45 is the distance between said image side surface of said fourth lens element and said object side surface of said fifth lens element along said optical axis, T5 is the thickness of said fifth lens element along said optical axis, G56 is the distance between said image side surface of said fifth lens element and said object side surface of said sixth lens element along said optical axis, G23 is the distance between said image side surface of said second lens element and said object side surface of said third lens element along said optical axis, AAG is the sum of said G12, G23, G34, G45 and G56, and the optical imaging lens satisfies the following condition: AAG/(G34+G45+T5+G56)≤5.800.

In the optical imaging lens of the present invention, T2 is the thickness of said second lens element along said optical axis, G45 is the distance between said image side surface of said fourth lens element and said object side surface of said fifth lens element along said optical axis, and the optical imaging lens satisfies the following condition: (T2+G34+G45)/EFL≤1.700.

In the optical imaging lens of the present invention, ALT is a total thickness of all lens elements with refractive powers, T6 is the thickness of said sixth lens element along said optical axis, and the optical imaging lens satisfies the following condition: ALT/T6≤4.300.

In the optical imaging lens of the present invention, T1 is the thickness of said first lens element along said optical axis, and the optical imaging lens satisfies the following condition: G12/T1≤2.100.

In the optical imaging lens of the present invention, T1 is the thickness of said first lens element along said optical axis, T4 is the thickness of said fourth lens element along said optical axis, and the optical imaging lens satisfies the following condition: (T1+T3)/T4≤2.700.

In the optical imaging lens of the present invention, BFL is the distance from said image side to said sixth lens element and an imaging plane along said optical axis, G23 is the distance between said image side surface of said second lens element and said object side surface of said third lens element along said optical axis, and the optical imaging lens satisfies the following condition: BFL/G23≤1.600.

In the optical imaging lens of the present invention, T6 is the thickness of said sixth lens element along said optical axis, G23 is the distance between said image side surface of said second lens element and said object side surface of said third lens element along said optical axis, G45 is the distance between said image side surface of said fourth lens element and said object side surface of said fifth lens element along said optical axis, G56 is the distance between said image side surface of said fifth lens element and said object side surface of said sixth lens element along said optical axis, AAG is the sum of said G12, G23, G34, G45 and G56, and the optical imaging lens satisfies the following condition: AAG/T6≤2.500.

In the optical imaging lens of the present invention, the optical imaging lens further satisfies the following condition: T3/EFL≤1.400.

In the optical imaging lens of the present invention, ALT is a total thickness of all lens elements with refractive powers, G23 is the distance between said image side surface of said second lens element and said object side surface of said third lens element along said optical axis, and the optical imaging lens satisfies the following condition: ALT/G23≤4.700.

In the optical imaging lens of the present invention, T2 is the thickness of said second lens element along said optical axis, and the optical imaging lens satisfies the following condition: G12/(T2+G34+G45)≤1.400.

In the optical imaging lens of the present invention, TL is the distance from said object side surface of said first lens element to said image side surface of said sixth lens element along said optical axis, T4 is the thickness of said fourth lens element along said optical axis, BFL is the distance from said image side of said sixth lens element to an imaging plane along said optical axis, and the optical imaging lens satisfies the following condition: TL/(T4+BFL)≤8.400.

In the optical imaging lens of the present invention, TTL is the distance from said object side surface of the first lens element to an imaging plane along said optical axis, G45 is the distance between said image side surface of said fourth lens element and said object side surface of said fifth lens element along said optical axis, T5 is the thickness of said fifth lens element along said optical axis.

G56 is the distance between said image side surface of said fifth lens element and said object side surface of said sixth lens element along said optical axis, and the optical imaging lens satisfies the following condition: TTL/(T3+G34+G45+T5+G56)≤6.500.

In the optical imaging lens of the present invention, G23 is the distance between said image side surface of said second lens element and said object side surface of said third lens element along said optical axis, G45 is the distance between said image side surface of said fourth lens element and said object side surface of said fifth lens element along said optical axis, G56 is the distance between said image side surface of said fifth lens element and said object side surface of said sixth lens element along said optical axis, AAG is the sum of said G12, G23, G34, G45 and G56, and the optical imaging lens satisfies the following condition: AAG/G23≤2.300.

In the optical imaging lens of the present invention, G45 is the distance between said image side surface of said fourth lens element and said object side surface of said fifth lens element along said optical axis, T5 is the thickness of said fifth lens element along said optical axis, G56 is the distance between said image side surface of said fifth lens element and said object side surface of said sixth lens element along said optical axis, and the optical imaging lens satisfies the following condition: (G34+G45+T5+G56)/EFL≤2.000.

In the optical imaging lens of the present invention, T1 is the thickness of said first lens element along said optical axis, T4 is the thickness of said fourth lens element along said optical axis, and the optical imaging lens satisfies the following condition: (T1+G12)/T4≤2.200.

In the optical imaging lens of the present invention, TL is the distance from said object side surface of said first lens element to said image side surface of said sixth lens element along said optical axis, T2 is the thickness of said second lens element along said optical axis, G45 is the distance between said image side surface of said fourth lens element and said object side surface of said fifth lens element along said optical axis, and the optical imaging lens satisfies the following condition: TL/(T2+G34+G45)≤12.100.

In the optical imaging lens of the present invention, BFL is the distance from said image side to said sixth lens element and an imaging plane along said optical axis, T6 is the thickness of said sixth lens element along said optical axis, and the optical imaging lens satisfies the following condition: BFL/T6≤1.600.

The invention provides an optical imaging lens capable of allowing a horizontal field of view corresponding to an image sensor of the optical imaging lens to be greater than or equal to 175 degrees and allowing no dark corner in an image sensed by the image sensor.

An example of the invention provides an optical imaging lens including a first lens element, a second lens element, a third lens element, a fourth lens element, a fifth lens element, and a sixth lens element sequentially arranged along an optical axis from an object side to an image side. Each of the first lens element to the sixth lens element including an object-side surface facing the object side and allowing an imaging ray to pass through and an image-side surface facing the image side and allowing the imaging ray to pass through. The first lens element is arranged to be a lens element having refracting power in a first order from the object side to the image side. The term "refractive power" can also be referred to the other term "refracting power". The second lens element is arranged to be a lens element having refracting power in a second order from the object side to the image side. The third lens element is arranged to be a lens element having refracting power in a third order from the object side to the image side. The fourth lens element is arranged to be a lens element having refracting power in a first order from the aperture to the image side. The fifth lens element is arranged to be a lens element having refracting power in a second order from the aperture to the image side. The sixth lens element is arranged to be a lens element having refracting power in a third order from the aperture to the image side. An imaging circle of the optical imaging lens has an inscribed rectangle having an aspect ratio of 4:3. A reference line passing through a center of the imaging circle and parallel to any long side of the rectangle corresponds to an image captured at a field of view greater than or equal to 175° and less than or equal to 188°. A diagonal of the rectangle corresponds to an image captured at a field of view greater than or equal to 209° and less than or equal to 234°. The reference line extends from a short side of the rectangle to the other short side of the rectangle. A length of the reference line is equal to a length of any long side of the rectangle.

An example of the invention provides an optical imaging lens including a first lens element, a second lens element, a third lens element, a fourth lens element, a fifth lens element, and a sixth lens element sequentially arranged along an optical axis from an object side to an image side. Each of the first lens element to the sixth lens element including an object-side surface facing the object side and allowing an imaging ray to pass through and an image-side surface facing the image side and allowing the imaging ray to pass through. The first lens element is arranged to be a lens element having refracting power in a first order from the object side to the image side. The second lens element is arranged to be a lens element having refracting power in a second order from the object side to the image side. The third lens element is arranged to be a lens element having refracting power in a third order from the object side to the image side. The fourth lens element is arranged to be a lens element having refracting power in a first order from the aperture to the image side. The fifth lens element is arranged to be a lens element having refracting power in a second order from the aperture to the image side. The sixth lens element is arranged to be a lens element having refracting power in a third order from the aperture to the image side. An imaging circle of the optical imaging lens has an inscribed rectangle having an aspect ratio of 16:9. A reference line passing through a center of the imaging circle and parallel to any long side of the rectangle corresponds to an image captured at a field of view greater than or equal to 176° and less than or equal to 201°. A diagonal of the rectangle corresponds to an image captured at a field of view greater than or equal to 205° and less than or equal to 232°. The reference line extends from a short side of the rectangle to the other short side of the rectangle. A length of the reference line is equal to a length of any long side of the rectangle.

To sum up, through satisfying the above arrangement of the lens elements having refractive power and the aperture, the surface shapes, the imaging circle of the optical imaging lens, the inscribed rectangle of the imaging circle, and the relationship between the image captured at the field of view of the reference line and the image captured at the field of view of the diagonal, effects generated by the optical imaging lens provided by the examples of the invention include that the image sensed by the image sensor applying the optical imaging lens has no blind spot in the field of view in the horizontal direction, and the four corners of the image sensor may sense the imaging ray so that the image sensed by the image sensor has no dark corner.

These and other objectives of the present invention will no doubt become obvious to those of ordinary skill in the art after reading the following detailed description of the preferred example that is illustrated in the various figures and drawings.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIGS. 1-5 illustrates the methods for determining the surface shapes and for determining one region is a region in a vicinity of the optical axis or the region in a vicinity of its periphery of one lens element.

FIG. 8 illustrates a second example of the optical imaging lens of the present invention.

FIG. 9A illustrates the longitudinal spherical aberration on the image plane of the second example.

FIG. 9B illustrates the astigmatic aberration on the sagittal direction of the second example.

FIG. 9C illustrates the astigmatic aberration on the tangential direction of the second example.

FIG. 9D illustrates the distortion aberration of the second example.

FIG. 14 illustrates a fifth example of the optical imaging lens of the present invention.

FIG. 15A illustrates the longitudinal spherical aberration on the image plane of the fifth example.

FIG. 15B illustrates the astigmatic aberration on the sagittal direction of the fifth example.

FIG. 15C illustrates the astigmatic aberration on the tangential direction of the fifth example.

FIG. 15D illustrates the distortion aberration of the fifth example.

FIG. 18 illustrates a seventh example of the optical imaging lens of the present invention.

FIG. 19A illustrates the longitudinal spherical aberration on the image plane of the seventh example.

FIG. 19B illustrates the astigmatic aberration on the sagittal direction of the seventh example.

FIG. 19C illustrates the astigmatic aberration on the tangential direction of the seventh example.

FIG. 19D illustrates the distortion aberration of the seventh example.

FIG. 26 illustrates an eleventh example of the optical imaging lens of the present invention.

FIG. 27A illustrates the longitudinal spherical aberration on the image plane of the eleventh example.

FIG. 27B illustrates the astigmatic aberration on the sagittal direction of the eleventh example.

FIG. 27C illustrates the astigmatic aberration on the tangential direction of the eleventh example.

FIG. 27D illustrates the distortion aberration of the eleventh example.

FIG. 28 illustrates a twelfth example of the optical imaging lens of the present invention.

FIG. 29A illustrates the longitudinal spherical aberration on the image plane of the twelfth example.

FIG. 29B illustrates the astigmatic aberration on the sagittal direction of the eleventh example.

FIG. 29C illustrates the astigmatic aberration on the tangential direction of the twelfth example.

FIG. 29D illustrates the distortion aberration of the twelfth example.

FIG. 30 shows the optical data of the first example of the optical imaging lens.

FIG. 31 shows the aspheric surface data of the first example.

FIG. 32 shows the optical data of the second example of the optical imaging lens.

FIG. 33 shows the aspheric surface data of the second example.

FIG. 34 shows the optical data of the third example of the optical imaging lens.

FIG. 35 shows the aspheric surface data of the third example.

FIG. 36 shows the optical data of the fourth example of the optical imaging lens.

FIG. 37 shows the aspheric surface data of the fourth example.

FIG. 38 shows the optical data of the fifth example of the optical imaging lens.

FIG. 39 shows the aspheric surface data of the fifth example.

FIG. 40 shows the optical data of the sixth example of the optical imaging lens.

FIG. 41 shows the aspheric surface data of the sixth example.

FIG. 42 shows the optical data of the seventh example of the optical imaging lens.

FIG. 43 shows the aspheric surface data of the seventh example.

FIG. 44 shows the optical data of the eighth example of the optical imaging lens.

FIG. 45 shows the aspheric surface data of the eighth example.

FIG. 46 shows the optical data of the ninth example of the optical imaging lens.

FIG. 47 shows the aspheric surface data of the ninth example.

FIG. 48 shows the optical data of the tenth example of the optical imaging lens.

FIG. 49 shows the aspheric surface data of the tenth example.

FIG. 50 shows the optical data of the eleventh example of the optical imaging lens.

FIG. 51 shows the aspheric surface data of the eleventh example.

FIG. 52 shows the optical data of the twelfth example of the optical imaging lens.

FIG. 53 shows the aspheric surface data of the twelfth example.

FIG. 54 shows important parameters of the first example to the fifth example.

FIG. 55 shows important parameters of the first example to the fifth example.

FIG. 56 shows important parameters of the sixth example to the twelfth example.

FIG. 57 shows important parameters of the sixth example to the twelfth example.

FIG. 70C illustrates the astigmatism aberration on the tangential direction of the eighteenth example.

FIG. 70D illustrates the distortion aberration of the eighteenth example.

FIG. 71 illustrates a nineteenth example of the optical imaging lens of the invention.

FIG. 72A illustrates the longitudinal spherical aberration on the image plane of the nineteenth example.

FIG. 72B illustrates the astigmatic aberration on the sagittal direction of the nineteenth example.

FIG. 72C illustrates the astigmatism aberration on the tangential direction of the nineteenth example.

FIG. 72D illustrates the distortion aberration of the nineteenth example.

FIG. 73 illustrates a twentieth example of the optical imaging lens of the invention.

FIG. 74A illustrates the longitudinal spherical aberration on the image plane of the twentieth example.

FIG. 74B illustrates the astigmatic aberration on the sagittal direction of the twentieth example.

FIG. 74C illustrates the astigmatism aberration on the tangential direction of the twentieth example.

FIG. 74D illustrates the distortion aberration of the twentieth example.

Figure 75:
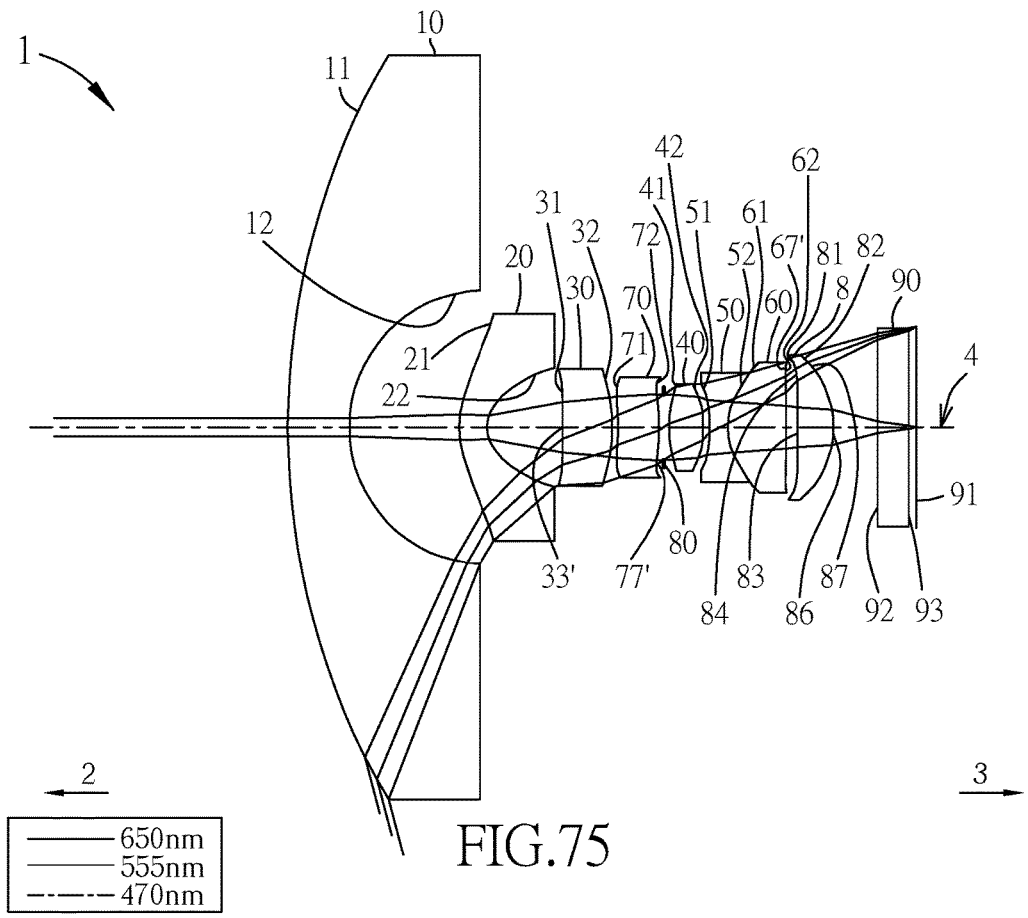

FIG. 75 illustrates a twenty-first example of the optical imaging lens of the invention.

Figures 76A, 76B, 76C, 76D:
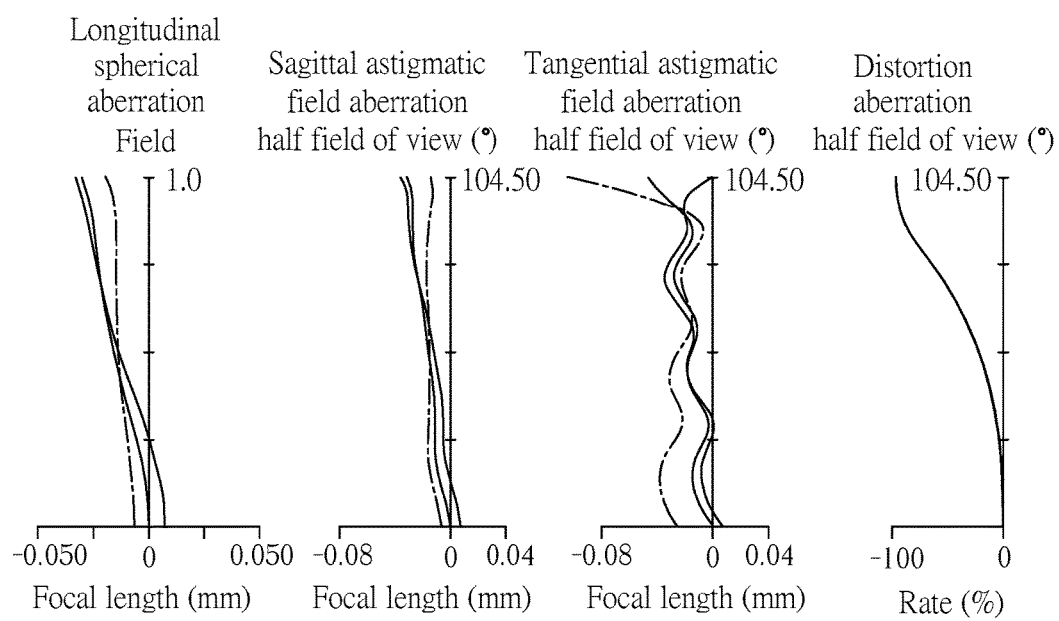

FIG. 76A illustrates the longitudinal spherical aberration on the image plane of the twenty-first example.

FIG. 76B illustrates the astigmatic aberration on the sagittal direction of the twenty-first example.

FIG. 76C illustrates the astigmatism aberration on the tangential direction of the twenty-first example.

FIG. 76D illustrates the distortion aberration of the twenty-first example.

FIG. 77 shows the detailed optical data of the thirteenth example.

FIG. 78 shows the detailed aspheric surface data of the thirteenth example.

FIG. 79 shows the detailed optical data of the fourteenth example.

FIG. 80 shows the detailed aspheric surface data of the fourteenth example.

FIG. 81 shows the detailed optical data of the fifteenth example.

FIG. 82 shows the detailed aspheric surface data of the fifteenth example.

FIG. 83 shows the detailed optical data of the sixteenth example.

FIG. 84 shows the detailed aspheric surface data of the sixteenth example.

FIG. 85 shows the detailed optical data of the seventeenth example.

FIG. 86 shows the detailed aspheric surface data of the seventeenth example.

FIG. 87 shows the detailed optical data of the eighteenth example.

FIG. 88 shows the detailed aspheric surface data of the eighteenth example.

FIG. 89 shows the detailed optical data of the nineteenth example.

FIG. 90 shows the detailed aspheric surface data of the nineteenth example.

FIG. 91 shows the detailed optical data of the twentieth example.

FIG. 92 shows the detailed aspheric surface data of the twentieth example.

FIG. 93 shows the detailed optical data of the twenty-first example.

FIG. 94 shows the detailed aspheric surface data of the twenty-first example.

FIG. 95 shows important parameters of the thirteenth example to the seventeenth example.

FIG. 96 shows important parameters of the thirteenth example to the seventeenth example.

FIG. 97 shows important parameters of the eighteenth example to the twenty-first example.

FIG. 98 shows important parameters of the eighteenth example to the twenty-first example.

FIG. 99 to FIG. 101 shows the values of the image height y, the half field of view ω (unit: degree), the half field of view ω (unit: radian), and the corresponding y/(EFL*ω) in the optical imaging lens 1.

DESCRIPTION OF THE EMBODIMENTS

Before the detailed description of the present invention, the first thing to be noticed is that in the present invention, similar (not necessarily identical) elements are labeled as the same numeral references. In the present specification, the description "a lens element having positive refracting power (or negative refracting power)" means that the paraxial refracting power of the lens element in Gaussian optics is positive (or negative). The description "An object-side (or image-side) surface of a lens element" only includes a specific region of that surface of the lens element where imaging rays are capable of passing through that region, namely the clear aperture of the surface. The aforementioned imaging rays can be classified into two types, chief ray Lc and marginal ray Lm. Taking a lens element depicted in FIG. 1 as an example, the lens element is rotationally symmetric, where the optical axis I is the axis of symmetry. The region A of the lens element is defined as "a portion in a vicinity of the optical axis", and the region C of the lens element is defined as "a portion in a vicinity of a periphery of the lens element". Besides, the lens element may also have an extending portion E extended radially and outwardly from the region C, namely the portion outside of the clear aperture of the lens element. The extending portion E is usually used for physically assembling the lens element into an optical imaging lens system. Under normal circumstances, the imaging rays would not pass through the extending portion E because those imaging rays only pass through the clear aperture. The structures and shapes of the aforementioned extending portion E are only examples for technical explanation, the structures and shapes of lens elements should not be limited to these examples. Note that the extending portions of the lens element surfaces depicted in the following embodiments are partially omitted.

The following criteria are provided for determining the shapes and the portions of lens element surfaces set forth in the present specification. These criteria mainly determine the boundaries of portions under various circumstances including the portion in a vicinity of the optical axis, the portion in a vicinity of a periphery of a lens element surface, and other types of lens element surfaces such as those having multiple portions.

Figures 1, 2:
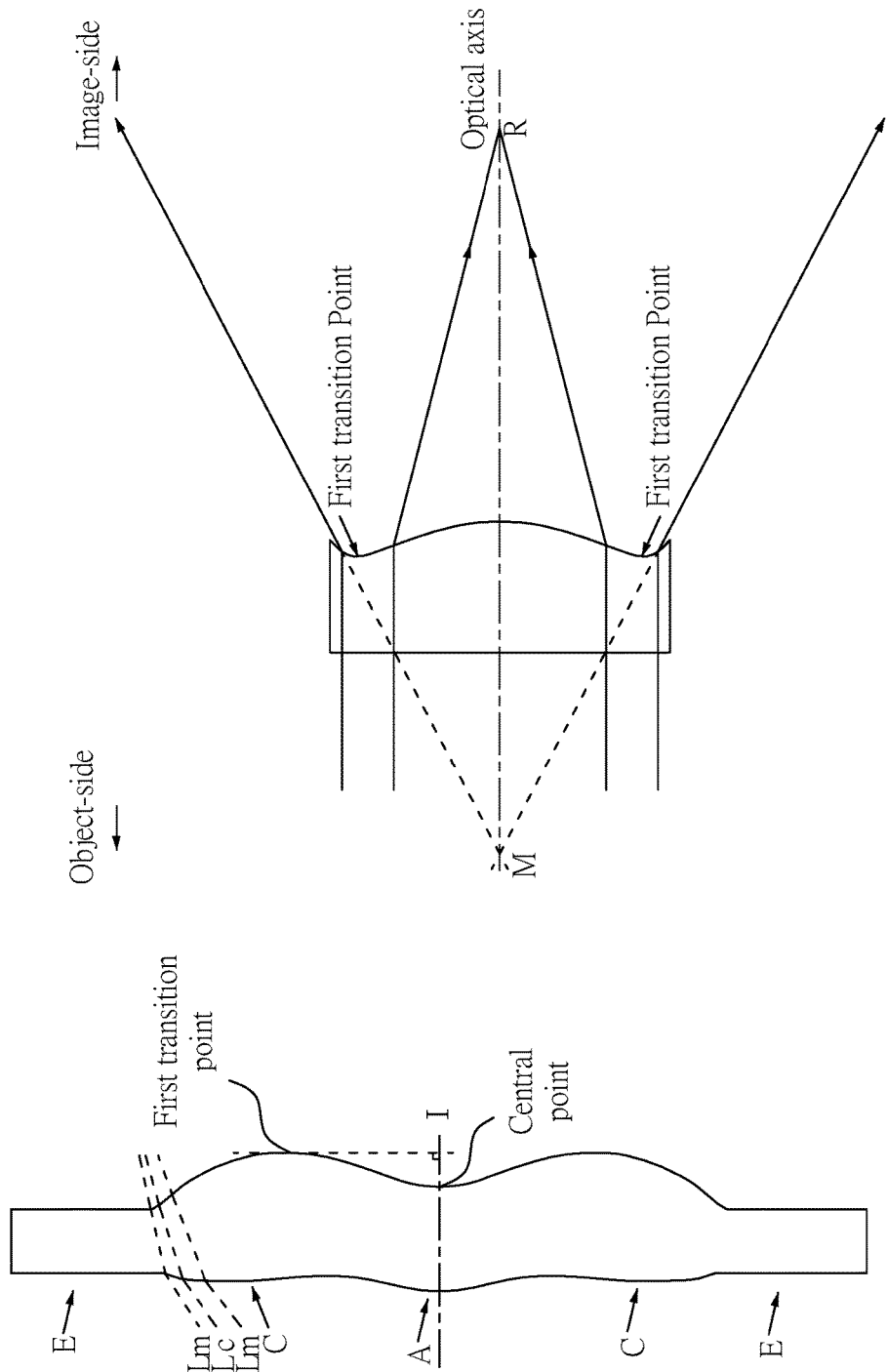

1. FIG. 1 is a radial cross-sectional view of a lens element. Before determining boundaries of those aforesaid portions, two referential points should be defined first, central point and transition point. The central point of a surface of a lens element is a point of intersection of that surface and the optical axis. The transition point is a point on a surface of a lens element, where the tangent line of that point is perpendicular to the optical axis. Additionally, if multiple transition points appear on one single surface, then these transition points are sequentially named along the radial direction of the surface with numbers starting from the first transition point. For instance, the first transition point (closest one to the optical axis), the second transition point, and the Nth transition point (farthest one to the optical axis within the scope of the clear aperture of the surface). The portion of a surface of the lens element between the central point and the first transition point is defined as the portion in a vicinity of the optical axis. The portion located radially outside of the Nth transition point (but still within the scope of the clear aperture) is defined as the portion in a vicinity of a periphery of the lens element. In some embodiments, there are other portions existing between the portion in a vicinity of the optical axis and the portion in a vicinity of a periphery of the lens element; the numbers of portions depend on the numbers of the transition point(s). In addition, the radius of the clear aperture (or a so-called effective radius) of a surface is defined as the radial distance from the optical axis I to a point of intersection of the marginal ray Lm and the surface of the lens element.

2. Referring to FIG. 2, determining the shape of a portion is convex or concave depends on whether a collimated ray passing through that portion converges or diverges. That is, while applying a collimated ray to a portion to be determined in terms of shape, the collimated ray passing through that portion will be bended and the ray itself or its extension line will eventually meet the optical axis. The shape of that portion can be determined by whether the ray or its extension line meets (intersects) the optical axis (focal point) at the object-side or image-side. For instance, if the ray itself intersects the optical axis at the image side of the lens element after passing through a portion, i.e. the focal point of this ray is at the image side (see point R in FIG. 2), the portion will be determined as having a convex shape. On the contrary, if the ray diverges after passing through a portion, the extension line of the ray intersects the optical axis at the object side of the lens element, i.e. the focal point of the ray is at the object side (see point M in FIG. 2), that portion will be determined as having a concave shape. Therefore, referring to FIG. 2, the portion between the central point and the first transition point has a convex shape, the portion located radially outside of the first transition point has a concave shape, and the first transition point is the point where the portion having a convex shape changes to the portion having a concave shape, namely the border of two adjacent portions. Alternatively, there is another common way for a person with ordinary skill in the art to tell whether a portion in a vicinity of the optical axis has a convex or concave shape by referring to the sign of an "R" value, which is the (paraxial) radius of curvature of a lens surface. The R value which is commonly used in conventional optical design software such as Zemax and CodeV. The R value usually appears in the lens data sheet in the software. For an object-side surface, positive R means that the object-side surface is convex, and negative R means that the object-side surface is concave. Conversely, for an image-side surface, positive R means that the image-side surface is concave, and negative R means that the image-side surface is convex. The result found by using this method should be consistent as by using the other way mentioned above, which determines surface shapes by referring to whether the focal point of a collimated ray is at the object side or the image side.

3. For none transition point cases, the portion in a vicinity of the optical axis is defined as the portion between 0~50% of the effective radius (radius of the clear aperture) of the surface, whereas the portion in a vicinity of a periphery of the lens element is defined as the portion between 50~100% of effective radius (radius of the clear aperture) of the surface.

Referring to the first example depicted in FIG. 3, only one transition point, namely a first transition point, appears within the clear aperture of the image-side surface of the lens element. Portion I is a portion in a vicinity of the optical axis, and portion II is a portion in a vicinity of a periphery of the lens element. The portion in a vicinity of the optical axis is determined as having a concave surface due to the R value at the image-side surface of the lens element is positive. The shape of the portion in a vicinity of a periphery of the lens element is different from that of the radially inner adjacent portion, i.e. the shape of the portion in a vicinity of a periphery of the lens element is different from the shape of the portion in a vicinity of the optical axis; the portion in a vicinity of a periphery of the lens element has a convex shape.

Referring to the second example depicted in FIG. 4, a first transition point and a second transition point exist on the object-side surface (within the clear aperture) of a lens element. In which portion I is the portion in a vicinity of the optical axis, and portion III is the portion in a vicinity of a periphery of the lens element. The portion in a vicinity of the optical axis has a convex shape because the R value at the object-side surface of the lens element is positive. The portion in a vicinity of a periphery of the lens element (portion III) has a convex shape. What is more, there is another portion having a concave shape existing between the first and second transition point (portion II).

Referring to a third example depicted in FIG. 5, no transition point exists on the object-side surface of the lens element. In this case, the portion between 0~50% of the effective radius (radius of the clear aperture) is determined as the portion in a vicinity of the optical axis, and the portion between 50~100% of the effective radius is determined as the portion in a vicinity of a periphery of the lens element. The portion in a vicinity of the optical axis of the object-side surface of the lens element is determined as having a convex shape due to its positive R value, and the portion in a vicinity of a periphery of the lens element is determined as having a convex shape as well.

Figures 6, 7A, 7B, 7C, 7D:
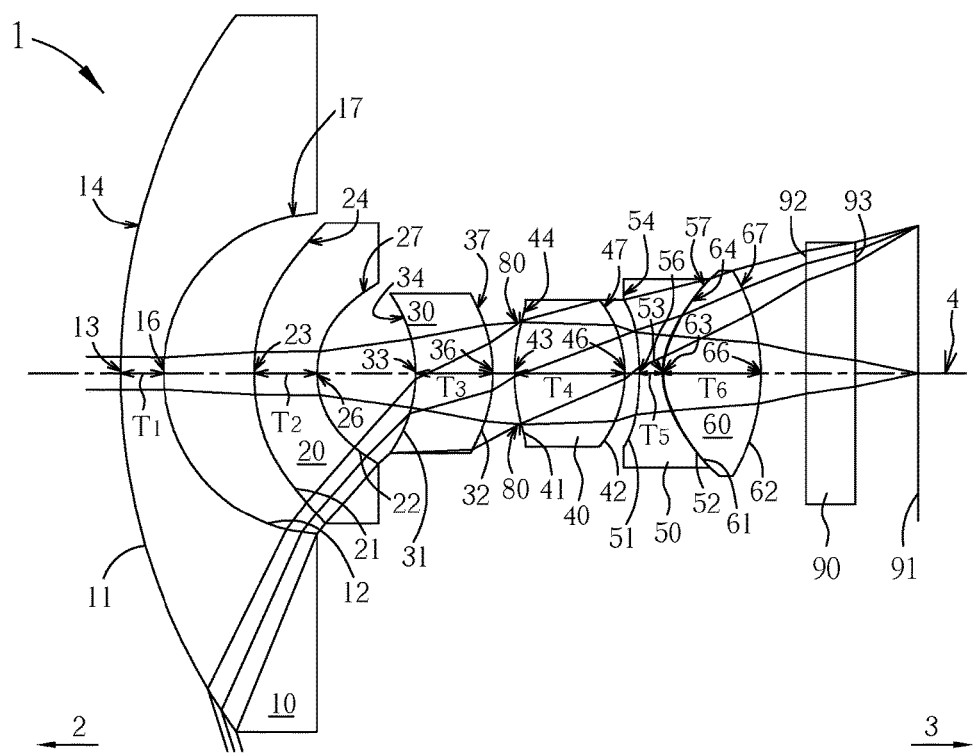
FIG. 6 illustrates a first example of the optical imaging lens of the present invention.
FIG. 7A illustrates the longitudinal spherical aberration on the image plane of the first example.
FIG. 7B illustrates the astigmatic aberration on the sagittal direction of the first example.
FIG. 7C illustrates the astigmatic aberration on the tangential direction of the first example.
FIG. 7D illustrates the distortion aberration of the first example.

As shown in FIG. 6, the optical imaging lens 1 of the present invention, sequentially located from an object side 2 (where an object is located) to an image side 3 along an optical axis 4, has a first lens element 10, a second lens element 20, a third lens element 30, a fourth lens element 40, a fifth lens element 50, a sixth lens element 60, a filter 90 and an image plane 91. Here the first lens with refractive power from said object side 2 to said image side 3 is defined as a first lens element 10, the second lens with refractive power from said object 2 side to said image side 3 is defined as a second lens element 20, the fourth lens with refractive power from said image side 3 to said object side 2 is defined as a third lens element 30, the third lens with refractive power from said image side 3 to said object side 2 is defined as a fourth lens element 40, the second lens with refractive power from said image side 3 to said object side 2 is defined as a fifth lens element 50, the first lens with refractive power from said image side 3 to said object side 2 is defined as a sixth lens element 60. Generally speaking, the first lens element 10, the second lens element 20, the third lens element 30, the fourth lens element 40, the fifth lens element 50 and the sixth lens element 60 may be made of a transparent plastic material or transparent glass material but the present invention is not limited to this. The third lens element 30 is made of transparent plastic material, helps to reduce the weight of the optical imaging lens and reduce the manufacturing cost while achieving the good effect of the present invention.

Furthermore, the optical imaging lens 1 includes an aperture stop (ape. stop) 80 disposed in an appropriate position. In FIG. 6, the aperture stop 80 is disposed between the third lens element 30 and the fourth lens element 40. When light emitted or reflected by an object (not shown) which is located at the object side 2 enters the optical imaging lens 1 of the present invention, it forms a clear and sharp image on the image plane 91 at the image side 3 after passing through the first lens element 10, the second lens element 20, the third lens element 30, the aperture stop 80, the fourth lens element 40, the fifth lens element 50, the sixth lens element 60 and the filter 90. In one examples of the present invention, the optional filter 90 may be a filter of various suitable functions, for example, the filter 90 may be a cut filter of a specific wavelength, placed between the image side surface 62 of the sixth lens element 60 and the image plane 91.

Each lens element in the optical imaging lens 1 of the present invention has an object side surface facing toward the object side 2 as well as an image side surface facing toward the image side 3. For example, the first lens element 10 has an object side surface 11 and an image side surface 12; the second lens element 20 has an object side surface 21 and an image side surface 22; the third lens element 30 has an object side surface 31 and an image side surface 32; the fourth lens element 40 has an object side surface 41 and an image side surface 42; the fifth lens element 50 has an object side surface 51 and an image side surface 52; and the sixth lens element 60 has an object side surface 61 and an image side surface 62. In addition, each object side surface and image side surface in the optical imaging lens 1 of the present invention has a portion (or region) in a vicinity of its periphery (periphery region) as well as a portion in a vicinity of the optical axis (optical axis portion).

Each lens element in the optical imaging lens 1 of the present invention further has a central thickness T on the optical axis 4. For example, the first lens element 10 has a first lens element thickness T1, the second lens element 20 has a second lens element thickness T2, the third lens element 30 has a third lens element thickness T3, the fourth lens element 40 has a fourth lens element thickness T4, the fifth lens element 50 has a fifth lens element thickness T5, the sixth lens element 60 has a sixth lens element thickness T6. Besides, the total thickness of all the lens elements with reactive powers in the optical imaging lens 1 along the optical axis 4 is ALT.

In addition, the distances are disposed between every two adjacent lens elements in the optical imaging lens 1 of the present invention along the optical axis 4. For example, G12 is the distance between the image side surface 12 of the first lens element 10 and the object side surface 21 of the second lens element 20 along the optical axis, G23 is the distance between the image side surface 22 of the second lens element 20 and the object side surface 31 of the third lens element 30 along the optical axis 4, G34 is the distance between the image side surface 32 of the third lens element 30 and the object side surface 41 of the fourth lens element 40 along the optical axis 4, G45 is the distance between the image side surface 42 of the fourth lens element 40 and the object side surface 51 of the fifth lens element 50 along the optical axis 4, G56 is the distance between the image side surface 52 of the fifth lens element 50 and the object side surface 61 of the sixth lens element 60 along the optical axis 4.

Besides, AAG is defined as G12+G23+G34+G45+G56.

In addition, the distance between the object side surface 11 of the first lens element 10 to the image plane 91 along the optical axis 4 is TTL; the effective focal length of the optical imaging lens is EFL; the distance between the image side surface 62 of the sixth lens element 60 and the image plane 91 along the optical axis 4 is BFL; the distance from the object side surface 11 of the first lens element 10 to the image side surface 62 of the sixth lens element 60 along the optical axis 4 is TL.

Furthermore, the focal length of the first lens element 10 is f1; the focal length of the second lens element 20 is f2; the focal length of the third lens element 30 is f3; the focal length of the fourth lens element 40 is f4; the focal length of the fifth lens element 50 is f5; the focal length of the sixth lens element 60 is f6; the refractive index of the first lens element 10 is n1; the refractive index of the second lens element 20 is n2; the refractive index of the third lens element 30 is n3; the refractive index of the fourth lens element 40 is n4; the refractive index of the fifth lens element 50 is n5; the refractive index of the sixth lens element 60 is n6; the Abbe number of the first lens element 10 is v1; the Abbe number of the second lens element 20 is v2; the Abbe number of the third lens element 30 is v3; and the Abbe number of the fourth lens element 40 is v4; the Abbe number of the fifth lens element 50 is v5; and the Abbe number of the sixth lens element 60 is v6. The distance between the image side surface 62 of the sixth lens element 60 to the filter 90 along the optical axis 4 is G6F; the thickness of the filter 90 along the optical axis 4 is TF; the distance between the filter 90 to the image plane 91 along the optical axis 4 is GFP; the distance between the image side surface 62 of the sixth lens element 60 and the image plane 91 along the optical axis 4 is BFL. Therefore, BFL=G6F+TF+GFP.

First Example

Please refer to FIG. 6 which illustrates the first example of the optical imaging lens 1 of the present invention. Please refer to FIG. 7A for the longitudinal spherical aberration on the image plane 71 of the first example; please refer to FIG. 7B for the astigmatic field aberration on the sagittal direction; please refer to FIG. 7C for the astigmatic field aberration on the tangential direction, and please refer to FIG. 7D for the distortion aberration. The Y axis of the spherical aberration in each example is "field of view" for 1.0. The Y axis of the astigmatic field and the distortion in each example stands for "image height", which is 2.084 mm.

The optical imaging lens 1 of the first example has six lens elements 10, 20, 30, 40, 50, and 60 with refractive power. The optical imaging lens 1 also has a filter 90, an aperture stop 80, and an image plane 91. The aperture stop 80 is provided between the third lens element 30 and the fourth lens element 40. The filter 90 may be used for preventing specific wavelength light reaching the image plane to adversely affect the imaging quality.

The first lens element 10 is made of a glass material and has negative refractive power. The object side surface 11 facing toward the object side 2 has a convex portion 13 in the vicinity of the optical axis and a convex portion 14 in a vicinity of its periphery. The image side surface 12 facing toward the image side 3 has a concave portion 16 in the vicinity of the optical axis and a concave portion 17 in a vicinity of its periphery. Besides, both the object side surface 11 and the image side 12 of the first lens element 10 are spherical surfaces.

The second lens element 20 is made of a plastic material and has negative refractive power. The object side surface 21 facing toward the object side 2 has a convex portion 23 in the vicinity of the optical axis 4 and a convex portion 24 in a vicinity of its periphery. The image side surface 22 facing toward the image side 3 has a concave portion 26 in the vicinity of the optical axis 4 and a concave portion 27 in a vicinity of its periphery. Besides, both the object side surface 21 and the image side 22 of the second lens element 20 are aspherical surfaces.

The third lens element 30 is made of a plastic material and has positive refractive power. The object side surface 31 facing toward the object side 2 has a concave portion 33 in the vicinity of the optical axis 4 and a concave portion 34 in a vicinity of its periphery. The image side surface 32 facing toward the image side 3 has a convex portion 36 in the vicinity of the optical axis 4 and a convex portion 37 in a vicinity of its periphery. Besides, both the object side surface 31 and the image side 32 of the third lens element 30 are aspherical surfaces.

The fourth lens element 40 is made of a plastic material and has positive refractive power. The object side surface 41 facing toward the object side 2 has a convex portion 43 in the vicinity of the optical axis 4 and a convex portion 44 in a vicinity of its periphery. The image side surface 42 facing toward the image side 3 has a convex portion 46 in the vicinity of the optical axis 4 and a convex portion 47 in a vicinity of its periphery. Besides, both the object side surface 41 and the image side 42 of the fourth lens element 40 are aspherical surfaces.

The fifth lens element 50 is made of a plastic material and has negative refractive power. The object side surface 51 facing toward the object side 2 has a concave portion 53 in the vicinity of the optical axis 4 and a concave portion 54 in a vicinity of its periphery. The image side surface 52 facing toward the image side 3 has a concave portion 56 in the vicinity of the optical axis 4 and a concave portion 57 in a vicinity of its periphery. Besides, both the object side surface 51 and the image side 52 of the fifth lens element 50 are aspherical surfaces.

The sixth lens element 60 is made of a plastic material and has positive refractive power. The object side surface 61 facing toward the object side 2 has a convex portion 63 in the vicinity of the optical axis and a convex portion 64 in a vicinity of its periphery. The image side surface 62 facing toward the image side 3 has a convex portion 66 in the vicinity of the optical axis and a convex portion 67 in a vicinity of its periphery. Besides, both the object side surface 61 and the image side 62 of the sixth lens element 60 are aspherical surfaces. In this example, a colloid or film body is filled between the fifth lens element 50 and the sixth lens element 60, but not limited thereto. The filter 90 is disposed between the image side 62 of the sixth lens element 60 and the image plane 91.

In the first lens element 10, the second lens element 20, the third lens element 30, the fourth lens element 40, the fifth lens element 50 and the sixth lens element 60 of the optical imaging lens element 1 of the present invention, there are 12 surfaces, such as the object side surfaces 11/21/31/41/51/61 and the image side surfaces 12/22/32/42/52/62. If a surface is aspherical, these aspheric coefficients are defined according to the following formula (1):

$$Z(Y) = \frac{Y^2}{R} \bigg/ \left(1 + \sqrt{1-(1+K)\frac{Y^2}{R^2}}\right) + \sum_{i=1}^{n} a_i \times Y^i \quad (1)$$

In which:

R represents the curvature radius of the lens element surface;

Z represents the depth of an aspherical surface (the perpendicular distance between the point of the aspherical surface at a distance Y from the optical axis and the tangent plane of the vertex on the optical axis of the aspherical surface);

Y represents a vertical distance from a point on the aspherical surface to the optical axis;

K is a conic constant;

ai is the aspheric coefficient of the ith order.

Note that in the case of an aspherical surface, the conic constant K and the aspheric coefficient ai of the ith order are both 0 and are shown in the table.

The optical data of the first example of the optical imaging lens 1 are shown in FIG. 30 while the aspheric surface data are shown in FIG. 31. There is a virtual reference surface (VRS) of infinite curvature radius (not shown), disposed between the filter 90 and the image plane 91. In the present examples of the optical imaging lens, the f-number of the entire optical lens element system is Fno, EFL is the effective focal length, half field of view (referred to as HFOV) stands for the half field of view which is half of the field of view of the entire optical imaging lens 1, and the unit for the curvature radius, the thickness and the focal length is in millimeters (mm). System image height (referred to as ImgH) ImgH=2.084 mm; EFL=1.131 mm; HFOV=107.500 degrees; TTL=11.265 mm; Fno=2.400. In addition, the optical imaging lens of the first example has good back focal length variation performance, the back focal length variation is 0.000 mm at room temperature 20° C., in this example, the back focal length variation is −0.040 mm at ambient temperature −20° C., and the back focal length variation is 0.066 mm at ambient temperature 80° C.

Second Example

Please refer to FIG. 8 which illustrates the second example of the optical imaging lens 1 of the present invention. It is noted that from the second example to the following examples, in order to simplify the figures, only the components different from what the first example has, and the basic lens elements will be labeled in figures. Other components that are the same as what the first example has, such as the object side surface, the image side surface, the portion in a vicinity of the optical axis and the portion in a vicinity of its periphery will be omitted in the following examples. Please refer to FIG. 9A for the longitudinal spherical aberration on the image plane 71 of the second example, please refer to FIG. 9B for the astigmatic aberration on the sagittal direction, please refer to FIG. 9C for the astigmatic aberration on the tangential direction, and please refer to FIG. 9D for the distortion aberration. The components in the second example are similar to those in the first example, but the optical data such as the curvature radius, the lens thickness, the aspheric surface or the back focal length in this example are different from the optical data in the first example.

The optical data of the second example of the optical imaging lens are shown in FIG. 32 while the aspheric surface data are shown in FIG. 33. TTL=2.786 mm; EFL=1.370 mm; HFOV=107.500 degrees; TTL=11.136 mm; Fno=2.400. In particular, the fabrication of the second example is easier than the first example so the yield is better. In addition, the optical imaging lens of the second example has good back focal length variation performance, the back focal length variation is 0.000 mm at room temperature 20° C., in this example, the back focal length variation is −0.046 mm at ambient temperature −20° C., and the back focal length variation is 0.076 mm at ambient temperature 80° C.

Third Example

Figure 10:
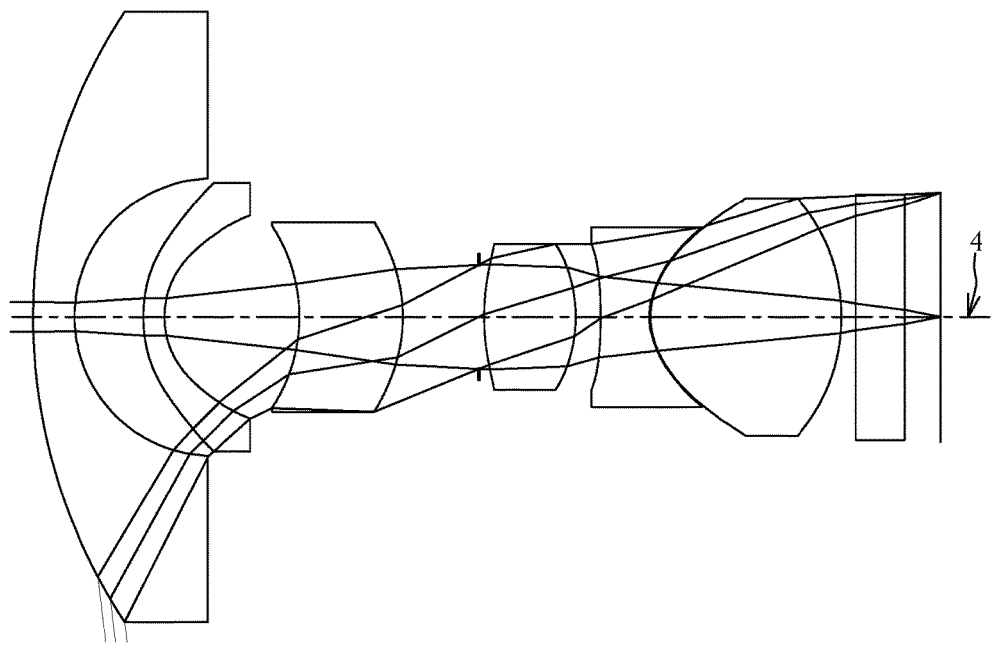
FIG. 10 illustrates a third example of the optical imaging lens of the present invention.
Figures 11A, 11B, 11C, 11D:
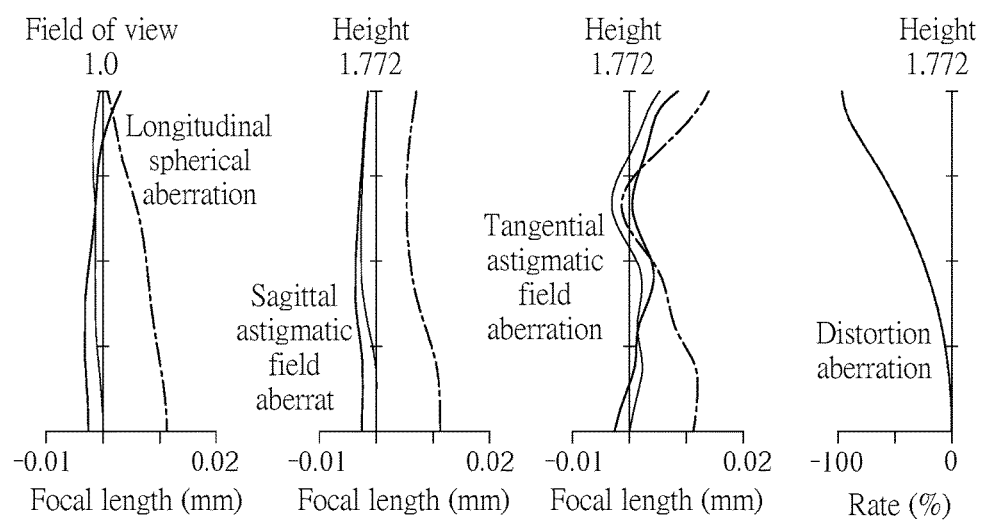
FIG. 11A illustrates the longitudinal spherical aberration on the image plane of the third example.
FIG. 11B illustrates the astigmatic aberration on the sagittal direction of the third example.
FIG. 11C illustrates the astigmatic aberration on the tangential direction of the third example.
FIG. 11D illustrates the distortion aberration of the third example.

Please refer to FIG. 10 which illustrates the third example of the optical imaging lens 1 of the present invention. Please refer to FIG. 11A for the longitudinal spherical aberration on the image plane 71 of the third example; please refer to FIG. 11B for the astigmatic aberration on the sagittal direction; please refer to FIG. 11C for the astigmatic aberration on the tangential direction, and please refer to FIG. 11D for the distortion aberration. The components in the third example are similar to those in the first example, but the optical data such as the curvature radius, the lens thickness, the aspheric surface or the back focal length in this example are different from the optical data in the first example.

The optical data of the third example of the optical imaging lens are shown in FIG. 34 while the aspheric surface data are shown in FIG. 35. TTL=1.772 mm; EFL=1.105 mm; HFOV=96.750 degrees; TTL=12.911 mm; Fno=2.600. In particular, the fabrication of the third example is easier than the first example so the yield is better. In addition, the optical imaging lens of the third example has good back focal length variation performance, the back focal length variation is 0.000 mm at room temperature 20° C., in this example, the back focal length variation is −0.041 mm at ambient temperature −20° C., and the back focal length variation is 0.066 mm at ambient temperature 80° C.

Fourth Example

Figure 12:
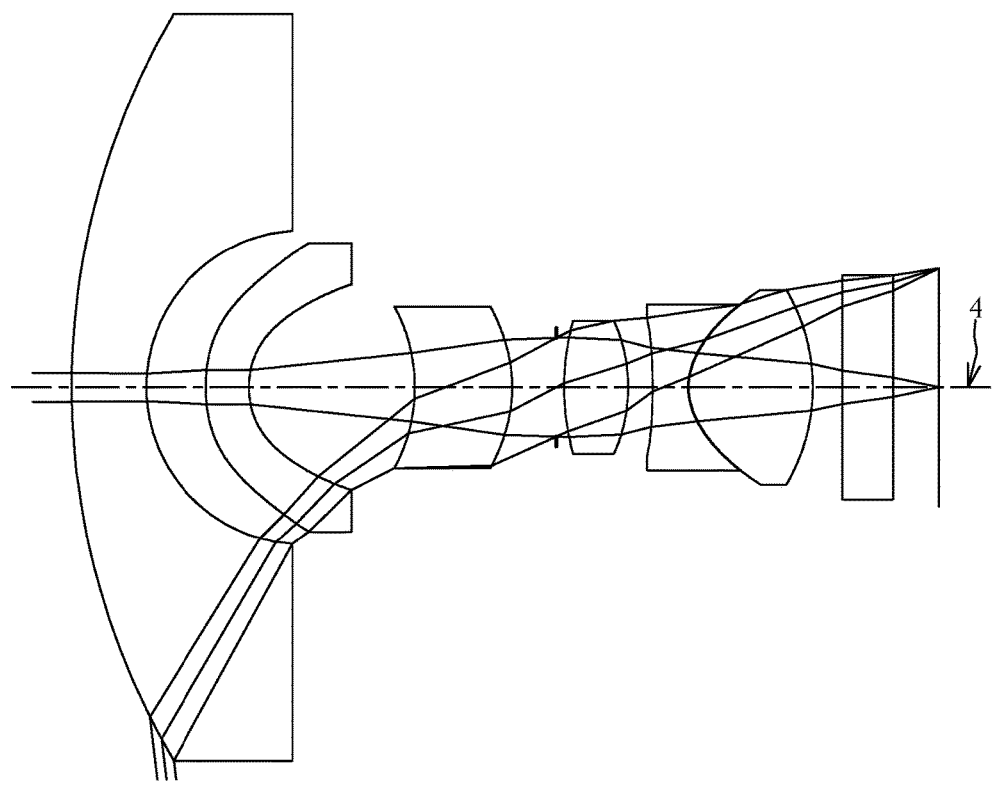
FIG. 12 illustrates a fourth example of the optical imaging lens of the present invention.
Figures 13A, 13B, 13C, 13D:
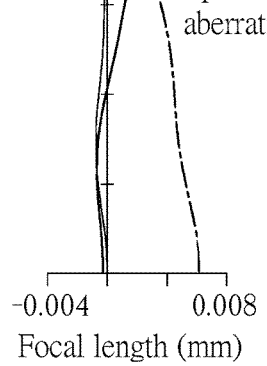
FIG. 13A illustrates the longitudinal spherical aberration on the image plane of the fourth example.
FIG. 13B illustrates the astigmatic aberration on the sagittal direction of the fourth example.
FIG. 13C illustrates the astigmatic aberration on the tangential direction of the fourth example.
FIG. 13D illustrates the distortion aberration of the fourth example.

Please refer to FIG. 12 which illustrates the fourth example of the optical imaging lens 1 of the present invention. Please refer to FIG. 13A for the longitudinal spherical aberration on the image plane 71 of the fourth example; please refer to FIG. 13B for the astigmatic aberration on the sagittal direction; please refer to FIG. 13C for the astigmatic aberration on the tangential direction, and please refer to FIG. 13D for the distortion aberration. The components in the fourth example are similar to those in the first example, but the optical data such as the curvature radius, the lens thickness, the aspheric surface or the back focal length in this example are different from the optical data in the first example.

The optical data of the fourth example of the optical imaging lens are shown in FIG. 36 while the aspheric surface data are shown in FIG. 37. TTL=1.636 mm; EFL=0.962 mm; HFOV=96.750 degrees; TTL=11.925 mm; Fno=2.400. In particular, the fabrication of the fourth example is easier than the first example so the yield is better. In addition, the optical imaging lens of the fourth example has good back focal length variation performance, the back focal length variation is 0.000 mm at room temperature 20° C., in this example, the back focal length variation is −0.034 mm at ambient temperature −20° C., and the back focal length variation is 0.054 mm at ambient temperature 80° C.

Fifth Example

Please refer to FIG. 14 which illustrates the fifth example of the optical imaging lens 1 of the present invention. Please refer to FIG. 15A for the longitudinal spherical aberration on the image plane 71 of the fifth example; please refer to FIG. 15B for the astigmatic aberration on the sagittal direction; please refer to FIG. 15C for the astigmatic aberration on the tangential direction, and please refer to FIG. 15D for the distortion aberration. The components in the fifth example are similar to those in the first example, but the optical data such as the curvature radius, the lens thickness, the aspheric surface or the back focal length in this example are different from the optical data in the first example.

The optical data of the fifth example of the optical imaging lens are shown in FIG. 38 while the aspheric surface data are shown in FIG. 39. TTL=3.450 mm; EFL=1.973 mm; HFOV=107.500 degrees; TTL=13.074 mm; Fno=2.600. In particular, the fabrication of the fifth example is easier than the first example so the yield is better. In addition, the optical imaging lens of the fifth example has good back focal length variation performance, the back focal length variation is 0.000 mm at room temperature 20° C., in this example, the back focal length variation is −0.063 mm at ambient temperature −20° C., and the back focal length variation is 0.098 mm at ambient temperature 80° C.

Sixth Example

Figures 16, 17A, 17B, 17C, 17D:
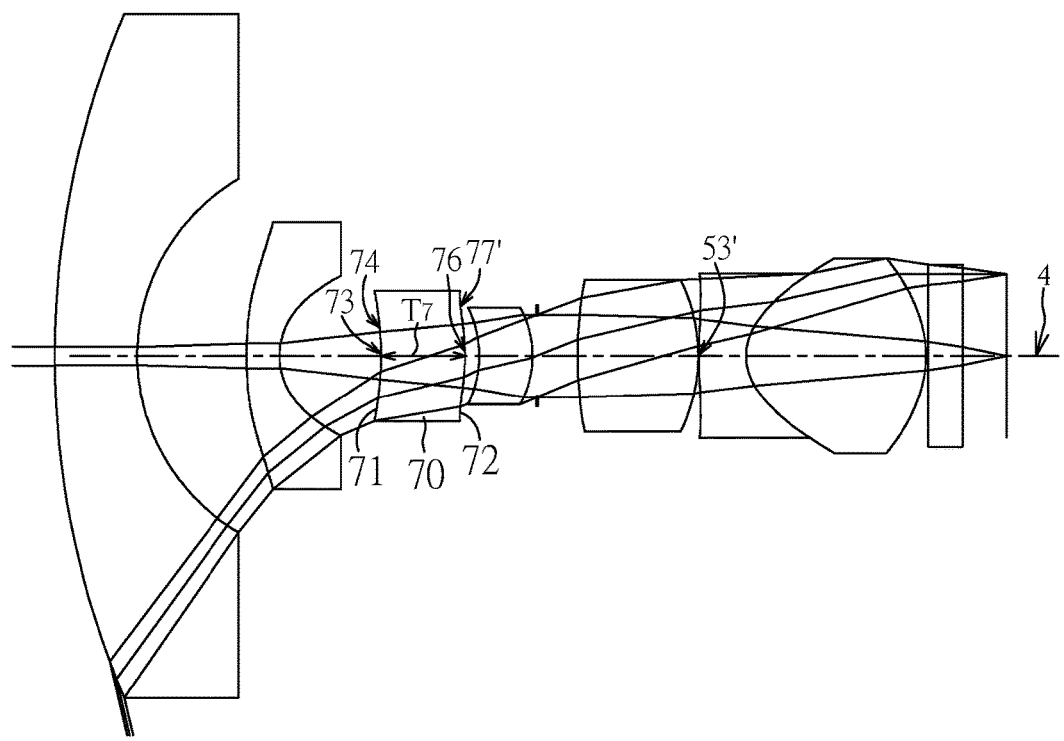
FIG. 16 illustrates a sixth example of the optical imaging lens of the present invention.
FIG. 17A illustrates the longitudinal spherical aberration on the image plane of the sixth example.
FIG. 17B illustrates the astigmatic aberration on the sagittal direction of the sixth example.
FIG. 17C illustrates the astigmatic aberration on the tangential direction of the sixth example.
FIG. 17D illustrates the distortion aberration of the sixth example.

Please refer to FIG. 16 which illustrates the sixth example of the optical imaging lens 1 of the present invention. Please refer to FIG. 17A for the longitudinal spherical aberration on the image plane 71 of the sixth example; please refer to FIG. 17B for the astigmatic aberration on the sagittal direction; please refer to FIG. 17C for the astigmatic aberration on the tangential direction, and please refer to FIG. 17D for the distortion aberration. The components in the sixth example are similar to those in the first example, but the optical data such as the curvature radius, the lens thickness, the aspheric surface or the back focal length in this example are different from the optical data in the first example. Besides, in this example, the object side surface 51 of the fifth lens element 50 has a convex portion 53' in a vicinity of the optical axis, the fourth lens element 40 is made of glass, and both the object side surface 41 and the image side 42 of the fourth lens element 40 are spherical surfaces.

In addition, from the sixth example to the following examples, except for the first to sixth lens elements mentioned above, the optical imaging lens further includes a seventh lens element 70, disposed between the second lens element 20 and the third lens element 30. The seventh lens element 70 is made of a plastic material and has positive refractive power. The object side surface 71 facing toward the object side 2 has a concave portion 73 in the vicinity of the optical axis and a concave portion 74 in a vicinity of its periphery. The image side surface 72 facing toward the image side 3 has a convex portion 76 in the vicinity of the optical axis and a convex portion 77 in a vicinity of its periphery. Besides, both the object side surface 71 and the image side 72 of the seventh lens element 70 are aspherical surfaces.

Similarly, object side surface 71 and the image side 72 of the seventh lens element are defined according to the following formula:

$$Z(Y) = \frac{Y^2}{R} \bigg/ \left(1 + \sqrt{1-(1+K)\frac{Y^2}{R^2}}\right) + \sum_{i=1}^{n} a_i \times Y^i$$

In which:
R represents the curvature radius of the lens element surface;
Z represents the depth of an aspherical surface (the perpendicular distance between the point of the aspherical surface at a distance Y from the optical axis and the tangent plane of the vertex on the optical axis of the aspherical surface);
Y represents a vertical distance from a point on the aspherical surface to the optical axis;
K is a conic constant;
$a_i$ is the aspheric coefficient of the ith order.

To the sixth example and the following examples, the seventh lens element 70 has a seventh lens element thickness T7, the total thickness of all the lens elements with reactive powers in the optical imaging lens 1 along the optical axis 4 is ALT.

Furthermore, the focal length of the seventh lens element 70 is f7; the refractive index of the seventh lens element 70 is n7; the Abbe number of the seventh lens element 70 is ν7. G27 is the distance between the image side surface 22 of the second lens element 20 and the object side surface 71 of the seventh lens element 70 along the optical axis 4, G73 is the distance between the image side surface 72 of the seventh lens element 70 and the object side surface 31 of the third lens element 30 along the optical axis 4.

The optical data of the sixth example of the optical imaging lens are shown in FIG. 40 while the aspheric surface data are shown in FIG. 41. TTL=1.667 mm; EFL=0.946 mm; HFOV=103.000 degrees; TTL=19.418 mm; Fno=2.400. In particular, the fabrication of the sixth example is easier than the first example so the yield is better. In addition, the optical imaging lens of the sixth example has good back focal length variation performance, the back focal length variation is 0.000 mm at room temperature 20° C., in this example, the back focal length variation is −0.001 mm at ambient temperature −20° C., and the back focal length variation is 0.002 mm at ambient temperature 80° C.

Seventh Example

Please refer to FIG. 18 which illustrates the seventh example of the optical imaging lens 1 of the present invention. Please refer to FIG. 19A for the longitudinal spherical aberration on the image plane 71 of the seventh example; please refer to FIG. 19B for the astigmatic aberration on the sagittal direction; please refer to FIG. 19C for the astigmatic aberration on the tangential direction, and please refer to FIG. 19D for the distortion aberration. The components in the seventh example are similar to those in the sixth example, but the optical data such as the curvature radius, the lens thickness, the aspheric surface or the back focal length in this example are different from the optical data in the sixth example.

The optical data of the seventh example of the optical imaging lens are shown in FIG. 42 while the aspheric surface data are shown in FIG. 43. TTL=3.264 mm; EFL=1.853 mm; HFOV=103.000 degrees; TTL=21.235 mm; Fno=2.600. In particular, the fabrication of the seventh example is easier than the first example so the yield is better. In addition, the optical imaging lens of the seventh example has good back focal length variation performance, the back focal length variation is 0.000 mm at room temperature 20° C., in this example, the back focal length variation is −0.008 mm at ambient temperature −20° C., and the back focal length variation is 0.013 mm at ambient temperature 80° C.

Eighth Example

Figure 20:
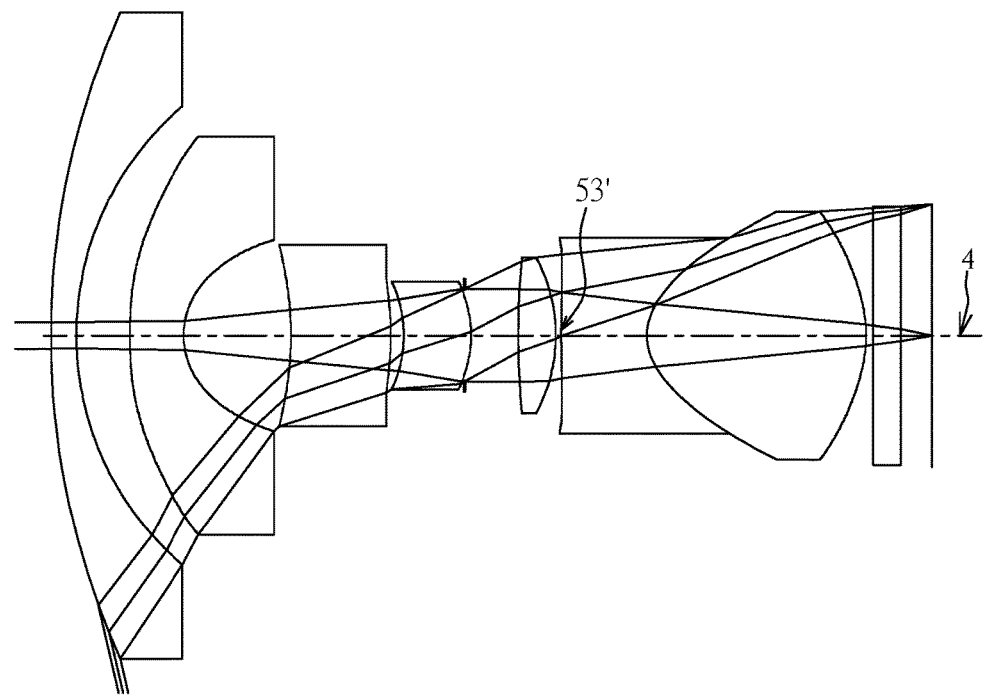
FIG. 20 illustrates an eighth example of the optical imaging lens of the present invention.
Figure 21A:
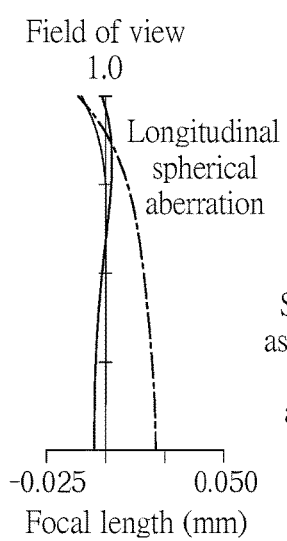
FIG. 21A illustrates the longitudinal spherical aberration on the image plane of the eighth example.
Figure 21B:
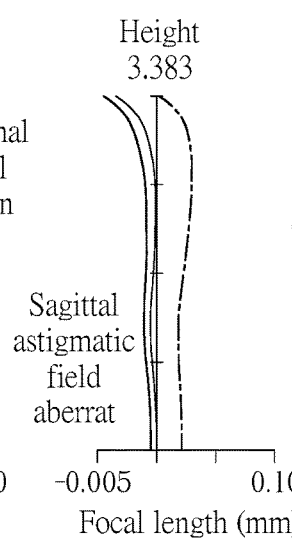
FIG. 21B illustrates the astigmatic aberration on the sagittal direction of the eighth example.
Figure 21C:
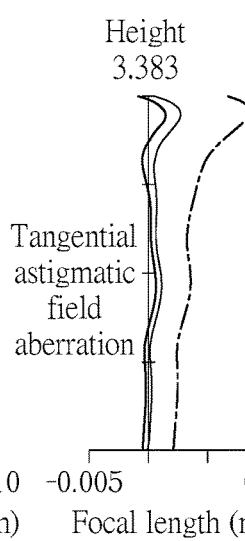
FIG. 21C illustrates the astigmatic aberration on the tangential direction of the eighth example.
Figure 21D:
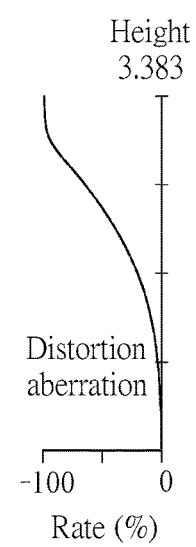
FIG. 21D illustrates the distortion aberration of the eighth example.

Please refer to FIG. 20 which illustrates the eighth example of the optical imaging lens 1 of the present invention. Please refer to FIG. 21A for the longitudinal spherical aberration on the image plane 71 of the eighth example;

please refer to FIG. 21B for the astigmatic aberration on the sagittal direction; please refer to FIG. 21C for the astigmatic aberration on the tangential direction, and please refer to FIG. 21D for the distortion aberration. The components in the eighth example are similar to those in the sixth example, but the optical data such as the curvature radius, the lens thickness, the aspheric surface or the back focal length in this example are different from the optical data in the sixth example.

The optical data of the eighth example of the optical imaging lens are shown in FIG. 44 while the aspheric surface data are shown in FIG. 45. TTL=3.383 mm; EFL=1.769 mm; HFOV=103.000 degrees; TTL=22.634 mm; Fno=2.600. In particular, the fabrication of the eighth example is easier than the first example so the yield is better. In addition, the optical imaging lens of the eighth example has good back focal length variation performance, the back focal length variation is 0.000 mm at room temperature 20° C., in this example, the back focal length variation is 0.012 mm at ambient temperature −20° C., and the back focal length variation is −0.016 mm at ambient temperature 80° C.

Ninth Example

Figure 22:
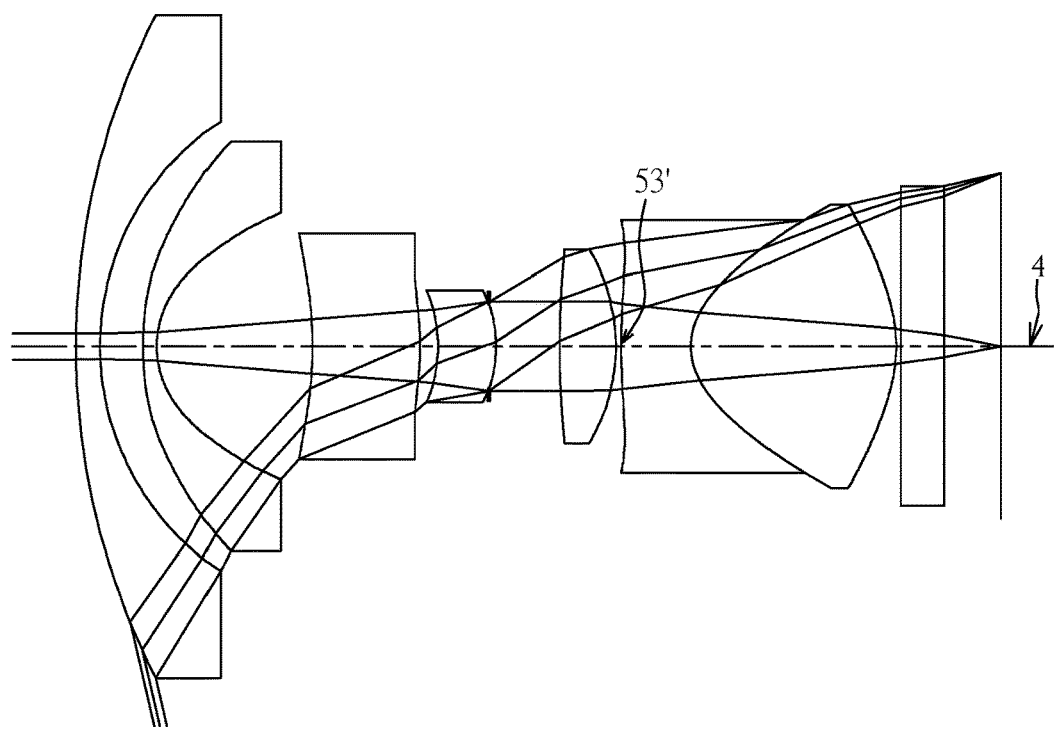
FIG. 22 illustrates a ninth example of the optical imaging lens of the present invention.
Figures 23A, 23B, 23C, 23D:
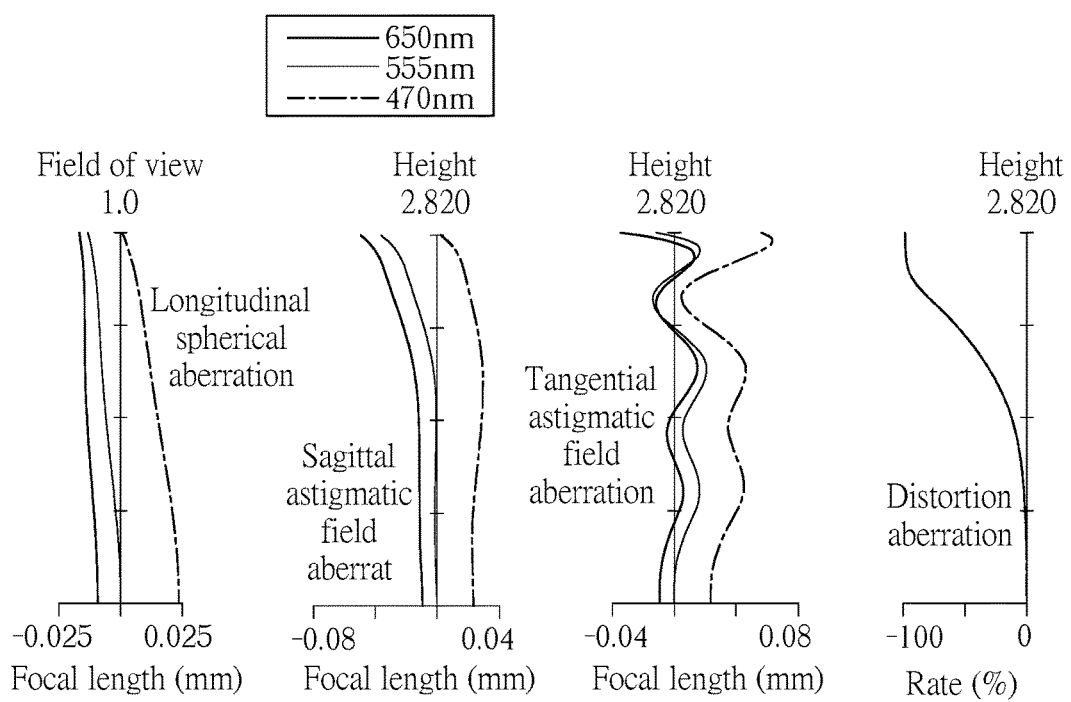
FIG. 23A illustrates the longitudinal spherical aberration on the image plane of the ninth example.
FIG. 23B illustrates the astigmatic aberration on the sagittal direction of the ninth example.
FIG. 23C illustrates the astigmatic aberration on the tangential direction of the ninth example.
FIG. 23D illustrates the distortion aberration of the ninth example.

Please refer to FIG. 22 which illustrates the ninth example of the optical imaging lens 1 of the present invention. Please refer to FIG. 23A for the longitudinal spherical aberration on the image plane 71 of the ninth example; please refer to FIG. 23B for the astigmatic aberration on the sagittal direction; please refer to FIG. 23C for the astigmatic aberration on the tangential direction, and please refer to FIG. 23D for the distortion aberration. The components in the ninth example are similar to those in the sixth example, but the optical data such as the curvature radius, the lens thickness, the aspheric surface or the back focal length in this example are different from the optical data in the sixth example.

The optical data of the ninth example of the optical imaging lens are shown in FIG. 46 while the aspheric surface data are shown in FIG. 47. TTL=2.820 mm; EFL=1.129 mm; HFOV=103.000 degrees; TTL=15.052 mm; Fno=2.600. In particular, the fabrication of the ninth example is easier than the first example so the yield is better. In addition, the optical imaging lens of the ninth example has good back focal length variation performance, the back focal length variation is 0.000 mm at room temperature 20° C., in this example, the back focal length variation is 0.003 mm at ambient temperature −20° C., and the back focal length variation is −0.003 mm at ambient temperature 80° C.

Tenth Example

Figure 24:
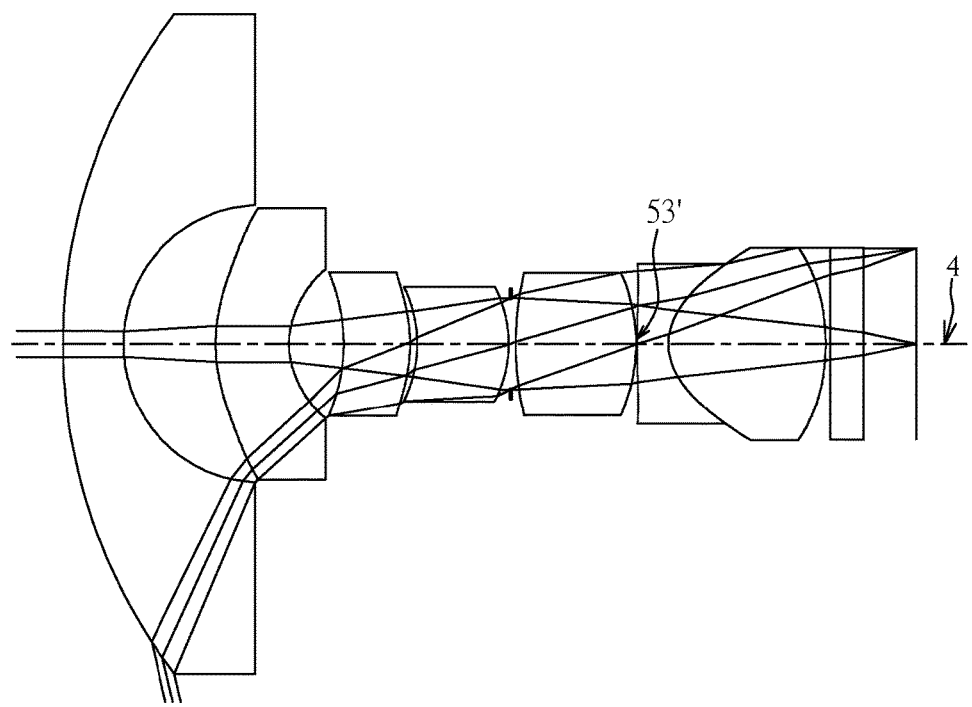
FIG. 24 illustrates a tenth example of the optical imaging lens of the present invention.
Figures 25A, 25B, 25C, 25D:
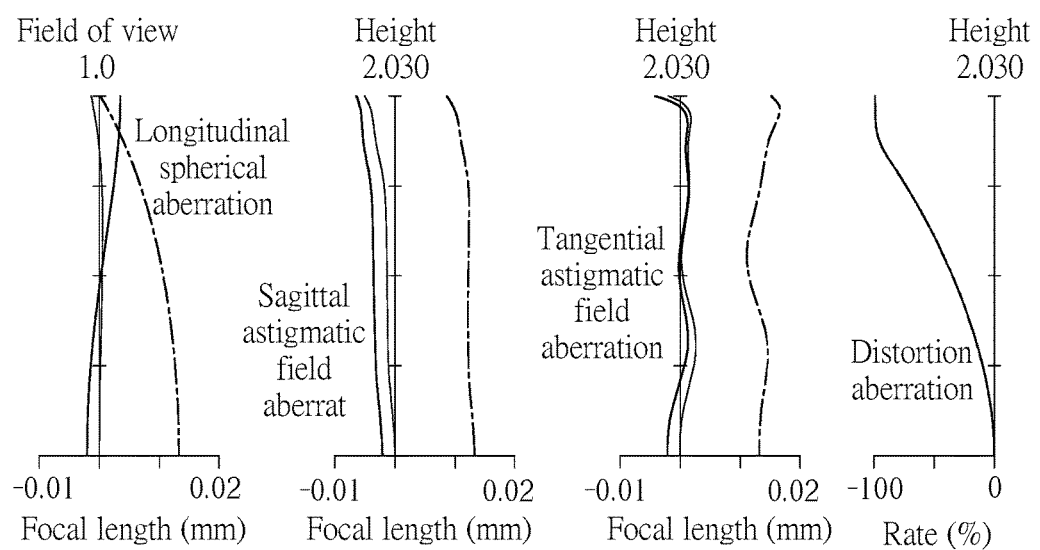
FIG. 25A illustrates the longitudinal spherical aberration on the image plane of the tenth example.
FIG. 25B illustrates the astigmatic aberration on the sagittal direction of the tenth example.
FIG. 25C illustrates the astigmatic aberration on the tangential direction of the tenth example.
FIG. 25D illustrates the distortion aberration of the tenth example.

Please refer to FIG. 24 which illustrates the tenth example of the optical imaging lens 1 of the present invention. Please refer to FIG. 25A for the longitudinal spherical aberration on the image plane 71 of the tenth example; please refer to FIG. 25B for the astigmatic aberration on the sagittal direction; please refer to FIG. 25C for the astigmatic aberration on the tangential direction, and please refer to FIG. 25D for the distortion aberration. The components in the tenth example are similar to those in the sixth example, but the optical data such as the curvature radius, the lens thickness, the aspheric surface or the back focal length in this example are different from the optical data in the sixth example.

The optical data of the tenth example of the optical imaging lens are shown in FIG. 48 while the aspheric surface data are shown in FIG. 49. TTL=2.030 mm; EFL=1.390 mm; HFOV=103.000 degrees; TTL=18.076 mm; Fno=2.400. In particular, the fabrication of the tenth example is easier than the first example so the yield is better. In addition, the optical imaging lens of the tenth example has good back focal length variation performance, the back focal length variation is 0.000 mm at room temperature 20° C., in this example, the back focal length variation is 0.003 mm at ambient temperature −20° C., and the back focal length variation is −0.005 mm at ambient temperature 80° C.

Eleventh Example

Please refer to FIG. 26 which illustrates the eleventh example of the optical imaging lens 1 of the present invention. Please refer to FIG. 27A for the longitudinal spherical aberration on the image plane 71 of the eleventh example; please refer to FIG. 27B for the astigmatic aberration on the sagittal direction; please refer to FIG. 27C for the astigmatic aberration on the tangential direction, and please refer to FIG. 27D for the distortion aberration. The components in the eleventh example are similar to those in the sixth example, but the optical data such as the curvature radius, the lens thickness, the aspheric surface or the back focal length in this example are different from the optical data in the sixth example.

The optical data of the eleventh example of the optical imaging lens are shown in FIG. 50 while the aspheric surface data are shown in FIG. 51. TTL=2.146 mm; EFL=1.459 mm; HFOV=103.000 degrees; TTL=14.434 mm; Fno=2.500. In particular, the fabrication of the eleventh example is easier than the first example so the yield is better. In addition, the optical imaging lens of the eleventh example has good back focal length variation performance, the back focal length variation is 0.000 mm at room temperature 20° C., in this example, the back focal length variation is 0.012 mm at ambient temperature −20° C., and the back focal length variation is −0.016 mm at ambient temperature 80° C.

Twelfth Example

Please refer to FIG. 28 which illustrates the twelfth example of the optical imaging lens 1 of the present invention. Please refer to FIG. 29A for the longitudinal spherical aberration on the image plane 71 of the twelfth example; please refer to FIG. 29B for the astigmatic aberration on the sagittal direction; please refer to FIG. 29C for the astigmatic aberration on the tangential direction, and please refer to FIG. 29D for the distortion aberration. The components in the twelfth example are similar to those in the sixth example, but the optical data such as the curvature radius, the lens thickness, the aspheric surface or the back focal length in this example are different from the optical data in the sixth example.

The optical data of the twelfth example of the optical imaging lens are shown in FIG. 52 while the aspheric surface data are shown in FIG. 53. TTL=1.675 mm; EFL=0.975 mm; HFOV=103.000 degrees; TTL=14.015 mm; Fno=2.500. In particular, the fabrication of the twelfth example is easier than the first example so the yield is better. In addition, the optical imaging lens of the twelfth example has good back focal length variation performance, the back focal length variation is 0.000 mm at room temperature 20° C., in this example, the back focal length variation is −0.008 mm at ambient temperature −20° C., and the back focal length variation is 0.012 mm at ambient temperature 80° C.

Some important ratios in each example are shown in FIG. 54, FIG. 55, FIG. 56 and FIG. 57.

The applicant found that by the following designs matched with each other, the lens configuration of the present invention has the advantages of enhancing the viewing angle, having low back focus variation at different ambient temperatures, shortening the length of the optical imaging lens and enhancing object definition and achieving good image quality:

1. The object side surface of the second lens element is a convex portion in the vicinity of the optical axis, and the object side surface of the second lens element is a convex portion in the vicinity of its periphery, which helps to collect the imaging light.

2. The object side surface of the third lens element is a concave portion in the vicinity of the optical axis, which is beneficial for correcting the aberration generated by the first lens element and the second lens element.

3. The third lens element is made of plastic, which helps to reduce the weight of the optical imaging lens and reduce the manufacturing cost.

4. The object side surface of the fourth lens element has a convex portion in the vicinity of the optical axis, which helps to converge the imaging light.

5. The image side surface of the fifth lens element has a concave portion in the vicinity of the optical axis, the image side surface of the fifth lens element has a concave portion in the vicinity of its periphery, the image side surface of the sixth lens element has a convex portion in the vicinity of the optical axis, the image side surface of the sixth lens element has a convex portion in the vicinity of its periphery, which achieve the effect of correcting the overall aberration.

6. Optionally, the optical imaging lens matches the second lens having negative refractive power, which can correct the aberration generated by the first lens element.

7. Optionally, the optical imaging lens matches the third lens selectively having positive refractive power, or the image side surface of the third lens element having a convex portion in the vicinity its the periphery, which can correct the aberration generated by the second lens element 8. Optionally, the optical imaging lens matches the object side surface of the fifth lens element having a concave portion in the vicinity of its periphery, which helps to adjust the aberrations generated by the first lens element to the fourth lens element.

Some important ratios in each example are shown in FIG. 54, FIG. 55, FIG. 56 and FIG. 57.

The following conditional formulae are provided to keep the optical parameters and the focal length of the optical imaging lens in a suitable range so that the parameters are not so great to jeopardize the correction of the entire aberration of the optical imaging lens or too small to fabricate or to assemble the optical imaging lens.

(a) To diminish the total length of the optical imaging lens, the present invention proposes to reduce the lens thickness and air gaps between adjacent lens elements. Taking the assembly fabrication and imaging quality into consideration, the lens thickness and the air gaps should be coordinated with each other, or to adjust the ratio of particular optical parameter to a specific combination of lens groups. The following conditions help the optical imaging lens have better arrangement:

$AAG/G23 \leq 2.300$, the preferable range is $1.400 \leq AAG/G23 \leq 2.300$;

$AAG/T6 \leq 2.500$, the preferable range is $1.400 \leq AAG/T6 \leq 2.500$;

$ALT/G23 \leq 4.700$, the preferable range is $1.900 \leq ALT/G23 \leq 4.700$;

$ALT/T6 \leq 4.300$, the preferable range is $2.600 \leq ALT/T6 \leq 4.300$;

$G12/T1 \leq 2.100$, the preferable range is $0.800 \leq G12/T1 \leq 2.100$;

$G12/(T2+G34+G45) \leq 1.400$, the preferable range is $0.500 \leq G12/(T2+G34+G45) \leq 1.400$;

$BFL/G23 \leq 1.600$, the preferable range is $0.300 \leq BFL/G23 \leq 1.600$;

$BFL/T6 \leq 1.600$, the preferable range is $0.300 \leq BFL/T6 \leq 1.600$;

$(T1+T3)/T4 \leq 2.700$, the preferable range is $1.100 \leq (T1+T3)/T4 \leq 2.700$;

$AAG/(G34+G45+T5+G56) \leq 5.800$, the preferable range is $2.000 \leq AAG/(G34+G45+T5+G56) \leq 5.800$;

$(T1+G12)/T4 \leq 2.200$, the preferable range is $1.200 \leq (T1+G12)/T4 \leq 2.200$.

(b) The EFL and other optical parameters are maintained at a ratio if the following conditions are satisfied, which helps to increase the viewing angle during thinning of the optical imaging lens.

$(G12+T3+G34)/EFL \leq 4.800$, the preferable range is $0.300 \leq (G12+T3+G34)/EFL \leq 4.800$;

$(G34+G45+T5+G56)/EFL \leq 2.000$, the preferable range is $0.600 \leq (G34+G45+T5+G56)/EFL \leq 2.000$;

$T3/EFL \leq 1.400$, the preferable range is $0.600 \leq T3/EFL \leq 1.400$;

$(T2+G34+G45)/EFL \leq 1.700$, the preferable range is $0.500 \leq (T2+G34+G45)/EFL \leq 1.700$.

(c) The optical parameters and the total length of the optical imaging lens together keep a suitable range so the parameters are not so great to enlarge the total length of the optical imaging lens or too small to fabricate.

$TTL/(T3+G34+G45+T5+G56) \leq 6.500$, the preferable range is $2.500 \leq TTL/(T3+G34+G45+T5+G56) \leq 6.500$;

$TL/(T2+G34+G45) \leq 12.100$, the preferable range is $5.700 \leq TL/(T2+G34+G45) \leq 12.100$;

$TL/(T4+BFL) \leq 8.400$, the preferable range is $2.400 \leq TL/(T4+BFL) \leq 8.400$.

Figure 58A:
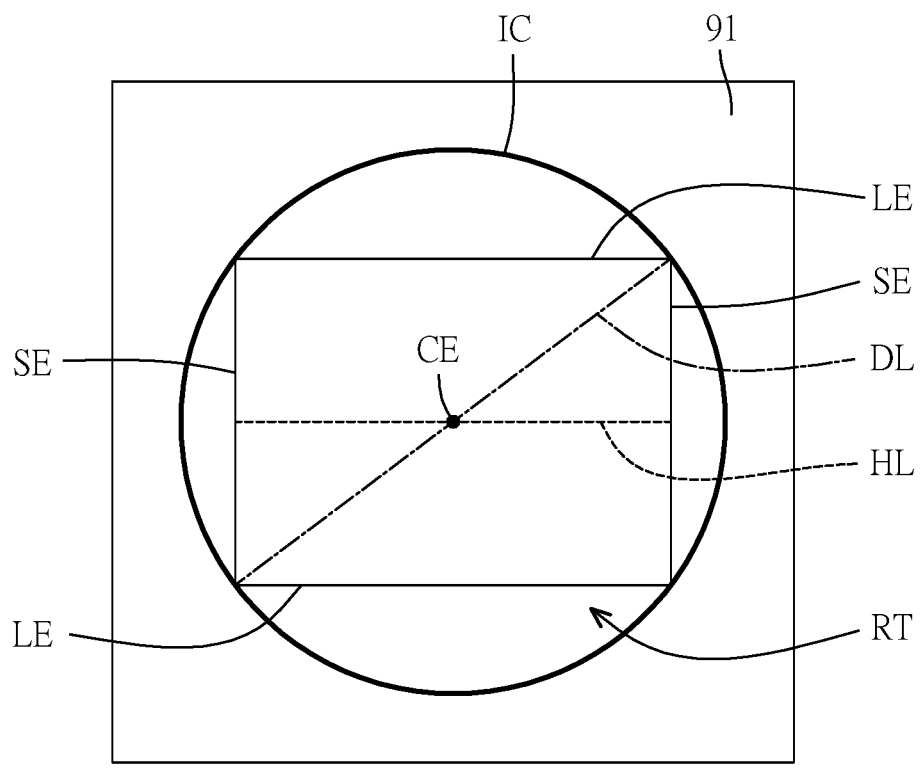
FIG. 58A and FIG. 58B illustrates an imaging circle and an inscribed rectangle of the optical imaging lens and related parameters of the examples of the invention.
Figure 58B:
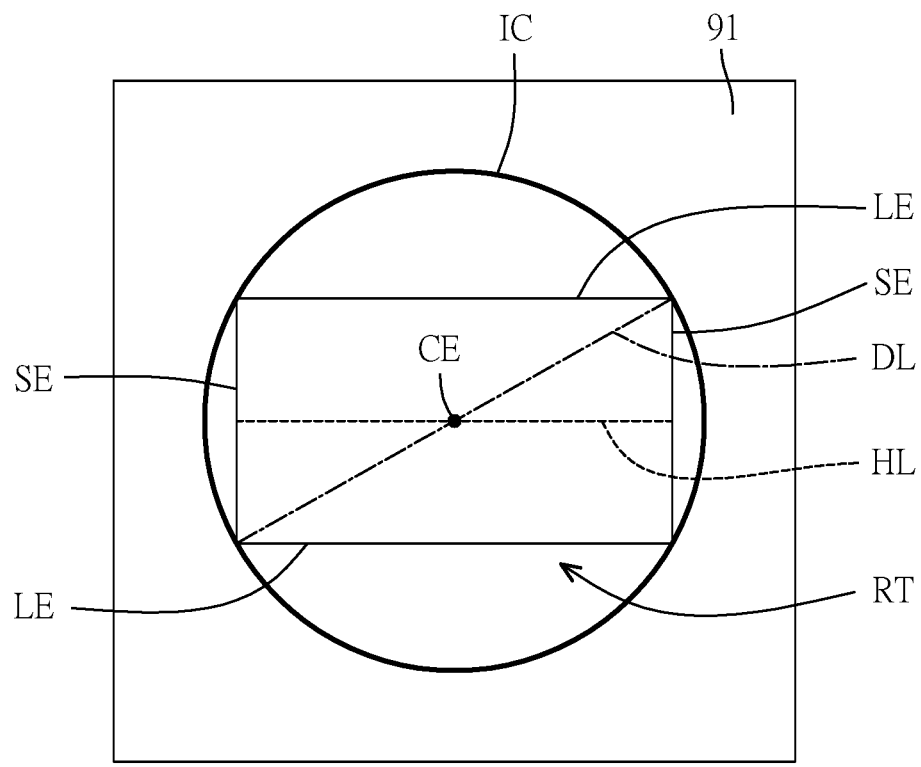

Next, the relationships among an imaging circle, an inscribed rectangle, and a back-end image sensor in the optical imaging lens of the embodiments of the invention are described as follows. With reference to FIG. 58A and FIG. 58B, generally, when an imaging ray from the object side 2 is projected to the image side 3 through the optical imaging lens 1, the imaging ray is ideally concentrated by the optical imaging lens 1 to be located on the image plane 91 of the image side 3 to form a circular image, and this circular image is called as an imaging circle IC. The imaging circle IC is the entire imaging result obtained by the optical imaging lens 1. Further, a sensing surface (not shown) of the back-end image sensor of the optical imaging lens 1 is disposed to overlap with the image plane 91, so that the image sensor located at the back-end side of the optical imaging lens 1 may sense an image. The imaging circle IC has an inscribed rectangle inscribed in the imaging circle IC, and the inscribed rectangle RT may have different aspect ratios in response to being located at different locations in the imaging circle IC. The inscribed rectangle RT has two long sides LE opposite to each other and two short sides SE opposite to each other, and the aspect ratio is defined as a length ratio of the long sides LE to the short sides SE. In the embodiments of the invention, the aspect ratio of the inscribed rectangle RT is 4:3 (as shown in FIG. 58A) and 16:9 (as shown in FIG. 58B), for example. Generally, shapes of image sensors are approximately a rectangle. Further, most of the image sensors have the aspect ratio of 4:3 or 16:9, and sizes of the image sensors may be matched with the inscribed rectangles shown in FIG. 58A and FIG. 58B.

With reference to FIG. 58A and FIG. 58B again, first, a half field of view (HFOV) is a range of a half of a maximum angle of an object image to be obtained by the optical imaging lens 1 at the object side 2. A radius length range of an image of the object at the object side 2 imaged on image plane 91 of the image side 3 by the optical imaging lens 1 is called a field, and 1 times of the field is 1 times of a maximum image height and is called as a system image height. A size the back-end image sensor is matched with the inscribed rectangles RT shown in FIG. 58A and FIG. 58B. An image actually received corresponding to a diagonal direction of a diagonal DL of the inscribed rectangle RT by the optical imaging lens 1 at a field of view is correspondingly imaged on the diagonal DL of the inscribed rectangle RT. An image actually received in a horizontal direction by the optical imaging lens 1 at the field of view is correspondingly imaged on a reference line HL of the inscribed rectangle RT. Therefore, an angle range of a diagonal field of view (FOV) corresponding to a diagonal field of the image sensor is an angle range of light concentration of an object at the object side 2 captured by the diagonal DL formed by connecting opposite angles of the inscribed rectangle RT. From another perspective, an angle range of a horizontal FOV corresponding to a horizontal field of the image sensor is the angle range of light concentration of the object at the object side 2 captured by the reference line HL. The reference line HL is defined to pass through a center C of the imaging circle IC and be parallel to the long sides LE of the inscribed rectangle RT. The reference line HL extends from one short side SE of the rectangle RT to the other short side SE of the rectangle RT, and a length of the reference line HL is equal to any long side LE of the rectangle RT.

Thirteenth Example

Figure 59:
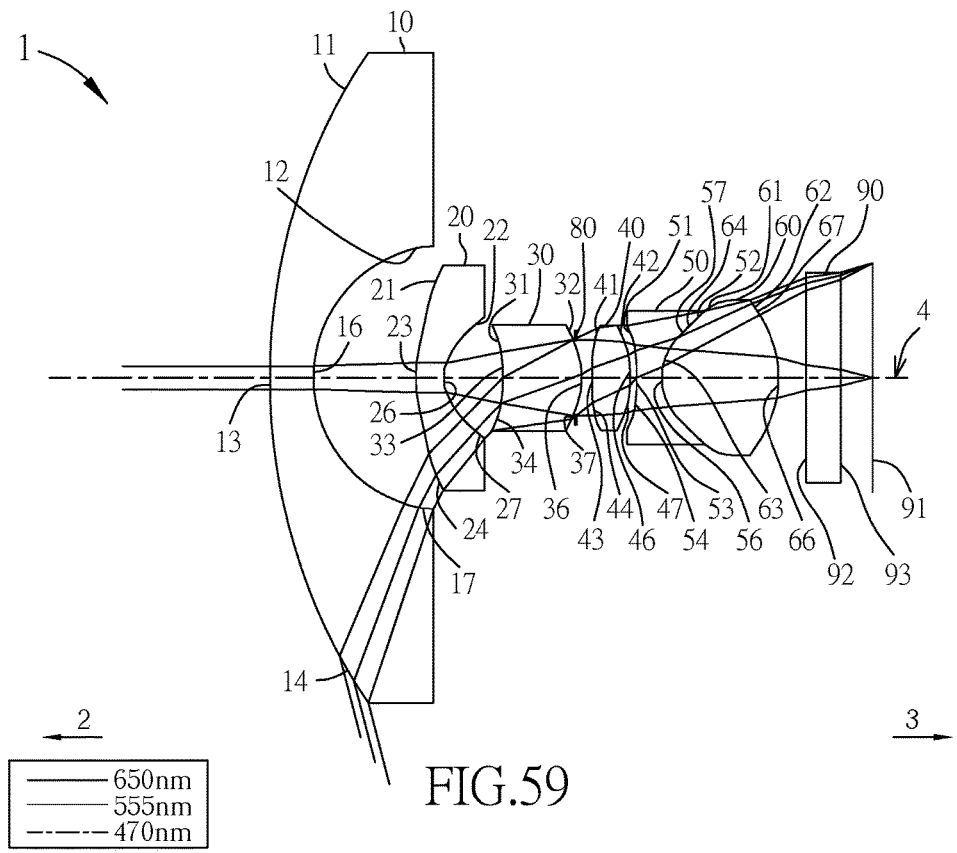
FIG. 59 illustrates a thirteenth example of the optical imaging lens of the invention.

Please refer to FIG. 59 which illustrates the thirteenth example of the optical imaging lens 1 of the invention. Please refer to FIG. 60A for the longitudinal spherical aberration on the image plane 91 of the thirteenth example, please refer to FIG. 60B for the astigmatism aberration on the sagittal direction, please refer to FIG. 60C for the astigmatism aberration on the tangential direction, and please refer to FIG. 60D for the distortion aberration. The Y axis in each of the astigmatism diagrams and the distortion diagrams from Thirteen Example to the Twenty-First Example stands for "half field of view", which is 104.50 degrees.

The optical imaging lens 1 in the Thirteen Example mainly consists of six lens elements 10 to 60 having refracting power, a filter 90, an aperture 80, and an image plane 91. The aperture 80 is disposed between the third lens element 30 and the fourth lens element 40. The filter 90 may prevent light having a specific wavelength from being projected to the image plane 91 and affecting the image quality.

The first lens element 10 is arranged to be a lens element having refracting power in a first order from the object side 2 to the image side 3. The first lens element 10 is made of glass and has negative refracting power. The object-side surface 11 facing the object side 2 has a convex portion 13 in the vicinity of the optical axis and a convex portion 14 in the vicinity of the periphery. The image-side surface 12 facing the image side 3 has a concave portion 16 in the vicinity of the optical axis and a concave portion 17 in the vicinity of the periphery. The object-side surface 11 and the image-side surface 12 of the first lens element are both spherical surfaces.

The second lens element 20 is arranged to be a lens element having refracting power in a second order from the object side 2 to the image side 3. The second lens element 20 is made of plastic and has negative refracting power. The object-side surface 21 facing the object side 2 has a convex portion 23 in the vicinity of the optical axis and a convex portion 24 in the vicinity of the periphery. The image-side surface 22 facing the image side 3 has a concave portion 26 in the vicinity of the optical axis and a concave portion 27 in the vicinity of the periphery. The object-side surface 21 and the image-side surface 22 of the second lens element 20 are both aspheric surfaces.

The third lens element 30 is arranged to be a lens element having refracting power in a third order from the object side 2 to the image side 3. The third lens element 30 is made of plastic and has positive refracting power. The object-side surface 31 facing the object side 2 has a concave portion 33 in the vicinity of the optical axis and a concave portion 34 in the vicinity of the periphery. The image-side surface 32 facing the image side 3 has a convex portion 36 in the vicinity of the optical axis and a convex portion 37 in the vicinity of the periphery. The object-side surface 31 and the image-side surface 32 of the third lens element 30 are both aspheric surfaces.

The aperture 80 is disposed between the third lens element 30 and the fourth lens element 40.

The fourth lens element 40 is arranged to be a lens element having refracting power in a first order from the aperture 80 to the image side 3. The fourth lens element 40 is made of plastic and has positive refracting power. The object-side surface 41 facing the object side 2 has a convex portion 43 in the vicinity of the optical axis and a convex portion 44 in the vicinity of the periphery. The image-side surface 42 facing the image side 3 has a convex portion 46 in the vicinity of the optical axis and a convex portion 47 in the vicinity of the periphery. The object-side surface 41 and the image-side surface 42 of the fourth lens element 40 are both aspheric surfaces.

The fifth lens element 50 is arranged to be a lens element having refracting power in a second order from the aperture 80 to the image side 3. The fifth lens element 50 is made of plastic and has negative refracting power. The object-side surface 51 facing the object side 2 has a concave portion 53 in the vicinity of the optical axis and a concave portion 54 in the vicinity of the periphery. The image-side surface 52 facing the image side 3 has a concave portion 56 in the vicinity of the optical axis and a concave portion 57 in the vicinity of the periphery. In addition, the object-side surface 51 and the image-side surface 52 of the fifth lens element 50 are both aspheric surfaces.

The sixth lens element 60 is arranged to be a lens element having refracting power in a third order from the aperture 80 to the image side 3. The sixth lens element 60 is made of plastic and has positive refracting power. The object-side surface 61 facing the object side 2 has a convex portion 63 in the vicinity of the optical axis and a convex portion 64 in the vicinity of the periphery. The image-side surface 62 facing the image side 3 has a convex portion 66 in the vicinity of the optical axis and a convex portion 67 in the vicinity of the periphery. In addition, the object-side surface 61 and the image-side surface 62 of the sixth lens element 60 are both aspheric surfaces. Further, in this example, a colloid, film body, or a bonding material is filled between the fifth lens element 50 and the sixth lens element 60, but not limited thereto. The filter 90 is located between the image-side surface 62 of the sixth lens element 60 and the image plane 91.

In the first lens element 10, the second lens element 20, the third lens element 30, the fourth lens element 40, the fifth lens element 50 and the sixth lens element 60 of the optical imaging lens element 1 of the invention, there are 12 curved surfaces, such as the object-side surfaces 11/21/31/41/51/61 and the image-side surfaces 12/22/32/42/52/62. The curved surfaces may be defined by the foregoing formula (1). If a curved surface is spherical, the conic constant K and the aspheric coefficient ai are both 0, and the corresponding data is omitted and is not shown.

The optical data of the thirteenth example of the optical lens system is shown in FIG. 77 while the aspheric surface data is shown in FIG. 78. System image height=2.240 mm; EFL=1.000 mm; HFOV=104.500 degrees; TTL=11.869 mm; Fno=2.060.

Figures 60A, 60B, 60C, 60D:
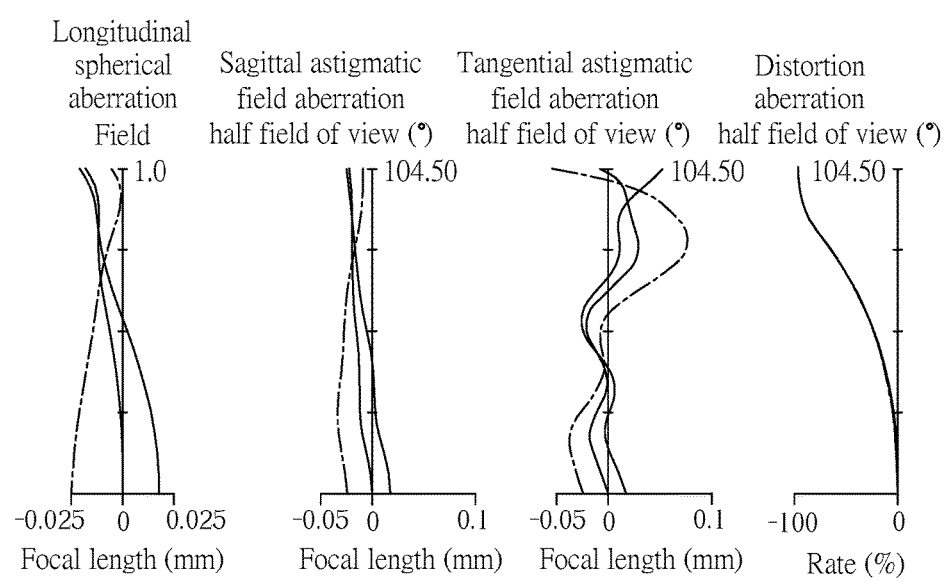
FIG. 60A illustrates the longitudinal spherical aberration on the image plane of the thirteenth example.
FIG. 60B illustrates the astigmatic aberration on the sagittal direction of the thirteenth example.
FIG. 60C illustrates the astigmatism aberration on the tangential direction of the thirteenth example.
FIG. 60D illustrates the distortion aberration of the thirteenth example.

Please refer to FIG. 60A to FIG. 60D, FIG. 60A illustrates the longitudinal spherical aberration of the thirteenth example, FIG. 60B and FIG. 60C respectively illustrate the astigmatic aberration on the sagittal direction and the astigmatism aberration on the tangential direction on the image plane 91 when the wavelengths are 470 mm, 555 mm, and 650 mm in the thirteenth example, and FIG. 60D is illustrates the distortion aberration on the image plane 91 when the wavelengths are 470 nm, 555 nm, and 650 nm in the thirteenth example. In FIG. 60A that illustrates the longitudinal spherical aberration in the thirteenth example, the curve of each of the wavelengths is close to one another and near the middle position, which shows that the off-axis ray of each wavelength at different heights are focused near the imaging point. The skew margin of the curve of each wavelength shows that the imaging point deviation of the off-axis ray at different heights is controlled within ±0.025 mm. Accordingly, it is evident that the thirteenth example can significantly improve the spherical aberration of the same wavelength. In addition, the curves of the three representative wavelengths are close to one another, which represents that the imaging positions of the rays with different wavelengths are concentrated; therefore, the chromatic aberration can be significantly improved.

Figures 70A, 70B, 70C, 70D:
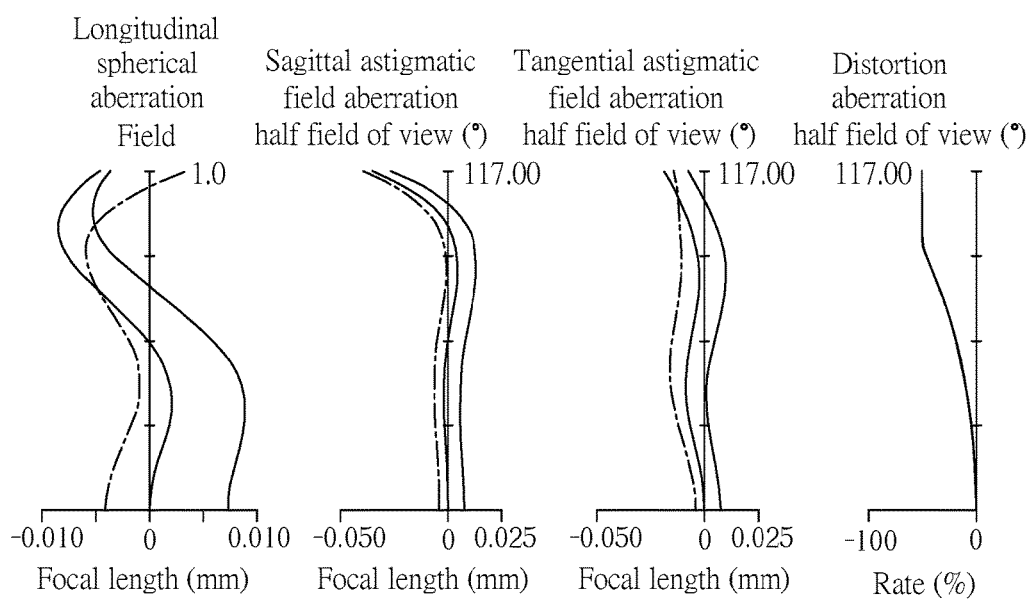
FIG. 70A illustrates the longitudinal spherical aberration on the image plane of the eighteenth example.
FIG. 70B illustrates the astigmatic aberration on the sagittal direction of the eighteenth example.

In FIG. 60B and FIG. 70C which illustrate two diagrams of astigmatic aberration, the focal length variation of the three representative wavelengths in the entire field of view falls within ±0.075 mm, which represents that the optical system in the thirteenth example can effectively eliminate aberration. In FIG. 60D, the diagram of distortion aberration shows that the distortion aberration in the thirteenth example can be maintained within ±100%, which shows that the distortion aberration in the thirteenth example can meet the image quality requirement of the optical system. Based on the above, it is shown that the thirteenth example can provide better image quality compared to an existing optical lens under the condition in which the system length of the optical lens is shortened to about 11.869 mm.

Fourteenth Example

Figure 61:
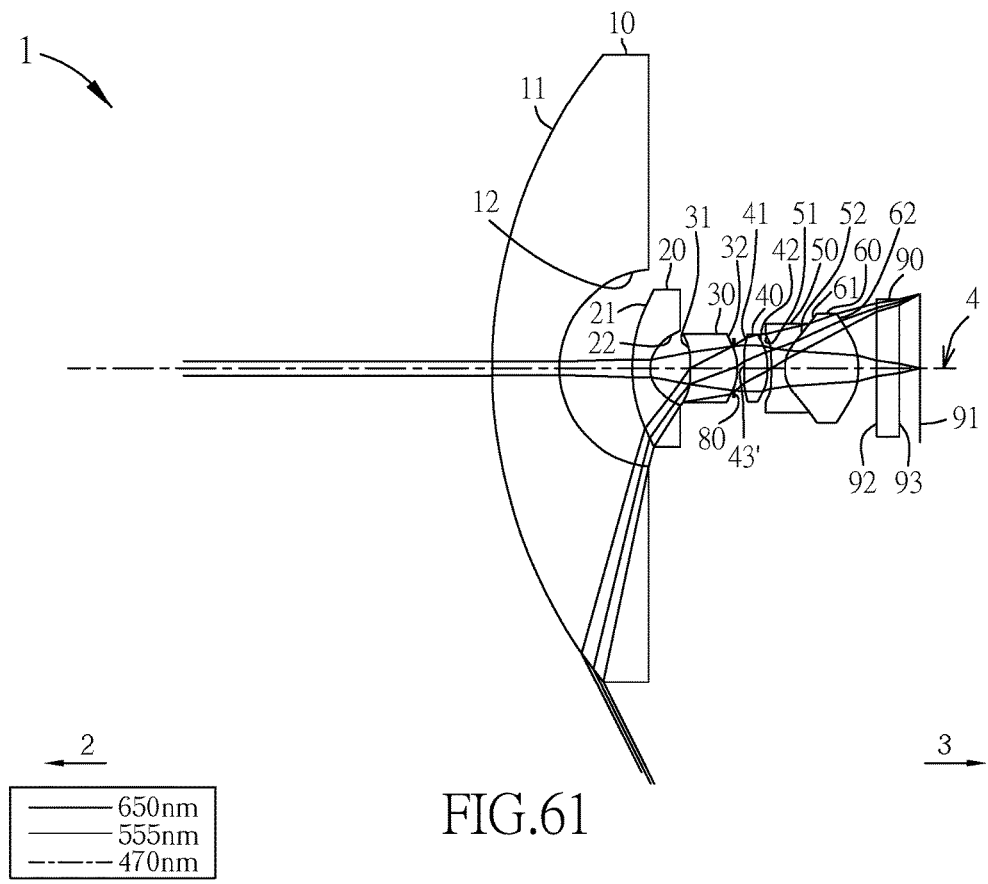
FIG. 61 illustrates a fourteenth example of the optical imaging lens of the invention.

Please refer to FIG. 61 which illustrates the fourteenth example of the optical imaging lens 1 of the invention. Please refer to FIG. 62A for the longitudinal spherical aberration on the image plane 91 of the fourteenth example, please refer to FIG. 62B for the astigmatism aberration on the sagittal direction, please refer to FIG. 62C for the astigmatism aberration on the tangential direction, and please refer to FIG. 62D for the distortion aberration. The optical imaging lens 1 of the fourteenth example is approximately similar to that of the thirteenth example, and a difference therebetween includes that: the optical data, the aspheric coefficients, and the parameters of the first lens element 10, the second lens element 20, the third lens element 30, the fourth lens element 40, the fifth lens element 50, and the sixth lens element 60 are different more or less. Further, the object-side surface 41 of the fourth lens element 40 has a concave portion 43' in the vicinity of the optical axis. Note that in order to show the diagram clearly, some numerals which are similar to those used in the vicinity of the optical axis and in the vicinity of the periphery in the thirteenth example are omitted from FIG. 61.

The optical data of the fourteenth example is shown in FIG. 79 in detail while the aspheric surface data is shown in FIG. 80. Herein, system image height=2.240 mm; EFL=0.990 mm; HFOV=117.000 degrees; TTL=12.994 mm; Fno=2.060.

Figures 62A, 62B, 62C, 62D:
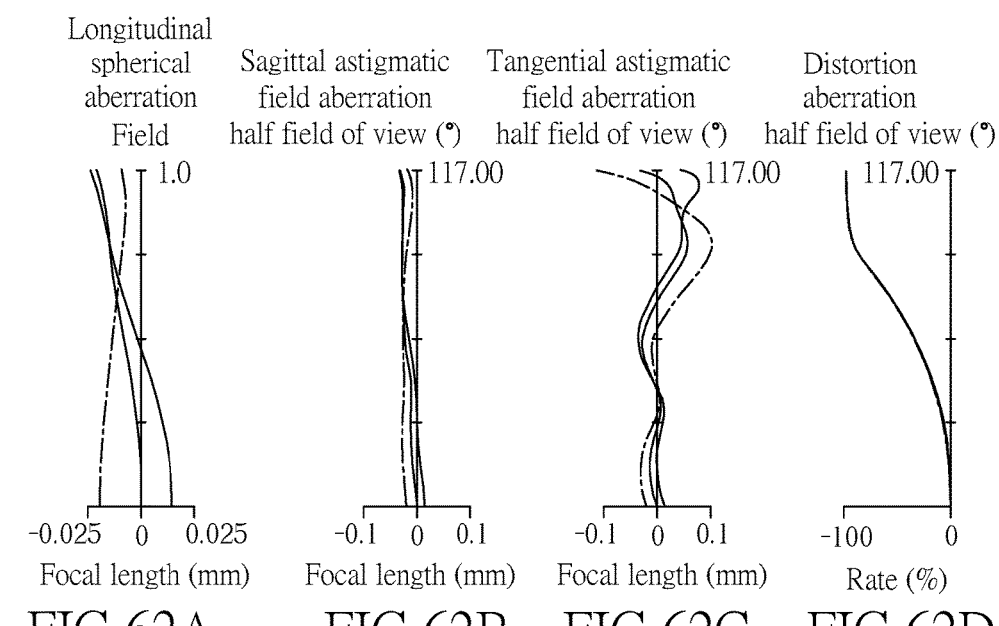
FIG. 62A illustrates the longitudinal spherical aberration on the image plane of the fourteenth example.
FIG. 62B illustrates the astigmatic aberration on the sagittal direction of the fourteenth example.
FIG. 62C illustrates the astigmatism aberration on the tangential direction of the fourteenth example.
FIG. 62D illustrates the distortion aberration of the fourteenth example.

In FIG. 62A that illustrates the longitudinal spherical aberration in the fourteenth example, the imaging point deviation of the off-axis ray at different heights is controlled within ±0.025 mm. In FIG. 62B and FIG. 62C which illustrate two diagrams of astigmatism aberration, the focal length variation of the three representative wavelengths in the entire field of view falls within ±0.1 mm. In FIG. 62D, the diagram of distortion aberration shows that the distortion aberration in the second example can be maintained within ±100%. Based on the above, it is shown that the fourteenth example can provide better image quality compared to the thirteenth example under the condition in which the system length of is shortened to about 12.944 mm.

Based on the above, it can be obtained that the half field of view of the fourteenth example is greater than that of the thirteenth example.

Fifteenth Example

Figure 63:
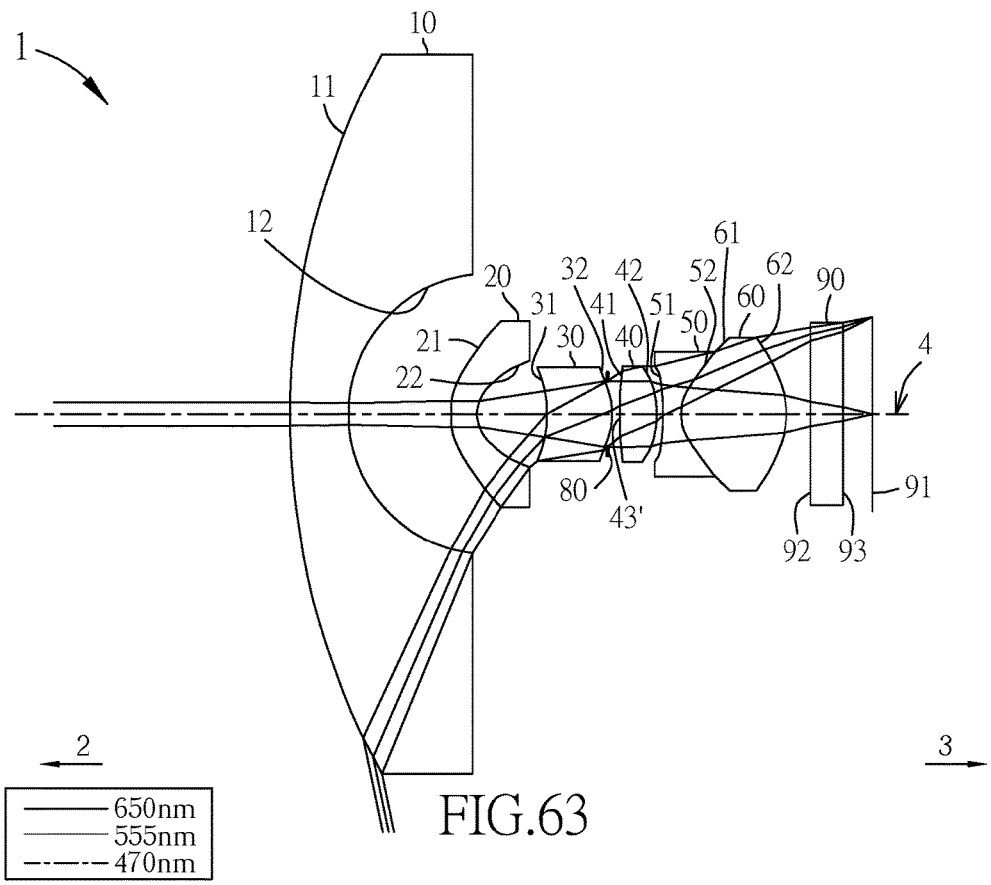
FIG. 63 illustrates a fifteenth example of the optical imaging lens of the invention.

Please refer to FIG. 63 which illustrates the fifteenth example of the optical imaging lens 1 of the invention. Please refer to FIG. 64A for the longitudinal spherical aberration on the image plane 91 of the fifteenth example, please refer to FIG. 64B for the astigmatism aberration on the sagittal direction, please refer to FIG. 64C for the astigmatism aberration on the tangential direction, and please refer to FIG. 64D for the distortion aberration. The optical imaging lens 1 of the fifteenth example is approximately similar to that of the thirteenth example, and a difference therebetween includes that: the optical data, the aspheric coefficients, and the parameters of the first lens element 10, the second lens element 20, the third lens element 30, the fourth lens element 40, the fifth lens element 50, and the sixth lens element 60 are different more or less. Further, the object-side surface 41 of the fourth lens element 40 has a concave portion 43' in the vicinity of the optical axis. Note that in order to show the diagram clearly, some numerals which are similar to those used in the vicinity of the optical axis and in the vicinity of the periphery in the thirteenth example are omitted from FIG. 63.

The optical data of the fifteenth example is shown in FIG. 81 in detail while the aspheric surface data is shown in FIG. 82. Herein, system image height=2.058 mm; EFL=0.973 mm; HFOV=102.500 degrees; TTL=12.485 mm; Fno=2.060.

Figures 64A, 64B, 64C, 64D:
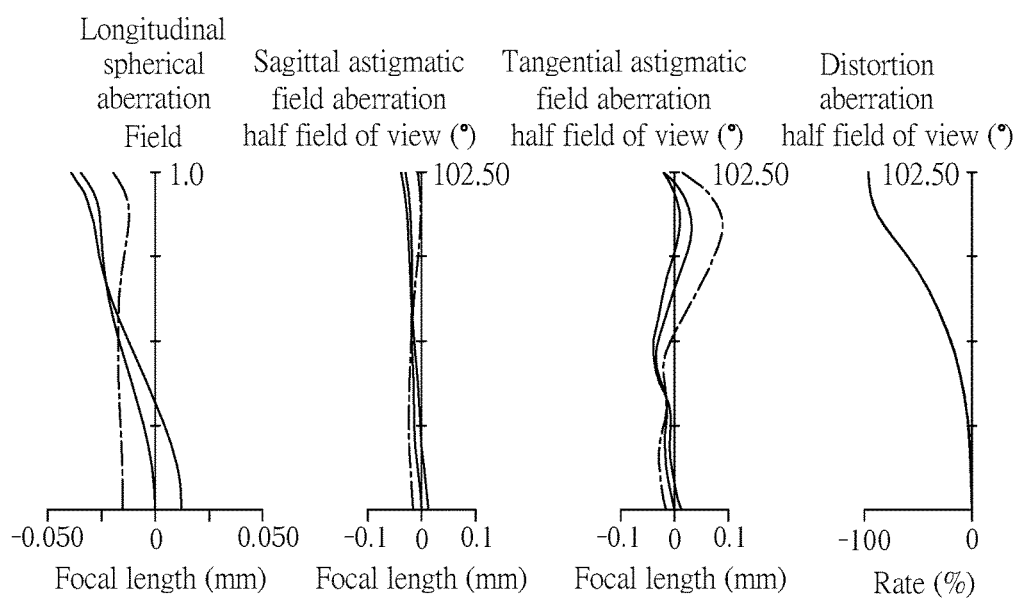
FIG. 64A illustrates the longitudinal spherical aberration on the image plane of the fifteenth example.
FIG. 64B illustrates the astigmatic aberration on the sagittal direction of the fifteenth example.
FIG. 64C illustrates the astigmatism aberration on the tangential direction of the fifteenth example.
FIG. 64D illustrates the distortion aberration of the fifteenth example.

In FIG. 64A that illustrates the longitudinal spherical aberration in the fifteenth example, the imaging point deviation of the off-axis ray at different heights is controlled within ±0.04 mm. In FIG. 64B and FIG. 64C which illustrate two diagrams of astigmatism aberration, the focal length variation of the three representative wavelengths in the entire field of view falls within ±0.1 mm. In FIG. 64D, the diagram of distortion aberration shows that the distortion aberration in the second example can be maintained within ±100%. Based on the above, it is shown that the fifteenth example can provide better image quality compared to the thirteenth example under the condition in which the system length of is shortened to about 12.485 mm.

Based on the above, it can be obtained that the fabrication of the fifteenth example is easier than that of the thirteenth example so the yield is better.

Sixteenth Example

Figure 65:
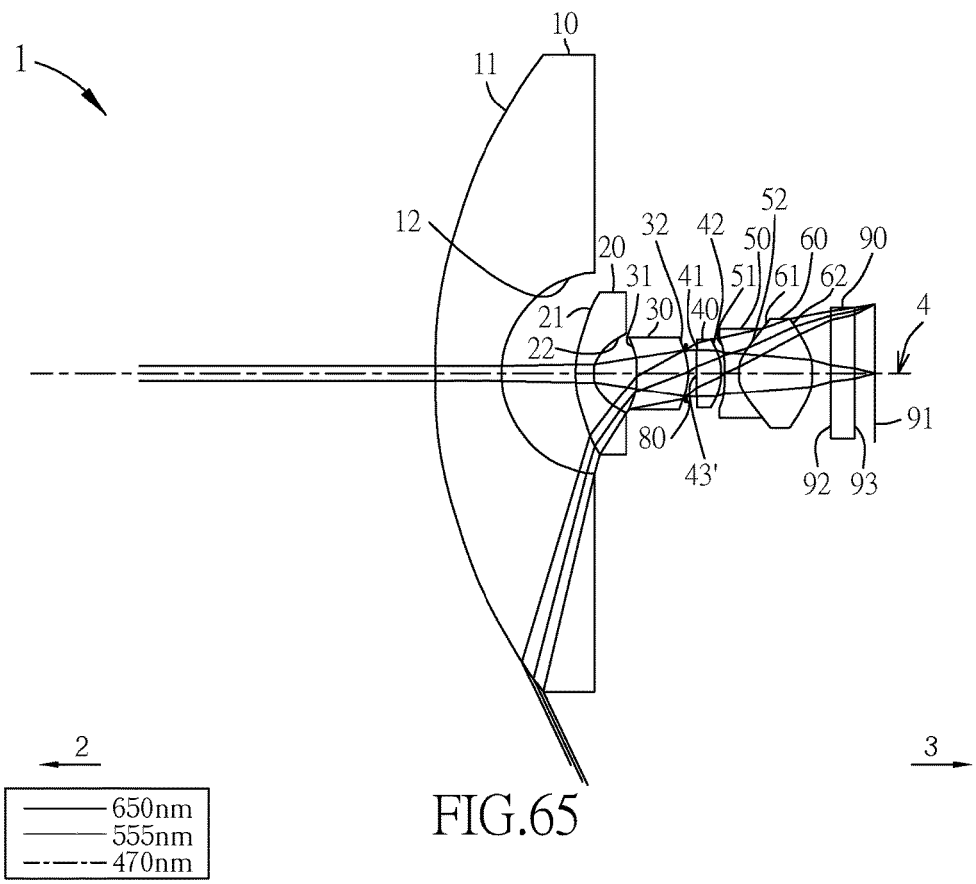
FIG. 65 illustrates a sixteenth example of the optical imaging lens of the invention.

Please refer to FIG. 65 which illustrates the sixteenth example of the optical imaging lens 1 of the invention. Please refer to FIG. 66A for the longitudinal spherical aberration on the image plane 91 of the sixteenth example, please refer to FIG. 66B for the astigmatism aberration on the sagittal direction, please refer to FIG. 66C for the astigmatism aberration on the tangential direction, and please refer to FIG. 66D for the distortion aberration. The optical imaging lens 1 of the sixteenth example is approximately similar to that of the thirteenth example, and a difference therebetween includes that: the optical data, the aspheric coefficients, and the parameters of the first lens element 10, the second lens element 20, the third lens element 30, the fourth lens element 40, the fifth lens element 50, and the sixth lens element 60 are different more or less. Further, the object-side surface 41 of the fourth lens element 40 has a concave portion 43' in the vicinity of the optical axis. Note that in order to show the diagram clearly, some numerals which are similar to those used in the vicinity of the optical axis and in the vicinity of the periphery in the thirteenth example are omitted from FIG. 65.

The optical data of the sixteenth example is shown in FIG. 83 in detail while the aspheric surface data is shown in FIG. 84. Herein, system image height=2.056 mm; EFL=0.953 mm; HFOV=116.000 degrees; TTL=13.100 mm; Fno=2.060.

Figures 66A, 66B, 66C, 66D:
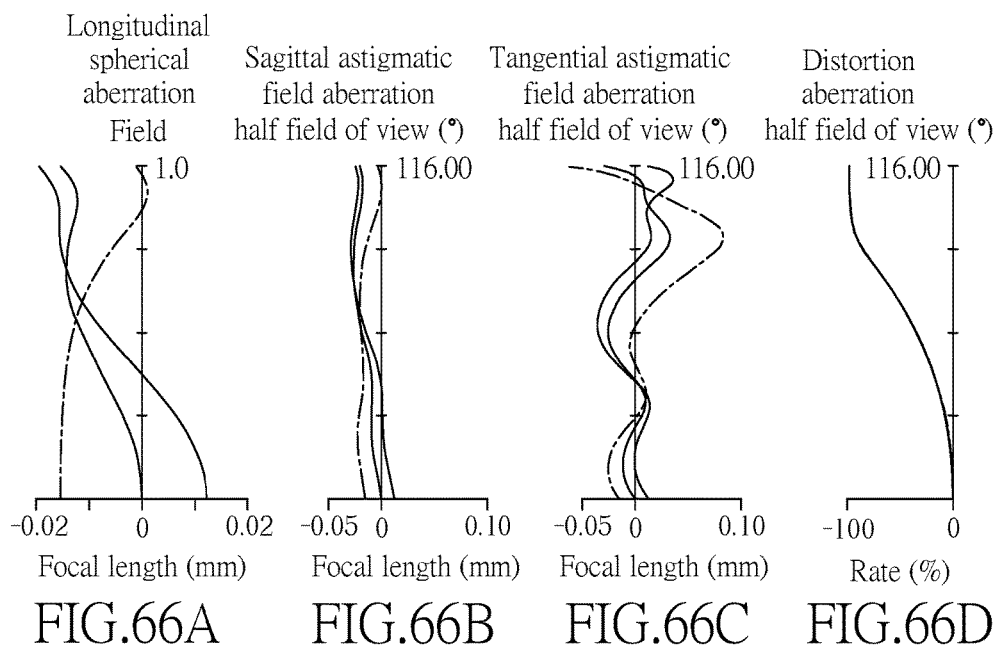
FIG. 66A illustrates the longitudinal spherical aberration on the image plane of the sixteenth example.
FIG. 66B illustrates the astigmatic aberration on the sagittal direction of the sixteenth example.
FIG. 66C illustrates the astigmatism aberration on the tangential direction of the sixteenth example.
FIG. 66D illustrates the distortion aberration of the sixteenth example.

In FIG. 66A that illustrates the longitudinal spherical aberration in the sixteenth example, the imaging point deviation of the off-axis ray at different heights is controlled within ±0.02 mm. In FIG. 66B and FIG. 66C which illustrate two diagrams of astigmatism aberration, the focal length variation of the three representative wavelengths in the entire field of view falls within ±0.075 mm. In FIG. 66D, the diagram of distortion aberration shows that the distortion aberration in the second example can be maintained within ±100%. Based on the above, it is shown that the sixteenth example can provide better image quality compared to the thirteenth example under the condition in which the system length of is shortened to about 13.100 mm.

Based on the above, it can be obtained that the half field of view of the sixteenth example is greater than that of the thirteenth example. The longitudinal spherical aberration of the sixteenth example is less than the longitudinal spherical aberration of the thirteenth example.

Seventeenth Example

Figure 67:
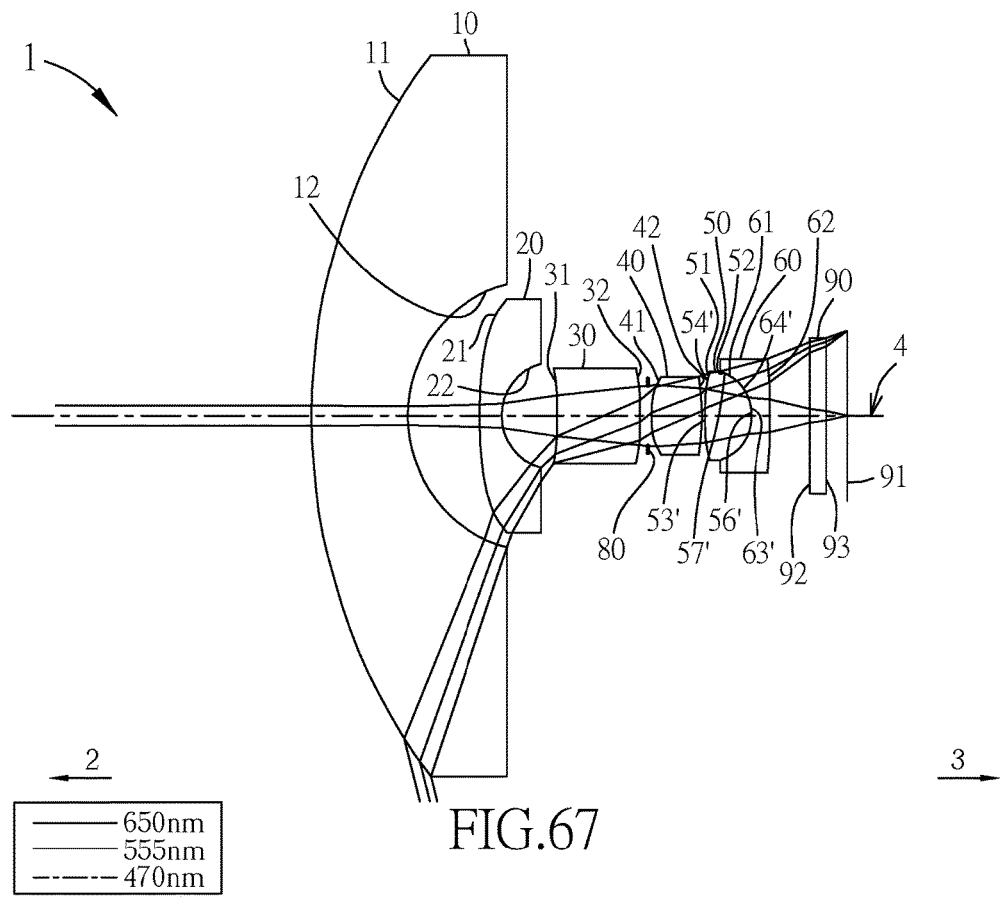
FIG. 67 illustrates a seventeenth example of the optical imaging lens of the invention.

Please refer to FIG. 67 which illustrates the seventeenth example of the optical imaging lens 1 of the invention. Please refer to FIG. 68A for the longitudinal spherical aberration on the image plane 91 of the seventeenth example, please refer to FIG. 68B for the astigmatism aberration on the sagittal direction, please refer to FIG. 68C for the astigmatism aberration on the tangential direction, and please refer to FIG. 68D for the distortion aberration. The optical imaging lens 1 of the seventeenth example is approximately similar to that of the thirteenth example, and a difference therebetween includes that: the optical data, the aspheric coefficients, and the parameters of the first lens element 10, the second lens element 20, the third lens element 30, the fourth lens element 40, the fifth lens element 50, and the sixth lens element 60 are different more or less. Further, the refracting power of the fifth lens element 50 is positive. The refracting power of the sixth lens element 60 is negative. The object-side surface 51 of the fifth lens element 50 has a convex portion 53' in the vicinity of the optical axis and a convex portion 54' in the vicinity of the periphery. The image-side surface 52 of the fifth lens element 50 has a convex portion 56' in the vicinity of the optical axis and a convex portion 57' in the vicinity of the periphery. The object-side surface 61 of the sixth lens element 60 has a concave portion 63' in the vicinity of the optical axis and a concave portion 64' in the vicinity of the periphery. The object-side surface 51 and image-side surface 52 of the fifth lens element 50 are both spherical surfaces. The object-side surface 61 and image-side surface 62 of the sixth lens element 60 are both spherical surfaces. Note that in order to show the diagram clearly, some numerals which are similar to those used in the vicinity of the optical axis and in the vicinity of the periphery in the thirteenth example are omitted from FIG. 67.

The optical data of the seventeenth example is shown in FIG. 85 in detail while the aspheric surface data is shown in FIG. 86. Herein, system image height=2.240 mm; EFL=1.191 mm; HFOV=104.500 degrees; TTL=14.066 mm; Fno=2.200.

Figures 68A, 68B, 68C, 68D:
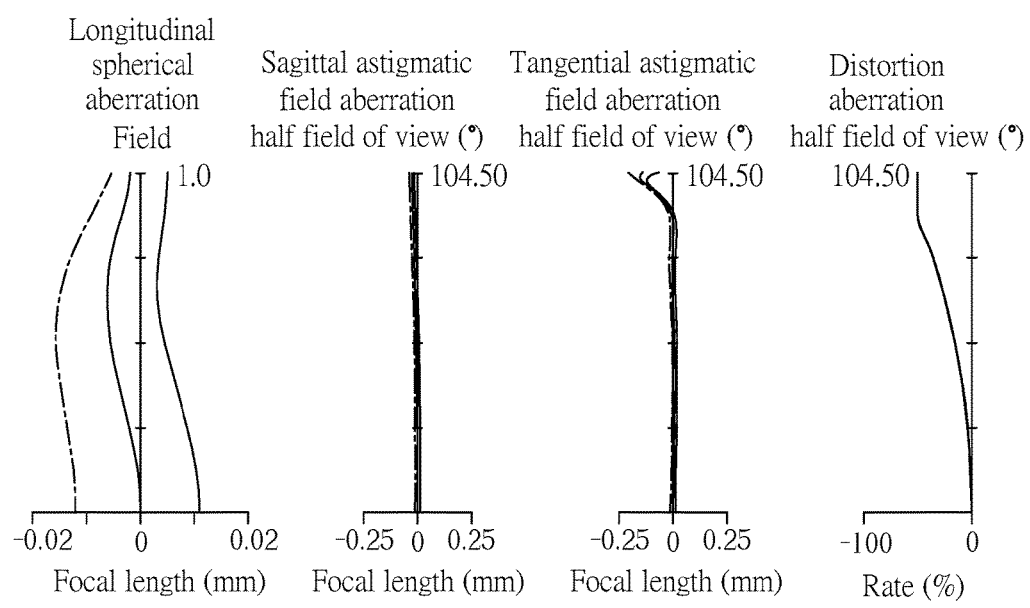
FIG. 68A illustrates the longitudinal spherical aberration on the image plane of the seventeenth example.
FIG. 68B illustrates the astigmatic aberration on the sagittal direction of the seventeenth example.
FIG. 68C illustrates the astigmatism aberration on the tangential direction of the seventeenth example.
FIG. 68D illustrates the distortion aberration of the seventeenth example.

In FIG. 68A that illustrates the longitudinal spherical aberration in the seventeenth example, the imaging point deviation of the off-axis ray at different heights is controlled within ±0.015 mm. In FIG. 68B and FIG. 68C which illustrate two diagrams of astigmatism aberration, the focal length variation of the three representative wavelengths in the entire field of view falls within ±0.25 mm. In FIG. 68D, the diagram of distortion aberration shows that the distortion aberration in the seventeenth example can be maintained within ±100%. Based on the above, it is shown that the seventeenth example can provide better image quality compared to the thirteenth example under the condition in which the system length of is shortened to about 14.066 mm.

Based on the above, it can be obtained that the fabrication of the seventeenth example is easier than that of the thirteenth example so the yield is better.

Eighteenth Example

Figure 69:
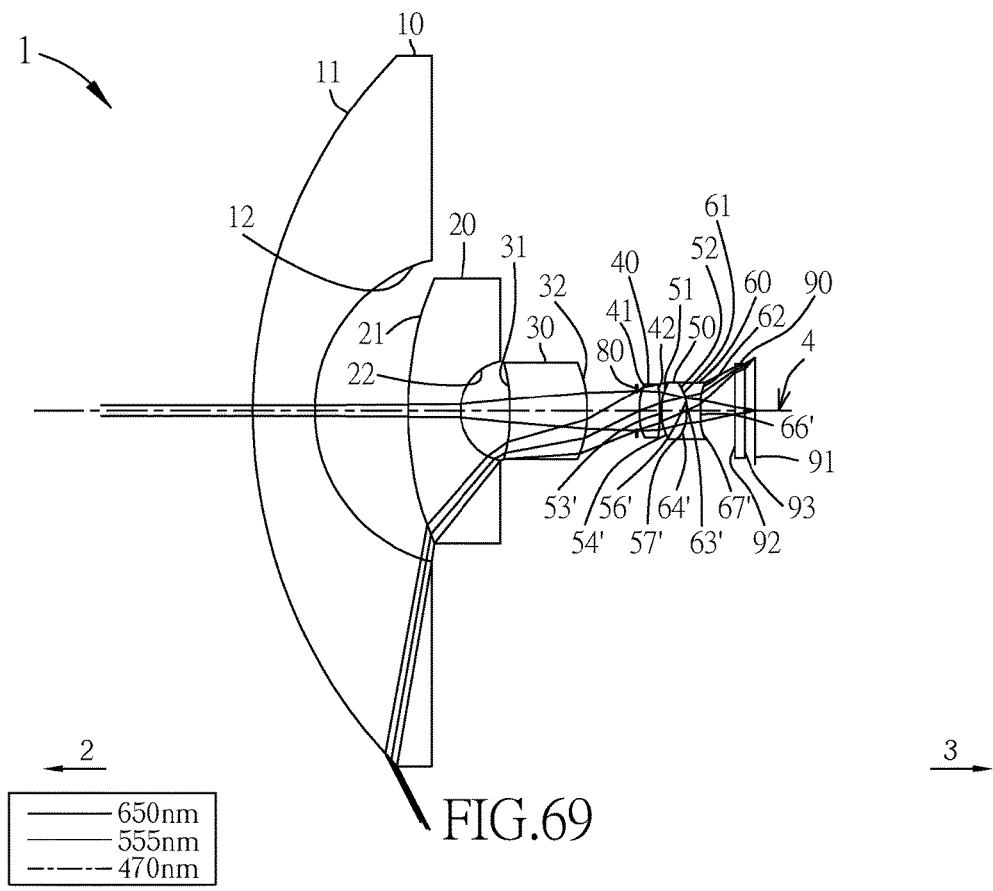
FIG. 69 illustrates an eighteenth example of the optical imaging lens of the invention.

Please refer to FIG. 69 which illustrates the eighteenth example of the optical imaging lens 1 of the invention. Please refer to FIG. 70A for the longitudinal spherical aberration on the image plane 91 of the eighteenth example, please refer to FIG. 70B for the astigmatism aberration on the sagittal direction, please refer to FIG. 70C for the astigmatism aberration on the tangential direction, and please refer to FIG. 70D for the distortion aberration. The optical imaging lens 1 of the eighteenth example is approximately similar to that of the thirteenth example, and a difference therebetween includes that: the optical data, the aspheric coefficients, and the parameters of the first lens element 10, the second lens element 20, the third lens element 30, the fourth lens element 40, the fifth lens element 50, and the sixth lens element 60 are different more or less. Further, the second lens element 20 is made of glass. The refracting power of the fifth lens element 50 is positive. The refracting power of the sixth lens element 60 is negative. The object-side surface 51 of the fifth lens element 50 has a convex portion 53' in the vicinity of the optical axis and a convex portion 54' in the vicinity of the periphery. The image-side surface 52 of the fifth lens element 50 has a convex portion 56' in the vicinity of the optical axis and a convex portion 57' in the vicinity of the periphery. The object-side surface 61 of the sixth lens element 60 has a concave portion 63' in the vicinity of the optical axis and a concave portion 64' in the vicinity of the periphery. The image-side surface 62 of the sixth lens element 60 has a concave portion 66' in the vicinity of the optical axis and a concave portion 67' in the vicinity of the periphery. The object-side surface 21 and image-side surface 22 of the second lens element 20 are both spherical surfaces. Note that in order to show the diagram clearly, some numerals which are similar to those used in the vicinity of the optical axis and in the vicinity of the periphery in the thirteenth example are omitted from FIG. 69.

The optical data of the eighteenth example is shown in FIG. 87 in detail while the aspheric surface data is shown in FIG. 90. Herein, system image height=2.240 mm; EFL=1.101 mm; HFOV=117.000 degrees; TTL=21.301 mm; Fno=2.400.

In FIG. 70A that illustrates the longitudinal spherical aberration in the eighteenth example, the imaging point deviation of the off-axis ray at different heights is controlled within ±0.010 mm. In FIG. 70B and FIG. 70C which illustrate two diagrams of astigmatism aberration, the focal length variation of the three representative wavelengths in the entire field of view falls within ±0.04 mm. In FIG. 70D, the diagram of distortion aberration shows that the distortion aberration in the second example can be maintained within ±100%. Based on the above, it is shown that the eighteenth example can provide better image quality compared to the thirteenth example under the condition in which the system length of is shortened to about 21.301 mm.

Based on the above, it can be obtained that the half field of view of the eighteenth example is greater than that of the thirteenth example. The longitudinal spherical aberration of the eighteenth example is less than the longitudinal spherical aberration of the thirteenth example. The distortion aberration of the eighteenth example is less than the distortion aberration of the thirteenth example.

Nineteenth Example

Figure 71:
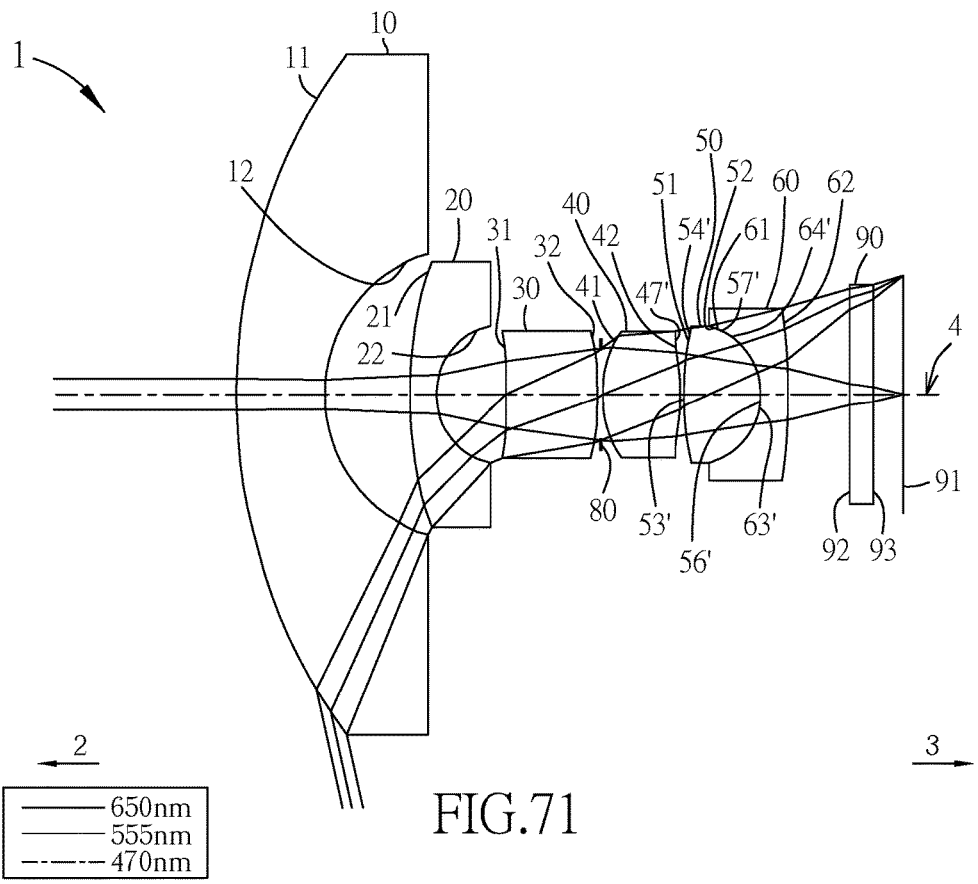

Please refer to FIG. 71 which illustrates the nineteenth example of the optical imaging lens 1 of the invention. Please refer to FIG. 72A for the longitudinal spherical aberration on the image plane 91 of the nineteenth example, please refer to FIG. 72B for the astigmatism aberration on the sagittal direction, please refer to FIG. 72C for the astigmatism aberration on the tangential direction, and please refer to FIG. 72D for the distortion aberration. The optical imaging lens 1 of the nineteenth example is approximately similar to that of the thirteenth example, and a difference therebetween includes that: the optical data, the aspheric coefficients, and the parameters of the first lens element 10, the second lens element 20, the third lens element 30, the fourth lens element 40, the fifth lens element 50, and the sixth lens element 60 are different more or less. Further, the refracting power of the fifth lens element 50 is positive. The refracting power of the sixth lens element 60 is negative. The image-side surface 42 of the fourth lens element 40 has a concave portion 47' in the vicinity of the periphery. The object-side surface 51 of the fifth lens element 50 has a convex portion 53' in the vicinity of the optical axis and a convex portion 54' in the vicinity of the periphery. The image-side surface 52 of the fifth lens element 50 has a convex portion 56' in the vicinity of the optical axis and a convex portion 57' in the vicinity of the periphery. The object-side surface 61 of the sixth lens element 60 has a concave portion 63' in the vicinity of the optical axis and a concave portion 64' in the vicinity of the periphery. The object-side surface 51 and image-side surface 52 of the fifth lens element 50 are both spherical surfaces. The object-side surface 61 and image-side surface 62 of the sixth lens element 60 are both spherical surfaces. Note that in order to show the diagram clearly, some numerals which are similar to those used in the vicinity of the optical axis and in the vicinity of the periphery in the thirteenth example are omitted from FIG. 71.

The optical data of the nineteenth example is shown in FIG. 89 in detail while the aspheric surface data is shown in FIG. 92. Herein, system image height=2.057 mm; EFL=1.189 mm; HFOV=102.500 degrees; TTL=11.689 mm; Fno=2.200.

Figures 72A, 72B, 72C, 72D:
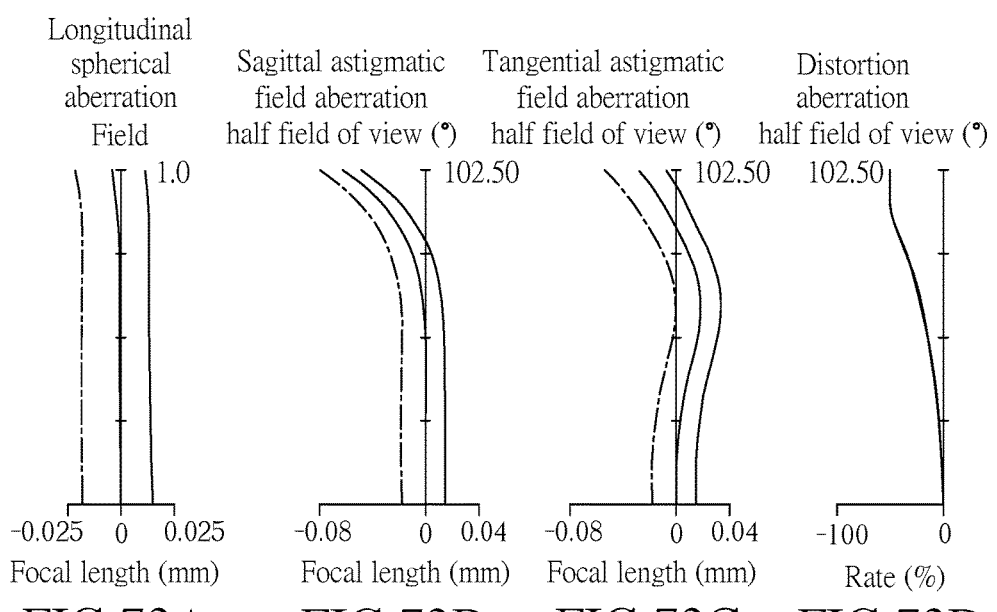

In FIG. 72A that illustrates the longitudinal spherical aberration in the nineteenth example, the imaging point deviation of the off-axis ray at different heights is controlled within ±0.025 mm. In FIG. 72B and FIG. 72C which illustrate two diagrams of astigmatism aberration, the focal length variation of the three representative wavelengths in the entire field of view falls within ±0.08 mm. In FIG. 72D, the diagram of distortion aberration shows that the distortion aberration in the nineteenth example can be maintained within ±100%. Based on the above, it is shown that the nineteenth example can provide better image quality compared to the thirteenth example under the condition in which the system length of is shortened to about 11.689 mm.

Based on the above, it can be obtained that the system length of the nineteenth example is less than that of the thirteenth example.

Twentieth Example

Figure 73:
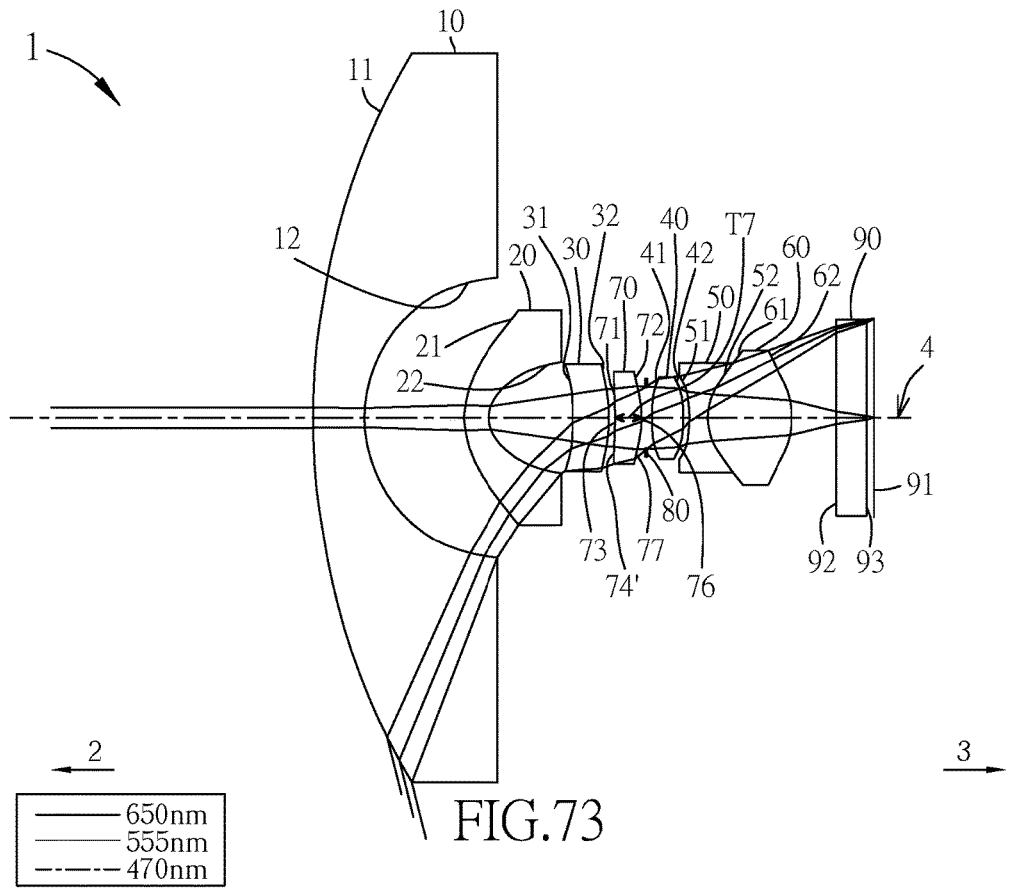

Please refer to FIG. 73 which illustrates the twentieth example of the optical imaging lens 1 of the invention. Please refer to FIG. 74A for the longitudinal spherical aberration on the image plane 91 of the twentieth example, please refer to FIG. 74B for the astigmatism aberration on the sagittal direction, please refer to FIG. 74C for the astigmatism aberration on the tangential direction, and please refer to FIG. 74D for the distortion aberration. The optical imaging lens 1 of the twentieth example is approximately similar to that of the thirteenth example, and a difference therebetween includes that: the optical imaging lens 1 further includes a seventh lens element 70. The seventh lens element 70 is disposed between the third lens element 30 and the aperture 80. The seventh lens element 70 is made of plastic. The seventh lens element 70 has an object-side surface 71 facing the object side 2 and an image-side surface 72 facing the image side 3. The object-side surface 71 of the seventh lens element 70 has a concave portion 73 in the vicinity of the optical axis and a convex portion 74' in the vicinity of the periphery. The image-side surface 72 of the seventh lens element 70 has a convex portion 76 in the vicinity of the optical axis and a convex portion 77 in the vicinity of the periphery. The object-side surface 71 and the image-side surface 72 are both aspheric surfaces. The object-side surface 71 and the image-side surface 72 may be defined by the foregoing formula (1), and details thereof will not be repeated hereinafter. Further, the optical data, the aspheric coefficients, and the parameters of the first lens element 10, the second lens element 20, the third lens element 30, the fourth lens element 40, the fifth lens element 50, and the sixth lens element 60 are different more or less. Note that in order to show the diagram clearly, some numerals which are similar to those used in the vicinity of the optical axis and in the vicinity of the periphery in the thirteenth example are omitted from FIG. 73. Further, please refer to the foregoing paragraphs for related parameter definition of the seventh lens element 70. It is further defined that: a distance between the image-side surface 32 of the third lens element 30 and the object-side surface 71 of the seventh lens element 70 along the optical axis 4 is G37. A distance between the image-side surface 72 of the seventh lens element 70 and the object-side surface 41 of the fourth lens element 40 along the optical axis 4 is G74. Therefore, AAG=G12+G23+G37+T7+G74+G45+G56.

The optical data of the twentieth example is shown in FIG. 91 in detail while the aspheric surface data is shown in FIG. 92. Herein, system image height=2.240 mm; EFL=0.966 mm; HFOV=104.500 degrees; TTL=12.470 mm; Fno=2.100.

Figures 74A, 74B, 74C, 74D:
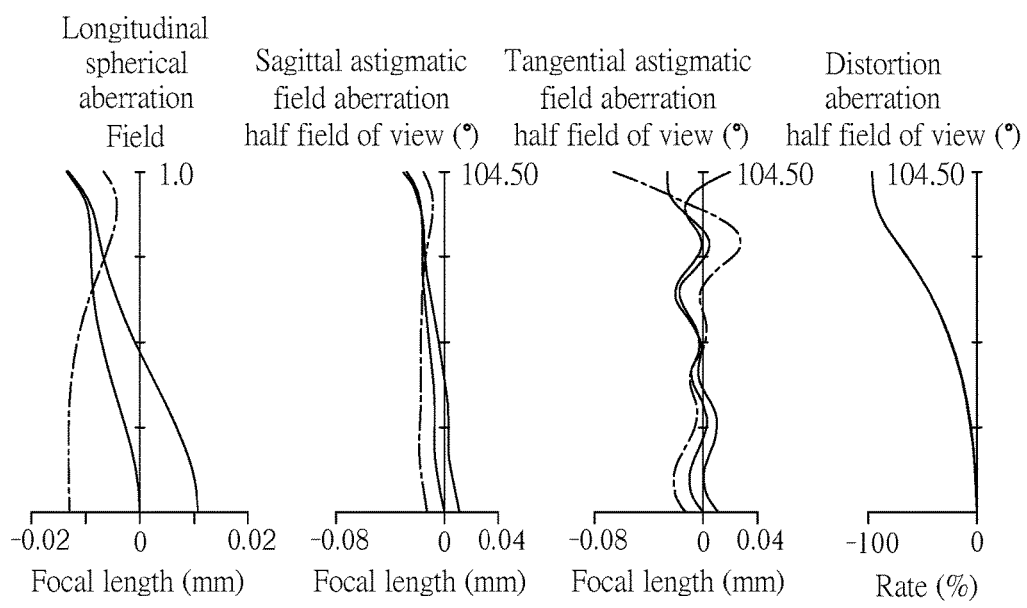

Please refer to FIG. 74A to FIG. 74D, FIG. 74A illustrates the longitudinal spherical aberration of the twentieth example, FIG. 74B and FIG. 74C respectively illustrate the astigmatic aberration on the sagittal direction and the astigmatic aberration on the tangential direction on the image plane 91 when the wavelengths are 470 mm, 555 mm, and 650 mm in the twentieth example, and FIG. 74D is illustrates the distortion aberration on the image plane 91 when the wavelengths are 470 nm, 555 nm, and 650 nm in the twentieth example. In FIG. 74A that illustrates the longitudinal spherical aberration in the twentieth example, the curve of each of the wavelengths is close to one another and near the middle position, which shows that the off-axis ray of each wavelength at different heights are focused near the imaging point. The skew margin of the curve of each wavelength shows that the imaging point deviation of the off-axis ray at different heights is controlled within ±0.015 mm. Accordingly, it is evident that the twentieth example can significantly improve the spherical aberration of the same wavelength. In addition, the curves of the three representative wavelengths are close to one another, which represents that the imaging positions of the rays with different wavelengths are concentrated; therefore, the chromatic aberration can be significantly improved.

In FIG. 74B and FIG. 74C which illustrate two diagrams of astigmatic aberration, the focal length variation of the three representative wavelengths in the entire field of view falls within ±0.07 mm, which represents that the optical system in the twentieth example can effectively eliminate aberration. In FIG. 74D, the diagram of distortion aberration shows that the distortion aberration in the twentieth example can be maintained within ±100%, which shows that the distortion aberration in the twentieth example can meet the image quality requirement of the optical system. Based on the above, it is shown that the twentieth example can provide better image quality compared to an existing optical lens under the condition in which the system length of the optical lens is shortened to about 14.055 mm.

Twenty-First Example

Please refer to FIG. 75 which illustrates the twenty-first example of the optical imaging lens 1 of the invention. Please refer to FIG. 76A for the longitudinal spherical aberration on the image plane 91 of the twenty-first example, please refer to FIG. 76B for the astigmatism aberration on the sagittal direction, please refer to FIG. 76C for the astigmatism aberration on the tangential direction, and please refer to FIG. 76D for the distortion aberration. The optical imaging lens 1 of the twenty-first example is approximately similar to that of the twentieth example, and a difference therebetween includes that: the optical imaging lens 1 of the twenty-first example further includes an eighth lens element 8. The fourth lens having refracting power from the aperture 80 to the image side 3 is defined as the eighth lens element 8. Alternatively, the eighth lens element 8 is disposed between the sixth lens element 60 and the filter 90. The eighth lens element 8 has an object-side surface 81 facing the object side 2 and an image-side surface 82 facing the image side 3. The object-side surface 81 of the eighth lens element 8 has a convex portion 83 in the vicinity of the optical axis and a concave portion 84 in the vicinity of the periphery. The image-side surface 82 of the eighth lens element 8 has a convex portion 86 in the vicinity of the optical axis and a convex portion 87 in the vicinity of the periphery. The object-side surface 81 and the image-side surface 82 are both aspheric surfaces. The object-side surface 81 and the image-side surface 22 may be defined by the foregoing formula (1), and details thereof will not be repeated hereinafter. The object-side surface 31 of the third lens element 30 has a convex portion 33' in the vicinity of the optical axis. The image-side surface 62 of the sixth lens element 60 has a concave portion 67' in the vicinity of the periphery. The image-side surface 72 of the seventh lens element 70 has a concave portion 77' in the vicinity of the periphery. In addition, the optical data, the aspheric coefficients, and the parameters of the first lens element 10, the second lens element 20, the third lens element 30, the fourth lens element 40, the fifth lens element 50, the sixth lens element 60, and the seventh lens element 70 are different more or less. Note that in order to show the diagram clearly, some numerals which are similar to those used in the vicinity of the optical axis and in the vicinity of the periphery in the twentieth example are omitted from FIG. 75.

As regards the twenty-first example, T8 is a central thickness of the eighth lens element 8 along the optical axis 4. In the optical imaging lens 1 along the optical axis 4, ALT is a sum of central thicknesses of all the lens elements having refracting power. That is, ALT=T1+T2+T3+T4+T5+T6+T7+T8.

In addition, it is further defined that: the focal length of the eighth lens element 8 is f8; the refractive index of the eighth lens element 80 is n8; the Abbe number of the eighth lens element 8 is ν8. G68 is a distance between the image-side surface 62 of the sixth lens element 60 and the object-side surface 81 of the eighth lens element 8 along the optical axis 4, and G8F is a distance between the image-side surface 82 of the eighth lens element 8 and the object-side surface 92 of the filter 90 along the optical axis 4.

The optical data of the twenty-first example is shown in FIG. 93 in detail while the aspheric surface data is shown in FIG. 94. Herein, system image height=2.240 mm; EFL=0.969 mm; HFOV=104.500 degrees; TTL=14.055 mm; Fno=2.100.

Please refer to FIG. 76A to FIG. 76D, FIG. 76A illustrates the longitudinal spherical aberration of the twenty-first example, FIG. 76B and FIG. 76C respectively illustrate the astigmatic aberration on the sagittal direction and the astigmatic aberration on the tangential direction on the image plane 91 when the wavelengths are 470 mm, 555 mm, and 650 mm in the twenty-first example, and FIG. 76D is illustrates the distortion aberration on the image plane 91 when the wavelengths are 470 nm, 555 nm, and 650 nm in the twenty-first example. In FIG. 76A that illustrates the longitudinal spherical aberration in the twenty-first example, the curve of each of the wavelengths is close to one another and near the middle position, which shows that the off-axis ray of each wavelength at different heights are focused near the imaging point. The skew margin of the curve of each wavelength shows that the imaging point deviation of the off-axis ray at different heights is controlled within ±0.375 mm. Accordingly, it is evident that the twenty-first example can significantly improve the spherical aberration of the same wavelength. In addition, the curves of the three representative wavelengths are close to one another, which represents that the imaging positions of the rays with different wavelengths are concentrated; therefore, the chromatic aberration can be significantly improved.

In FIG. 76B and FIG. 76C which illustrate two diagrams of astigmatic aberration, the focal length variation of the three representative wavelengths in the entire field of view falls within ±0.08 mm, which represents that the optical system in the twenty-first example can effectively eliminate aberration. In FIG. 76D, the diagram of distortion aberration shows that the distortion aberration in the twenty-first example can be maintained within ±100%, which shows that the distortion aberration in the twenty-first example can meet the image quality requirement of the optical system. Based on the above, it is shown that the twenty-first example can provide better image quality compared to an existing optical lens under the condition in which the system length of the optical lens is shortened to about 14.055 mm.

In addition, important parameters of the thirteenth example to the twenty-first example are organized in FIG. 95, FIG. 96, FIG. 97, and FIG. 98.

First, in FIG. 95 and FIG. 96, the unit of the values corresponding to the columns "Fno" and "V1" to "V8" is dimensionless, the unit of the values corresponding to the column "Half-FOV" is degree, and the unit of the values corresponding to the rest of the columns is millimeter.

Next, in FIG. 97 and FIG. 98, the unit of the values corresponding to the columns "y in 0.8 field", "y in 0.8716 field", "BFL", "ALT", "AAG", "TL", and "TTL" is millimeter. The unit of the values corresponding to the columns "ω captured corresponding to 0.8 field" and "ω captured corresponding to 0.8716 field" is degree. The unit of the values corresponding to the rest of the columns is dimensionless.

With reference to FIG. 58A, FIG. 58B, FIG. 97, and FIG. 98, the column "ω captured corresponding to 0.8 field" represents the half field of view of an image captured by the image sensor at 0.8 times of the field. The meaning of the column "ω captured corresponding to 0.8716 field" may be deduced by analogy.

From another aspect, in the column "y in 0.8 field" means the image height corresponding to the image sensor in 0.8 times of the field. The meaning of the column "y in 0.8716 field" may be deduced by analogy.

The following conditional formulae are provided to keep the effective focal length and the optical parameters in a suitable range so that the parameters are not so great to jeopardize the correction of the entire aberration of the optical imaging system or are not too small to affect or bring increased difficulty in fabrication or assembly of the optical imaging lens.

As regards the condition of (EFL+AAG+BFL)/ALT≤1.500, the preferable range is 0.800≤(EFL+AAG+BFL)/ALT≤1.500.

As regards the condition of (EFL*Fno+T4)/ImgH≤2.100, the preferable range is 1.000≤(EFL*Fno+T4)/ImgH≤2.100.

The following conditional formulae are provided to keep the lens thickness and gaps in a suitable range so that the parameters are not so great to jeopardize the thinning of the entire optical imaging lens or are not too small to affect or bring increased difficulty in fabrication or assembly of the optical imaging lens.

As regards the condition of TL/ALT≤3.500, the preferable range is 1.260≤TL/ALT≤3.500.

As regards the condition of (G12+G45+T5+G56)/T1≤2.900, the preferable range is 0.800≤(G12+G45+T5+G56)/T1≤2.900.

As regards the condition of (G45+G56+T5+T6)/G23≤4.300, the preferable range is 0.710≤(G45+G56+T5+T6)/G23≤4.300.

As regards the condition of (G34+G45+T4+T5)/T1≤10.400, the preferable range is 2.730≤(G34+G45+T4+T5)/T1≤10.400.

As regards the condition of (G34+G45+T3+T6)/T2≤7.300, the preferable range is 0.970≤(G34+G45+T3+T6)/T2≤7.300.

As regards the condition of (G23+G34+G45+T5)/T1≤6.000, the preferable range is 3.500≤(G23+G34+G45+T5)/T1≤6.000.

As regards the condition of TTL/ALT≤2.500, the preferable range is 1.650≤TTL/ALT≤2.500.

As regards the condition of (G12+G45+T5+G56)/T4≤6.100, the preferable range is 1.100≤(G12+G45+T5+G56)/T4≤6.100.

As regards the condition of (G45+G56+T4+T6)/G23≤3.300, the preferable range is 0.690≤(G45+G56+T4+T6)/G23≤3.300.

As regards the condition of (G34+G45+T3+T6)/T1≤6.500, the preferable range is 1.200≤(G34+G45+T3+T6)/T1≤6.500.

As regards the condition of (G34+G45+T4+T5)/T2≤6.850, the preferable range is 1.900≤(G34+G45+T4+T5)/T2≤6.850.

As regards the condition of (G23+G34+G45+T6)/T1≤10.000, the preferable range is 0.915≤(G23+G34+G45+T6)/T1≤10.000.

In addition to the above ratios, one or more conditional formulae may be optionally combined to be used in the examples of the present invention and the present invention is not limit to this. The curvatures of each lens element or multiple lens elements may be fine-tuned to result in more fine structures to enhance the performance or the resolution. The above limitations may be properly combined in the examples without causing inconsistency. In the light of the unpredictability of the optical imaging lens, the present invention suggests the above principles to have a shorter total length of the optical imaging lens, a larger aperture available, better imaging quality or a better fabrication yield to overcome the drawbacks of prior art.

In addition to the above ratios, one or more conditional formulae may be optionally combined to be used in the examples of the present invention and the present invention is not limit to this. The curvatures of each lens element or multiple lens elements may be fine-tuned to result in more fine structures to enhance the performance or the resolution. The above limitations may be properly combined in the examples without causing inconsistency.

The maximum and minimum numeral values derived from the combinations of the optical parameters disclosed in the embodiments of the invention may all be applicable and enable people skill in the pertinent art to implement the invention.

Those skilled in the art will readily observe that numerous modifications and alterations of the device and method may be made while retaining the teachings of the invention. Accordingly, the above disclosure should be construed as limited only by the metes and bounds of the appended claims.

In addition, it is optional to select a random combination relationship of the parameter in the embodiment to increase limitation of the optical imaging lens for the ease of designing the optical imaging lens having the same structure in the invention.

Based on the above, the optical imaging lens 10 in the embodiment of the invention can achieve the following effects and advantages.

1. In each one of the above examples, the longitudinal spherical aberration, the astigmatic aberration and the distortion aberration meet requirements in use. By observing three representative wavelengths of red, green and blue, it is suggested that all curves of every wavelength are close to one another, which reveals off-axis light of different heights of every wavelength all concentrates on the image plane, and deviations of every curve also reveal that off-axis light of different heights are well controlled so the examples do improve the spherical aberration, the astigmatic aberration and the distortion aberration. In addition, by observing the imaging quality data the distances amongst the three representing different wavelengths (red, green and blue) are pretty close to one another, which means the present invention is able to concentrate light of the three representing different wavelengths so that the aberration is greatly improved. Given the above, the present invention provides outstanding imaging quality.

2. The imaging circle IC of the optical imaging lens 1 of the invention has the inscribed rectangle RT with the aspect ratio of 4:3. The reference line HL parallel to the long sides LE of the inscribed rectangle RT corresponds to the image captured at the field greater than or equal to 175° and less than or equal to 188°. Further, the diagonal DL of the rectangle RT corresponds to the image captured at the field greater than or equal to 209° and less than or equal to 234°. In response to that the horizontal FOV corresponding to the image sensor with the aspect ratio of 4:3 is greater than or equal to 175 degrees, the effect of no blind spot in the field of view in the horizontal direction is achieved. At the same time, the imaging ray enters the four corners of the image sensor so that no dark corner is generated at the four corners of the image sensor.

3. The ratio of the field corresponding to the field of view for capturing corresponding to the diagonal DL to the field corresponding to the field of view for capturing corresponding to the reference line HL is 1:0.8. In this way, the design of no blind spot in the field of view in the horizontal direction and no dark corner at the four corners of the image sensor with the aspect ratio of 4:3 is achieved.

4. The imaging circle IC of the optical imaging lens 1 of the invention has the inscribed rectangle RT with the aspect ratio of 16:9. The reference line HL parallel to the long sides LE of the inscribed rectangle RT corresponds to the image captured at the field greater than or equal to 176° and less than or equal to 201°. Further, the diagonal DL of the rectangle RT corresponds to the image captured at the field greater than or equal to 205° and less than or equal to 232°. In response to that the horizontal FOV of the image sensor with the aspect ratio of 16:9 is greater than 176 degrees, the effect of no blind spot in the field of view in the horizontal direction is achieved. At the same time, the imaging ray enters the four corners of the image sensor so that no dark corner is generated at the four corners of the image sensor.

5. The ratio of the field corresponding to the field of view for capturing corresponding to the diagonal DL to the field corresponding to the field of view for capturing corresponding to the reference line HL is 1:0.8716. In this way, the design of no blind spot in the field of view in the horizontal direction and no dark corner at the four corners of the image sensor with the aspect ratio of 16:9 is achieved.

6. When the aperture 80 is located between the third lens element 30 and the fourth lens element 40, the first lens element 10 has negative refracting power, the second lens element 20 has negative refracting power, the third lens element 30 has positive refracting power, the object-side surface 31 of the third lens element 30 has the concave portion 34 in the vicinity of the periphery, such combination of surface shapes has the advantage of light concentration at an ultra-wide angle through at least three lens elements in front of the aperture. At the same time, at least three lens elements behind the aperture may be used to calibrate chromatic aberration and astigmatism aberration, so as to maintain imaging quality. The preferred limitation in surface shapes is that the object-side surface 31 of the third lens element 3 has the concave portion 33 in the vicinity of the optical axis.

7. The three lens elements behind the aperture 80 has a bonded lens element group with an aspheric surface, and the lens element group may help to improve chromatic aberration and astigmatism and enhance imaging quality.

8. When the optical imaging lens 1 satisfies the condition of $3.5 \leq (V1+V2)/V3 \leq 6$, and when the above limitation of the invention is also applied, chromatic aberration of the front three lens elements may be corrected.

9. When the optical imaging lens 1 satisfies the condition of $3.5 \leq (V1+V4)/V3 \leq 6$, and when the above limitation of the invention is also applied, chromatic aberration of the front four lens elements may be corrected.

10. Along with performance increase of image processing, distortion aberration may be calibrated more easily through image processing, and costs of image processing may gradually decrease as well. In the optical imaging lens 1 provided by the embodiments of the invention, the relationship between the image height y and the half field of view ω is designed to be nearly proportional, so that the advantages of no blind spot in the field of view in the horizontal direction and no dark corner at the four corners of the image sensor are provided. Even though the optical imaging lens 1 provides less favorable distortion aberration compared to an existing lens, along with the use of instant image processing, an image featuring extremely low distortion aberration may still be instantly obtained. For instance, the optical imaging lens 1 of the thirteenth example to the twenty-first example of the invention satisfies the following condition: $0.900 \leq y/(EFL*\omega) \leq 1.300$. ω is the half field of view of different angles for capturing, and y is the image height corresponding to each half field of view in the optical imaging lens 1. Herein, ω is calculated based on radian so may be regarded as having no unit of measurement. Hence, $y/(EFL*\omega)$ may be regarded as having no unit of measurement or having a unit of radian −1. The values of the image height y, the half field of view ω (unit: degree), the half field of view ω (unit: radian), and the corresponding $y/(EFL*\omega)$ (this co value is calculated based on the value of radian) of the optical imaging lens 1 are listed in FIG. 99 to FIG. 101. When the optical imaging lens 1 satisfies 0.900≤y/(EFL*ω)≤1.300, the relationship between the image height y and the half field of view ω may be designed to be nearly proportional.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical imaging lens, comprising a first lens element, a second lens element, a third lens element, an aperture, a fourth lens element, a fifth lens element, and a sixth lens element sequentially arranged along an optical axis from an object side to an image side, each of the first lens element to the sixth lens element comprising an object-side surface facing the object side and allowing an imaging ray to pass through and an image-side surface facing the image side and allowing the imaging ray to pass through, wherein, the first lens element is arranged to be a lens element having refracting power in a first order from the object side to the image side, the second lens element is arranged to be a lens element having refracting power in a second order from the object side to the image side, the third lens element is arranged to be a lens element having refracting power in a third order from the object side to the image side, the fourth lens element is arranged to be a lens element having refracting power in a first order from the aperture to the image side, the fifth lens element is arranged to be a lens element having refracting power in a second order from the aperture to the image side, and the sixth lens element is arranged to be a lens element having refracting power in a third order from the aperture to the image side, wherein an imaging circle of the optical imaging lens has an inscribed rectangle having an aspect ratio of 4:3, a reference line passing through a center of the imaging circle and parallel to any long side of the rectangle corresponds to an image captured at a field of view greater than or equal to 175° and less than or equal to 188°, and a diagonal of the rectangle corresponds to an image captured at a field of view greater than or equal to 209° and less than or equal to 234°, wherein the reference line extends from a short side of the rectangle to the other short side of the rectangle, and a length of the reference line is equal to a length of any long side of the rectangle.

2. The optical imaging lens as claimed in claim 1, wherein the optical imaging lens satisfies the following condition: 0.900≤y/(EFL*ω)≤1.300, wherein EFL is an effective focal length of the optical imaging lens, ω is a half field of view of each of different capturing angles of the optical imaging lens, and y is an image height corresponding to each of the half field of views.

3. The optical imaging lens as claimed in claim 1, wherein the optical imaging lens satisfies the following condition: 3.500≤(V1+V2)/V3≤6.000, wherein V1 is an Abbe number of the first lens element, V2 is an Abbe number of the second lens element, and V3 is an Abbe number of the third lens element.

4. The optical imaging lens as claimed in claim 1, wherein the optical imaging lens satisfies the following condition: TL/ALT≤1.820, wherein TL is a distance from the object-side surface of the first lens element to the image-side surface of the sixth lens element along the optical axis, and ALT is a sum of central thicknesses of all the lens elements having refracting power along the optical axis.

5. The optical imaging lens as claimed in claim 1, wherein the optical imaging lens satisfies the following condition: (EFL+AAG+BFL)/ALT≤1.500, EFL is an effective focal length of the optical imaging lens, AAG is a sum of a distance between the first lens element and the second lens element along the optical axis, a distance between the second lens element and the third lens element along the optical axis, a distance between the third lens element and the fourth lens element along the optical axis, a distance between the fourth lens element and the fifth lens element along the optical axis, and a distance between the fifth lens element and the sixth lens element along the optical axis, BFL is a length from the image-side surface of the sixth lens element to an image plane along the optical axis, and ALT is a sum of thicknesses of all the lens elements having refracting power along the optical axis.

6. The optical imaging lens as claimed in claim 1, wherein the optical imaging lens satisfies the following condition: (G12+G45+T5+G56)/T1≤3.500, G12 is a distance between the first lens element and the second lens element along the optical axis, G45 is a distance between the fourth lens element and the fifth lens element along the optical axis, T5 is a central thickness of the fifth lens element along the optical axis, G56 is a distance between the fifth lens element and the sixth lens element along the optical axis, and T1 is a central thickness of the first lens element along the optical axis.

7. The optical imaging lens as claimed in claim 1, wherein the optical imaging lens satisfies the following condition: (G45+G56+T5+T6)/G23≤2.900, G45 is a distance between the fourth lens element and the fifth lens element along the optical axis, G56 is a distance between the fifth lens element and the sixth lens element along the optical axis, T5 is a thickness of the fifth lens element along the optical axis, T6 is a thickness of the sixth lens element along the optical axis, and G23 is a distance between the second lens element and the third lens element along the optical axis.

8. The optical imaging lens as claimed in claim 1, wherein the optical imaging lens satisfies the following condition: (G34+G45+T4+T5)/T1≤4.300, G34 is a distance between the third lens element and the fourth lens element along the optical axis, G45 is a distance between the fourth lens element and the fifth lens element along the optical axis, T4 is a central thickness of the fourth lens element along the optical axis, T5 is a central thickness of the fifth lens element along the optical axis, and T1 is a central thickness of the first lens element along the optical axis.

9. The optical imaging lens as claimed in claim 1, wherein the optical imaging lens satisfies the following condition: (G34+G45+T3+T6)/T2≤10.400, G34 is a distance between the third lens element and the fourth lens element along the optical axis, G45 is a distance between the fourth lens element and the fifth lens element along the optical axis, T3 is a central thickness of the third lens element along the optical axis, T6 is a central thickness of the sixth lens element along the optical axis, and T2 is a central thickness of the second lens element along the optical axis.

10. The optical imaging lens as claimed in claim 1, wherein the optical imaging lens satisfies the following condition: (G23+G34+G45+T5)/T1≤7.300, G23 is a distance between the second lens element and the third lens element along the optical axis, G34 is a distance between the third lens element and the fourth lens element along the optical axis, G45 is a distance between the fourth lens element and the fifth lens element along the optical axis, T5 is a central thickness of the fifth lens element along the optical axis, and T1 is a central thickness of the first lens element along the optical axis.

11. An optical imaging lens, comprising a first lens element, a second lens element, a third lens element, an aperture, a fourth lens element, a fifth lens element, and a sixth lens element sequentially arranged along an optical axis from an object side to an image side, each of the first lens element to the sixth lens element comprising an object-side surface facing the object side and allowing an imaging ray to pass through and an image-side surface facing the image side and allowing the imaging ray to pass through, wherein, the first lens element is arranged to be a lens element having refracting power in a first order from the object side to the image side, the second lens element is arranged to be a lens element having refracting power in a second order from the object side to the image side, the third lens element is arranged to be a lens element having refracting power in a third order from the object side to the image side, the third lens element has positive refracting power, and the object-side surface of the third lens element has a concave portion in a vicinity of the optical axis, the fourth lens element is arranged to be a lens element having refracting power in a first order from the aperture to the image side, the fifth lens element is arranged to be a lens element having refracting power in a second order from the aperture to the image side, and the sixth lens element is arranged to be a lens element having refracting power in a third order from the aperture to the image side, wherein an imaging circle of the optical imaging lens has an inscribed rectangle having an aspect ratio of 16:9, a reference line passing through a center of the imaging circle and parallel to any long side of the rectangle corresponds to an image captured at a field of view greater than or equal to 176° and less than or equal to 201°, and a diagonal of the rectangle corresponds to an image captured at a field of view greater than or equal to 205° and less than or equal to 232°, wherein the reference line extends from a short side of the rectangle to the other short side of the rectangle, and a length of the reference line is equal to a length of any long side of the rectangle.

12. The optical imaging lens as claimed in claim 11, wherein the optical imaging lens satisfies the following condition: $0.900 \leq y/(EFL*\omega) \leq 1.300$, wherein EFL is an effective focal length of the optical imaging lens, $\omega$ is a half field of view of each of different capturing angles of the optical imaging lens, and y is an image height corresponding to each of the half field of views.

13. The optical imaging lens as claimed in claim 11, wherein the optical imaging lens satisfies the following condition: $3.500 \leq (V1+V4)/V3 \leq 6.000$, V1 is an Abbe number of the first lens element, V4 is an Abbe number of the fourth lens element, and V3 is an Abbe number of the third lens element.

14. The optical imaging lens as claimed in claim 11, wherein the optical imaging lens satisfies the following condition: $TTL/ALT \leq 2.500$, TTL is a distance from the object-side surface of the first lens element to an image plane along the optical axis, and ALT is a sum of central thicknesses of all the lens elements having refracting power along the optical axis.

15. The optical imaging lens as claimed in claim 11, wherein the optical imaging lens satisfies the following condition: $(EFL*Fno+T4)/ImgH \leq 2.100$, EFL is an effective focal length of the optical imaging lens, Fno is a f-number of the optical imaging lens, T4 is a central thickness of the fourth lens element along the optical axis, and ImgH is a system image height of the optical imaging lens.

16. The optical imaging lens as claimed in claim 11, wherein the optical imaging lens satisfies the following condition: $(G12+G45+T5+G56)/T4 \leq 6.100$, G12 is a distance between the first lens element and the second lens element along the optical axis, G45 is a distance between the fourth lens element and the fifth lens element along the optical axis, T5 is a central thickness of the fifth lens element along the optical axis, G56 is a distance between the fifth lens element and the sixth lens element along the optical axis, and T4 is a central thickness of the fourth lens element along the optical axis.

17. The optical imaging lens as claimed in claim 11, wherein the optical imaging lens satisfies the following condition: $(G45+G56+T4+T6)/G23 \leq 3.300$, G45 is a distance between the fourth lens element and the fifth lens element along the optical axis, G56 is a distance between the fifth lens element and the sixth lens element along the optical axis, T4 is a central thickness of the fourth lens element along the optical axis, T6 is a central thickness of the sixth lens element along the optical axis, and G23 is a distance between the second lens element and the third lens element along the optical axis.

18. The optical imaging lens as claimed in claim 11, wherein the optical imaging lens satisfies the following condition: $(G34+G45+T3+T6)/T1 \leq 6.500$, G34 is a distance between the third lens element and the fourth lens element along the optical axis, G45 is a distance between the fourth lens element and the fifth lens element along the optical axis, T3 is a central thickness of the third lens element along the optical axis, T6 is a central thickness of the sixth lens element along the optical axis, and T1 is a central thickness of the first lens element along the optical axis.

19. The optical imaging lens as claimed in claim 11, wherein the optical imaging lens satisfies the following condition: $(G34+G45+T4+T5)/T2 \leq 6.850$, G34 is a distance between the third lens element and the fourth lens element along the optical axis, G45 is a distance between the fourth lens element and the fifth lens element along the optical axis, T4 is a central thickness of the fourth lens element along the optical axis, T5 is a central thickness of the fifth lens element along the optical axis, and T2 is a central thickness of the second lens element along the optical axis.

20. The optical imaging lens as claimed in claim 11, wherein the optical imaging lens satisfies the following condition: $(G23+G34+G45+T6)/T1 \leq 10.000$, G23 is a distance between the second lens element and the third lens element along the optical axis, G34 is a distance between the third lens element and the fourth lens element along the optical axis, G45 is a distance between the fourth lens element and the fifth lens element along the optical axis, T6 is a central thickness of the sixth lens element along the optical axis, and T1 is a central thickness of the first lens element along the optical axis.

* * * * *